US012725366B2

(12) United States Patent
Broadway

(10) Patent No.: US 12,725,366 B2
(45) Date of Patent: Sep. 1, 2026

(54) SYSTEM FOR IMMERSIVE PHYSICAL AND GRAPHICAL VIRTUAL REALITY

(71) Applicant: Janet Broadway, Parhump, NV (US)

(72) Inventor: Janet Broadway, Parhump, NV (US)

( * ) Notice: Subject to any disclaimer, the term of this patent is extended or adjusted under 35 U.S.C. 154(b) by 0 days.

(21) Appl. No.: 17/748,802

(22) Filed: May 19, 2022

(65) Prior Publication Data

US 2023/0377275 A1 Nov. 23, 2023

(51) Int. Cl.
*G06T 19/00* (2011.01)
*G06F 3/01* (2006.01)
*G06T 15/00* (2011.01)

(52) U.S. Cl.
CPC ............ *G06T 19/003* (2013.01); *G06F 3/011* (2013.01); *G06F 3/016* (2013.01); *G06T 15/005* (2013.01); *G06F 2203/012* (2013.01)

(58) Field of Classification Search
None
See application file for complete search history.

(56) References Cited

U.S. PATENT DOCUMENTS 10,444,827 B2* 10/2019 Bahrami ................ G06F 3/011
10,874,952 B2 12/2020 Sofman
10,904,374 B2 1/2021 Spivack
11,003,499 B1 5/2021 Abretske
11,301,045 B1* 4/2022 Berme .................... G06F 3/016
12,250,362 B1* 3/2025 Berme ................. H04N 13/351
2015/0306496 A1* 10/2015 Haseltine ................ A63F 13/24 463/31
2016/0275722 A1* 9/2016 Bretschneider ....... A63F 13/323
2016/0275809 A1* 9/2016 Cho ........................ G06F 3/011
2018/0178123 A1* 6/2018 Goetgeluk ............ A63F 13/211
2019/0221030 A1* 7/2019 Griffin ...................... A63J 1/02
2021/0026441 A1 1/2021 Spivack
2021/0216349 A1 7/2021 Munro
2021/0333864 A1* 10/2021 Harvey ................. G06T 19/006
2021/0366193 A1* 11/2021 Goetgeluk ........... G11B 27/031
2021/0370129 A1* 12/2021 Yang ................. A63B 22/0023

(Continued)

FOREIGN PATENT DOCUMENTS

EP 3621712 B1 3/2021

OTHER PUBLICATIONS

"Protean Kinematics: A Blended Model of VR Physics".

*Primary Examiner* — Michael J Cobb

(57) ABSTRACT

A system for immersive physical and graphical virtual reality includes a physical render device internal to the system configured as means for providing a physical 3D world space for a user of the physical render device, an external system configured as a means for providing a graphical 3D world space for a user of the system for immersive physical and graphical virtual reality, and a bridge configured for communicatively coupling the physical render device and the external system for generating a graphical 3D world space, wherein a communicatively coupled internal physical render device for generating 3D world space and external system for generating a graphical 3D world space exchange and synchronize the members of 3D technology providing for 3D motion and 3D interactions within and about a 3D world space world spaces and graphical 3D world spaces such that a user is physically engaged with the physical render device configured as a physical 3D world space providing immersive physical virtual reality.

1 Claim, 38 Drawing Sheets

(56) References Cited

U.S. PATENT DOCUMENTS

2022/0084272 A1 3/2022 Wang
2022/0152452 A1* 5/2022 Fung ...................... A63B 23/04
710/1

* cited by examiner

SYSTEM FOR IMMERSIVE PHYSICAL AND GRAPHICAL VIRTUAL REALITY

FIELD OF TECHNOLOGY

This disclosure relates generally to data processing devices and, more particularly, to a system utilizing a device configured to create a three dimensional physical world space which may provide a physical virtual reality for a user. The configured device of the system may be communicatively coupled and synchronized with a graphical three dimensional world space providing a visual virtual reality for the user. The synchronized physical and graphical providing an immersive virtual reality for the user.

SUMMARY

A system which may include a physical render device, the methods for configuration of the physical render device may allow for the generation of a physical version of a 3D world space, including a global reference point, ground plane, one or more physical device objects, at least one device object configured as a user agent 3D control object. A user's physical interactions with the physical version of a 3D world space which may allow a physical control of 3D interactions and physical render of 3D motion for the physical 3D world space including of one or more physical device objects including the at least one device object configured as a user agent. The physical control and physical render may create a fully physical immersion in the physical 3D world space of the present invention.

Additionally, the system which may include a bridge utility, the methods for configuration of the bridge utility may allow that the physical version of 3D world space be coupled and synchronized with an external 3D world space including the 3D objects within the 3D world space. Wherein the external 3D world space providing a graphic render of the 3D world space as a visually relatable virtual environment. The synchronized physical world space and the communicatively coupled and synchronized virtual environment provided by graphic 3D world space of the system may provide a user of the system with a fully immersive virtual reality.

BACKGROUND

Virtual reality is a computer-generated simulation of a three-dimensional virtual environment that can be interacted with by a person using electronic input and/or output equipment and/or devices. Virtual environments have a wide variety of uses, for example ranging from industry (e.g., training simulations in virtual models of facilities) to entertainment (e.g., massive multiplayer online computer games), education (e.g., virtual museum tours) to sales (e.g., a virtual tour of real estate).

The underlying 3D "three dimensional" technology, specifically the 3D technology relatable to 3D motion of 3D objects in a 3D world space may be used by virtual environments which may allow a user of the virtual environment to navigate and/or explore graphic and/or visual render of a virtual reality. A user of the underlying 3D technology may by using the input and/or output equipment and/or device to interact with an 3D control object for control of the 3D object and/or a 3D object associated with the 3D control object for and interaction and navigation by 3D motion which may allow for a 3D object to located and/or positioned in a 3D technology world space. Additionally in one or more embodiments the location and/or position of the 3D object in 3D world space may be used to graphically render (e.g., draw) a visually relatable and identifiable instance of the 3D control object and the associated 3D object (e.g., an avatar for the user, a vehicle such as an automobile and/or an airplane.) The 3D world space may have additional objects each identified by a location and/or position in 3D world space which may be graphically rendered as being visually relatable (e.g., rocks, trees, buildings etc.) to the user creating a visual virtual reality environment for the user. In one or more other embodiments such as a physical simulator, the render of the virtual environment may be physical, reproducing the motion of the 3D control object as mechanical physical motion by the equipment and/or input/output device as physical sensation for the user of the equipment and/or input output devices. Wherein the equipment and/or input/output device specific to the 3D object and relatable to the virtual environment for example, an equipment and/or input/output device may control and physically render an airplane, automobile etc.

By contrast the physical render device of the system of the present invention may physically generate the underlying 3D technology of a virtual reality providing a physical render as mechanical 3D motion which may result in a location and position of a physical 3D user agent control object and/or physical 3D device objects in a physical 3D world space. A user's physical interactions and/or physical activities may be a physical control of 3D interactions with a physical 3D user agent control object and/or physical 3D device objects in a physical 3D world space which may result in mechanical render of the physical control as 3D motion by the physical 3D user agent control object and/or physical 3D device objects in a physical 3D world space. A user of the system may then be immersed and experience as physical sensation a physical virtual reality provided by the physical 3D world space.

In further details of the present system the physical render device generating a 3D world space of the invention may be communicatively coupled for an exchange and/or synchronization of physical render and physical control world data with an external system of a virtual environment generating a 3D world space. Wherein the 3D world space using the underlying 3D technology providing a graphic render as 3D motion resulting in a location and position indicating where a 3D user agent control object and/or 3D objects might be graphically rendered in a graphical 3D virtual environment. The exchange and synchronization of physical world data and graphic 3D render data being the same type of data may then allow for physical interacts to control the location and position of where 3D object in the external system may be drawn. Additionally, the underlying 3D technology for a graphic location and position by an external 3D world space may be exchanged and synchronized with a physical world space which may allow for a physical render of the graphic 3D world space motion data.

It should therefore be appreciated, wherein the system configured to provide a physical 3D world space for a physical virtual reality for a user, wherein the physical 3D world space coupled with and synchronized with an external 3D world space which may provide a graphic and/or visual virtual reality for the user, the physical virtual reality in conjunction with the graphic virtual reality may then allow for a user to be immersed and experience a virtual environment both physically and graphically.

BRIEF DESCRIPTION OF THE DRAWINGS

FIG. 1 and FIG. 2 illustrates a physical 3D object instance comprised of one or more axial platform providing axes controls for 3D interactions and 3D motion for a physical device object. A control platform may allow a physical device object to be configured as device user agent which may allow for a physical control and physical render of a user of a physical render device.

FIG. 4*a* in conjunction with FIG. 4*b* and FIG. 3*a* may illustrate that values of axes controls axial behavior 3D interactions and axial responses of 3D motion of physical device object may be of the same type for values of 3D interactions and 3D motion as a prototypical 3D object.

FIG. 6 depicting an example placement and/or arrangement of the physical devices and/or components which may be utilized as the active components of axes control. Additionally, the example physical device object instance configured as a device user agent.

FIG. 6*a* in conjunction with FIG. 6*b* and FIG. 6 illustrates that a user's physical interaction with a physical device object instance configured as a device user agent may physically recreate the role aspects for control, navigation, world space interactions of a prototypical user agent 3D control object.

FIG. 8 in conjunction with FIG. 9*a* and FIG. 9*b* may illustrate that wherein a control platform accepting alternate variations of control appliances, each control appliance allowing for alternate methods for measuring a user's physical activity as the same type 3D axial action values for axes control.

FIG. 8 in conjunction with FIG. 9*a* and FIG. 9*b* may additionally illustrate that according to one or more embodiments a device object instance configured as a device user agent may physically recreate the user agent role aspects of user control, wherein the values of user control may be measurably accurate relative to a user's physical activities.

FIG. 10 in conjunction with FIG. 11 may illustrate According to one or more embodiments a first known kinematic/inverse mechanical response of the physical devices as active components of axes controls of an axial platform may determine the correlation and/or association of the mechanical response and the elements of axial action for a physical device object instance.

FIG. 14 depicts that an armature may have a IK chain and IK Bone which may provide an inverse kinematic response of the IK chain relative to a kinematic motion as applied to the IK bone.

FIG. 16*a* in conjunction with FIG. 16*b* depicts that the placement and/or arrangement of the physical devices/components of the mechanism an axial platform providing axes controls for axial actions of 3D motion may effect known kinematic and/or inverse kinematic mechanical responses relatable to axial actions of 3D motion for a prototypical 3D object.

Figure 16A:
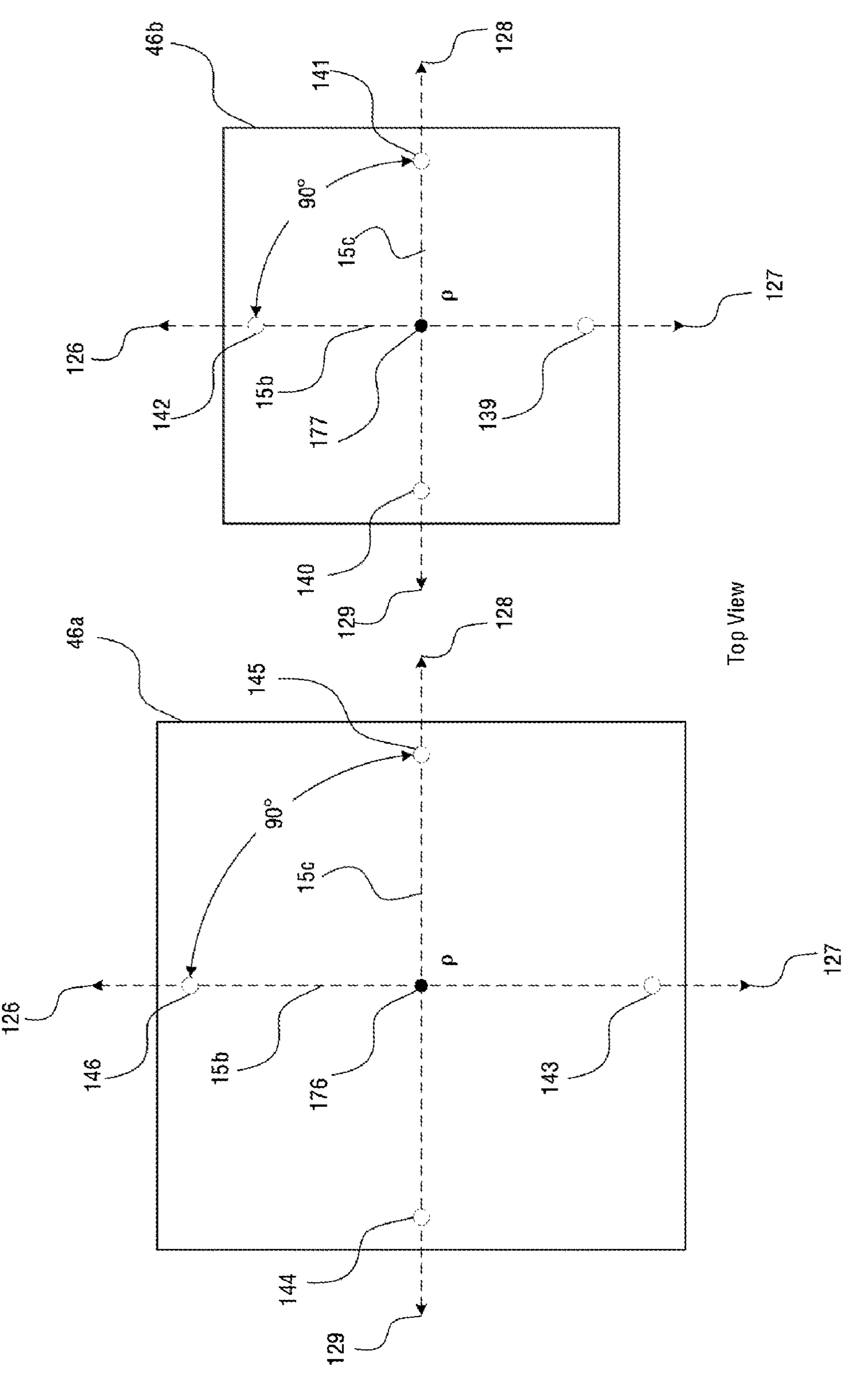
FIG. 16*a* illustrates a top view of the configuration of the mounting points for components of example parallel manipulator's base plate and manipulator plate of the parallel manipulator mechanism utilized as the mechanism of the example first axial platform of example physical device object.
Figure 16B:
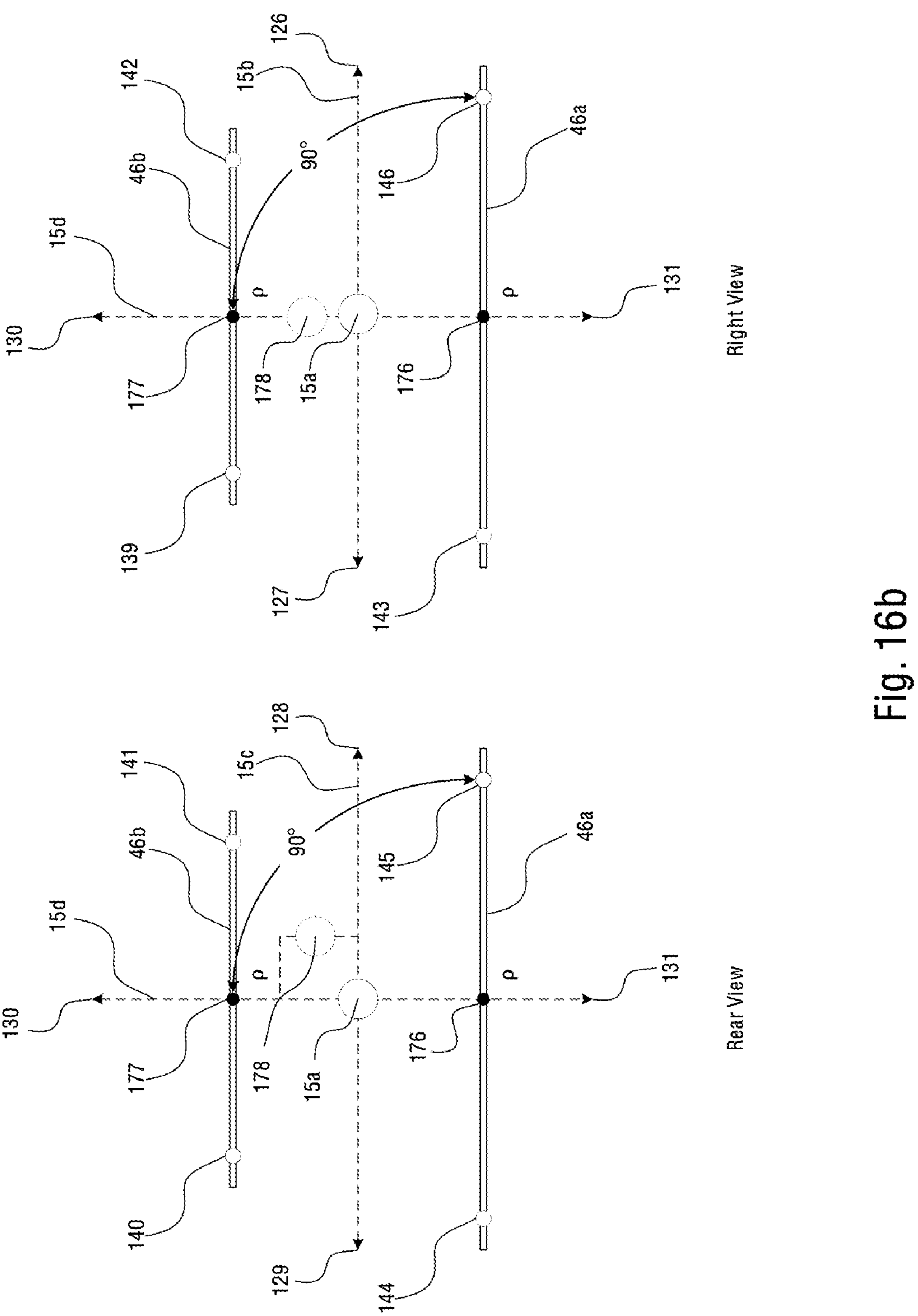
FIG. 16*b* illustrates a rear view and right side view of the configuration of the mounting points for components of example parallel manipulator's base plate and manipulator plate of the parallel manipulator mechanism utilized as the mechanism of the example first axial platform of example physical device object.

Additionally, FIG. 16*a* in conjunction with FIG. 16*b* may illustrate isolation of a first known axes control mechanical response may be used to determine the configuration and placement/arrangement of additional physical devices and/or components of a mechanism producing the known mechanical responses of 3D motion and acquisition 3D interactions of axial actions of a physical device object instance.

Figure 17:
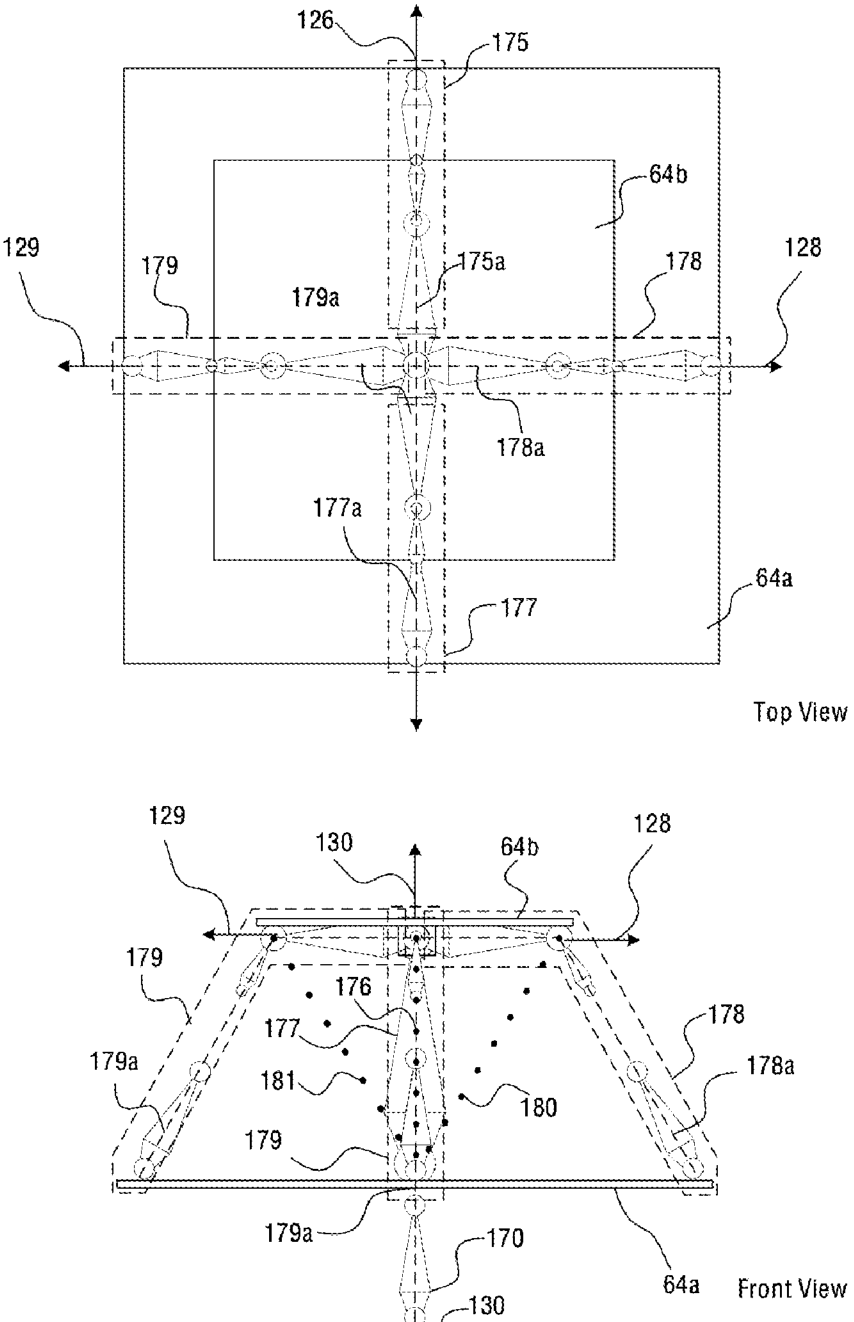

FIG. 17 illustrates a top view and front view the parallel manipulator mechanism of the example first axial platform. Wherein the axial platform which may have an armature applied enabling location constraints and/or rotation constraints for the bones of the armature. Additionally, the armature providing bone chains and IK chains for kinematic/inverse kinematics response of the armature.

Figure 18:
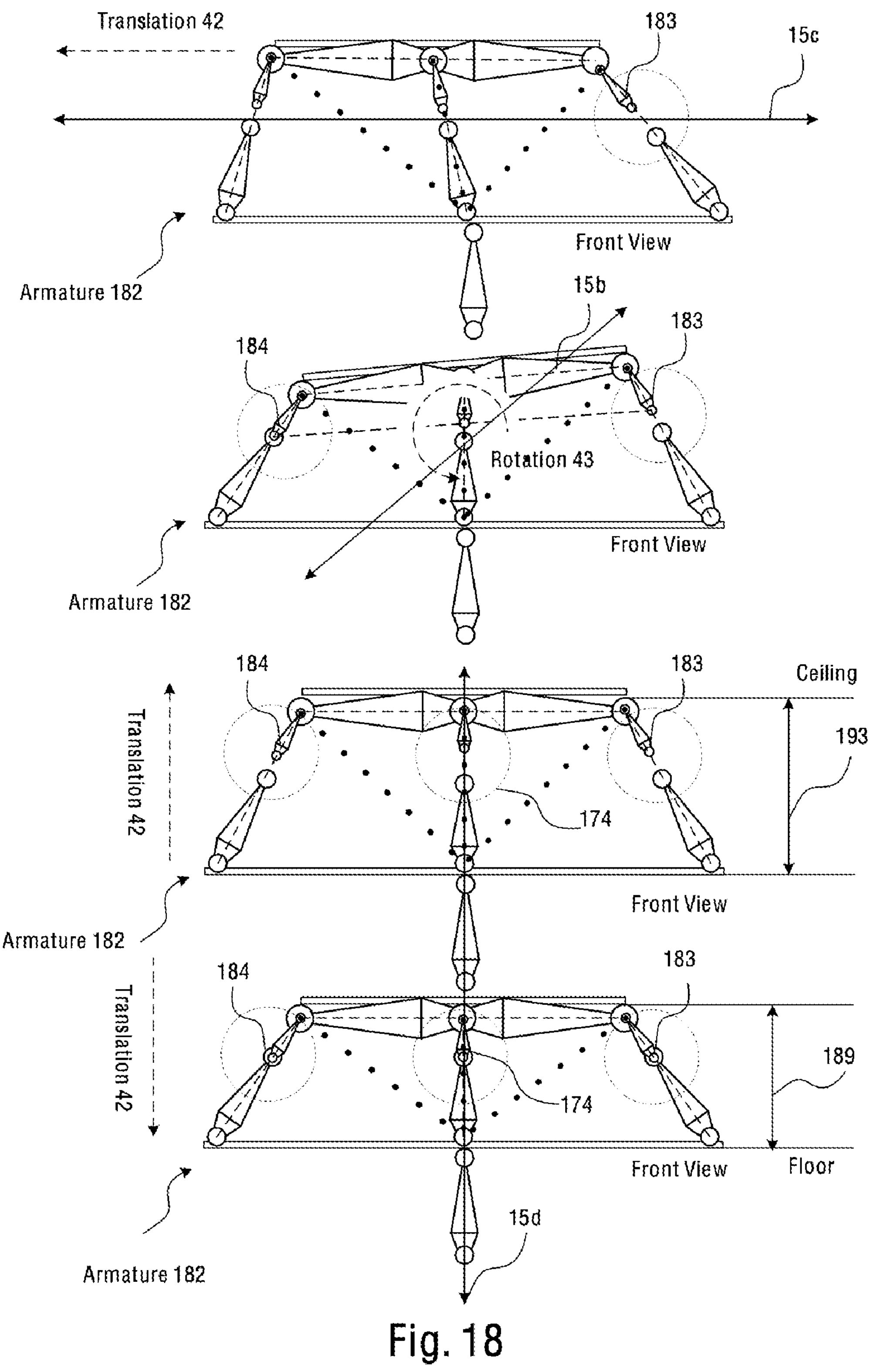

FIG. 18 depicts that axes control axial responses for axial actions of 3D motion may be enforced by the location constraints, rotation constraints, bone and IK chains of the applied armature, which may allow a mechanism to physically render 3D motion. The applied armature constraints known herein as axial constraints.

Figure 3A:
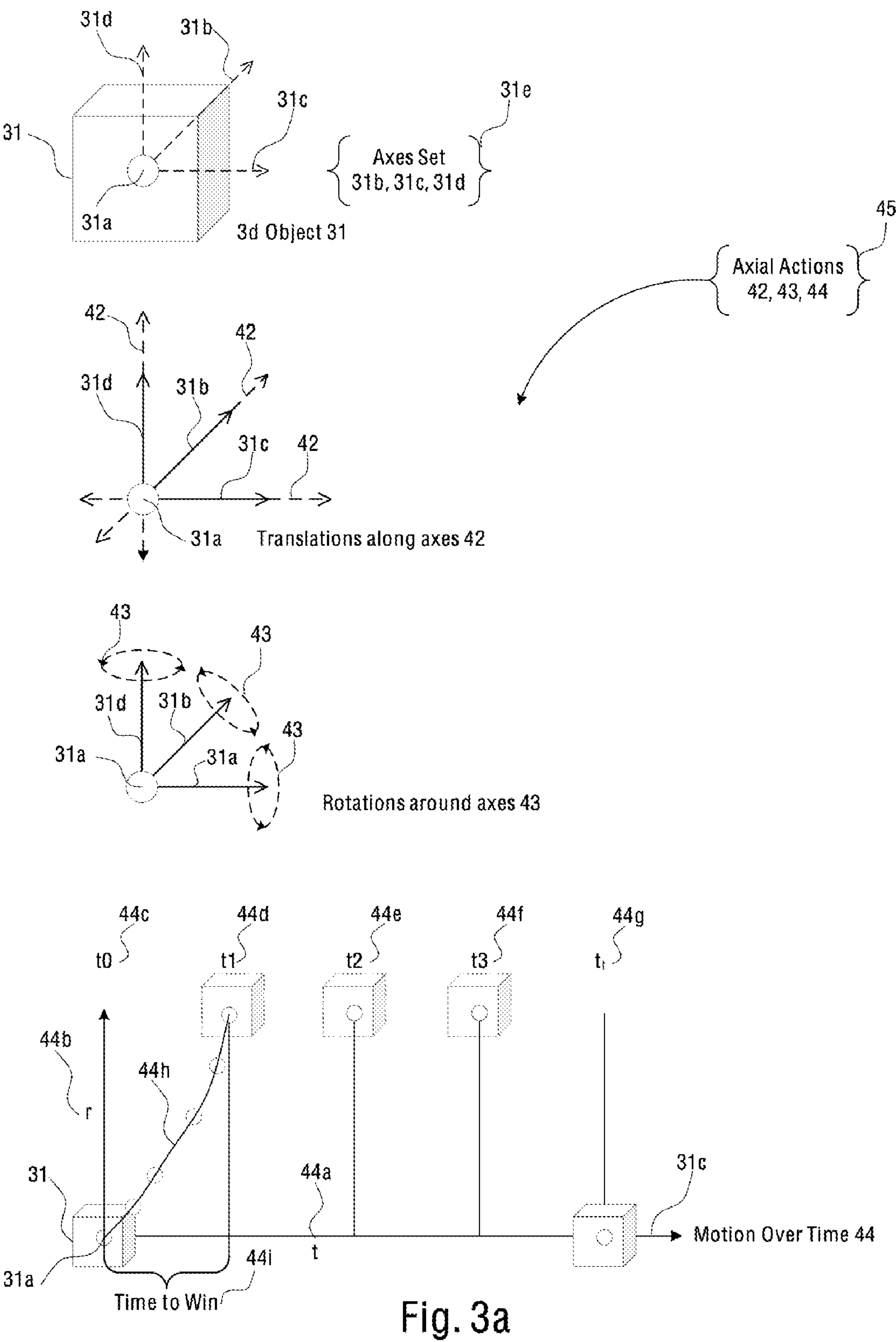
FIG. 3*a* illustrates the elements of underlying 3D technology for 3D interaction and 3D motion for a prototypical 3D object as known in the relevant art. The elements of 3D interaction and 3D motion may be known herein as axial actions.

FIG. 18 in conjunction with FIG. 16*b* and FIG. 3*a* may illustrate that application of axial constraints may allow for determination of a device object's origin point which may allow for a recreation of physical render and physical control of axial actions as 3D interactions and 3D motions of a prototypical 3D object.

Figure 19:
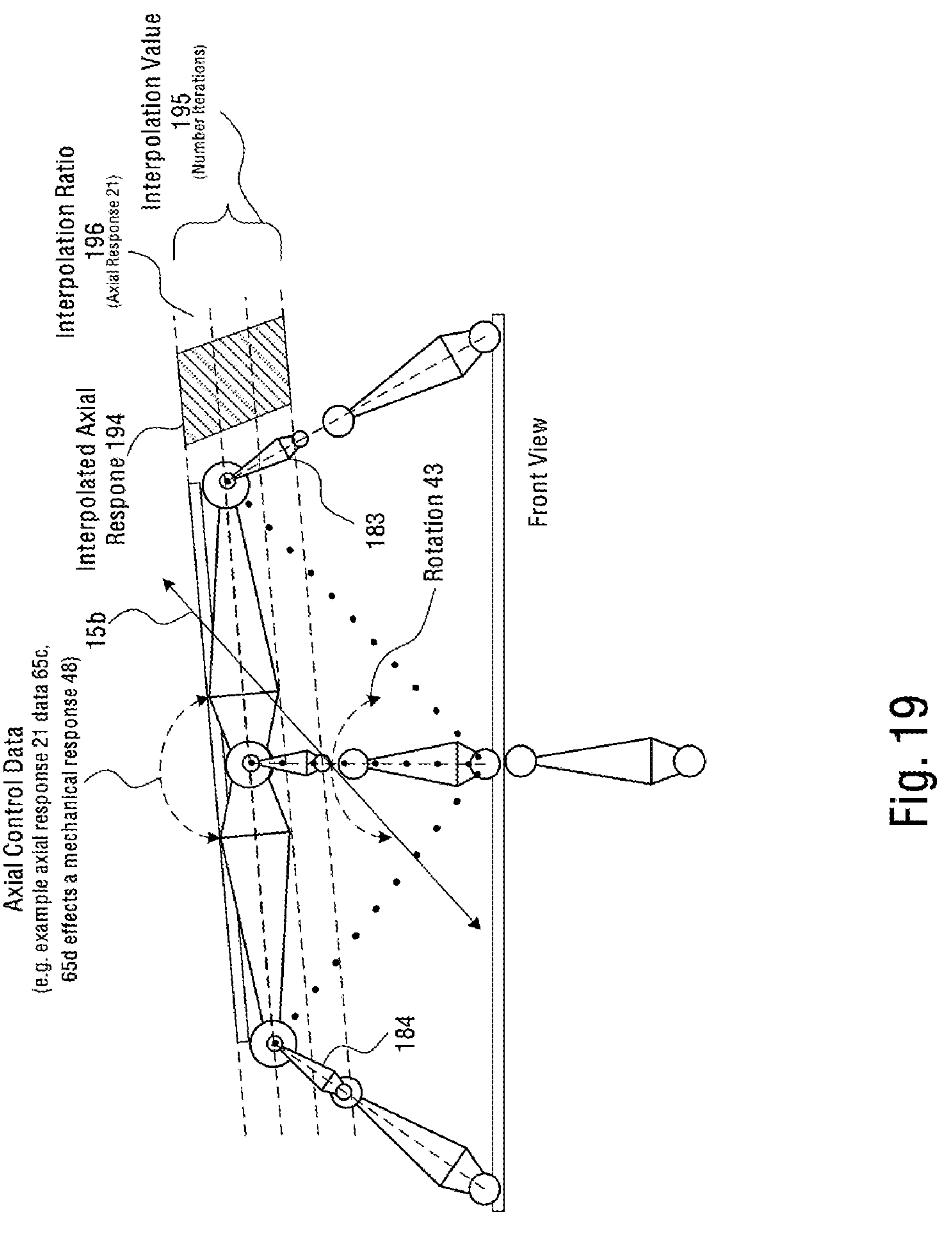

FIG. 19 illustrates that the values of axial constraints may be interpolated. According to one or more embodiments interpolation of the values of axes controls and axial constraints may work to mitigate the physical constraints of a mechanisms allowed by mechanism's degrees of mechanical freedom.

Figure 20:
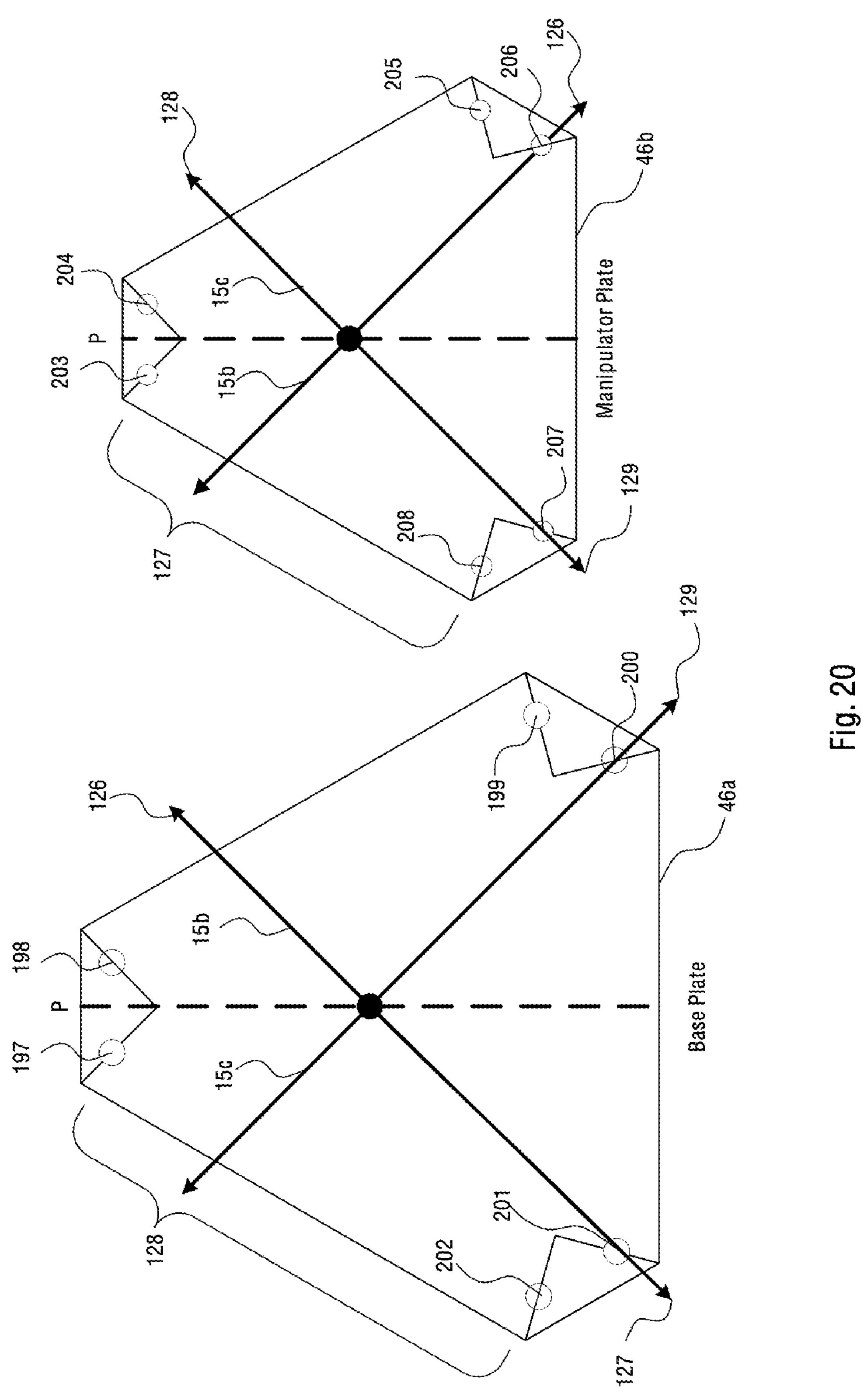

FIG. 20 illustrates an alternate top view of a base plate and manipulator plate of a parallel manipulator mechanism utilized for the example first axial platform. The alternate configuration which may be used alternately and/or replace the configuration of the placement and/or arrangement of the components of example axial platform of FIG. 11.

Figure 21:
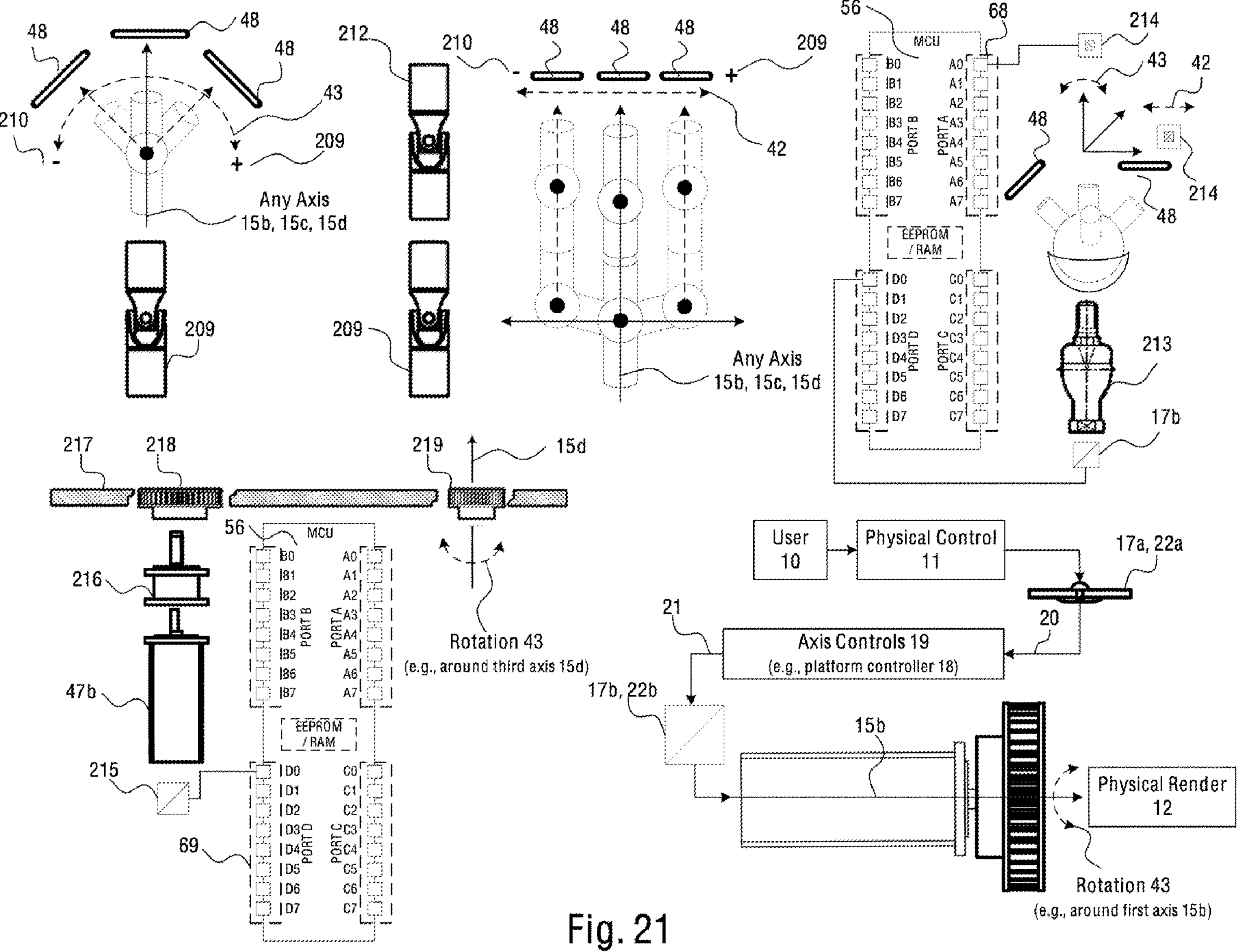

FIG. 21 depicts various mechanical components and various mechanical mechanisms alternate to a parallel manipulator which may be used in one or more axial platform providing axes controls for axial action of 3D motion.

Figure 2:
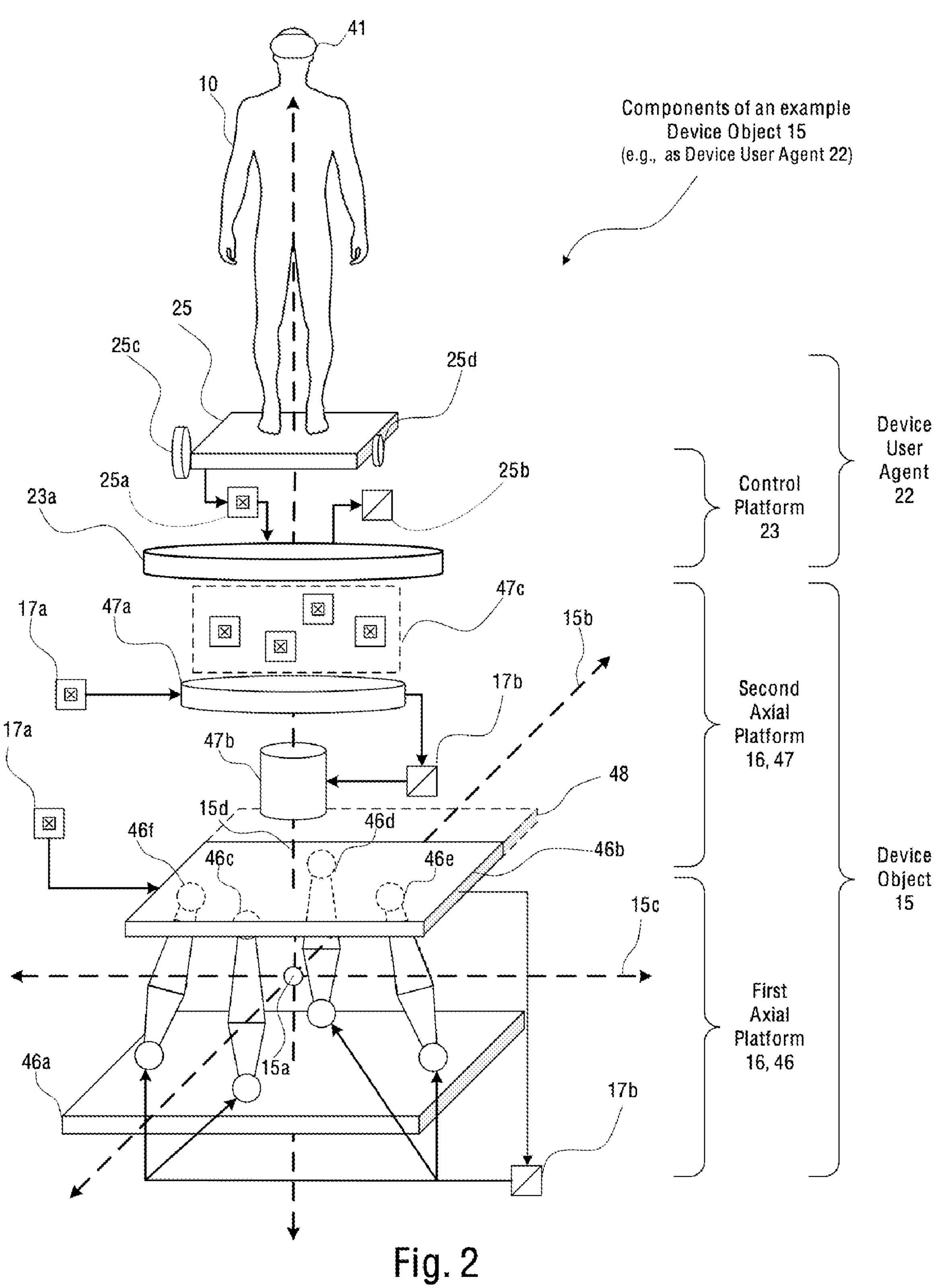
FIG. 2 is a diagram of the components of an example physical 3D device object instance of the physical 3D world space. The physical device object instance configured as a physical device user agent which may be used as a 3D control object.
Figure 6A:
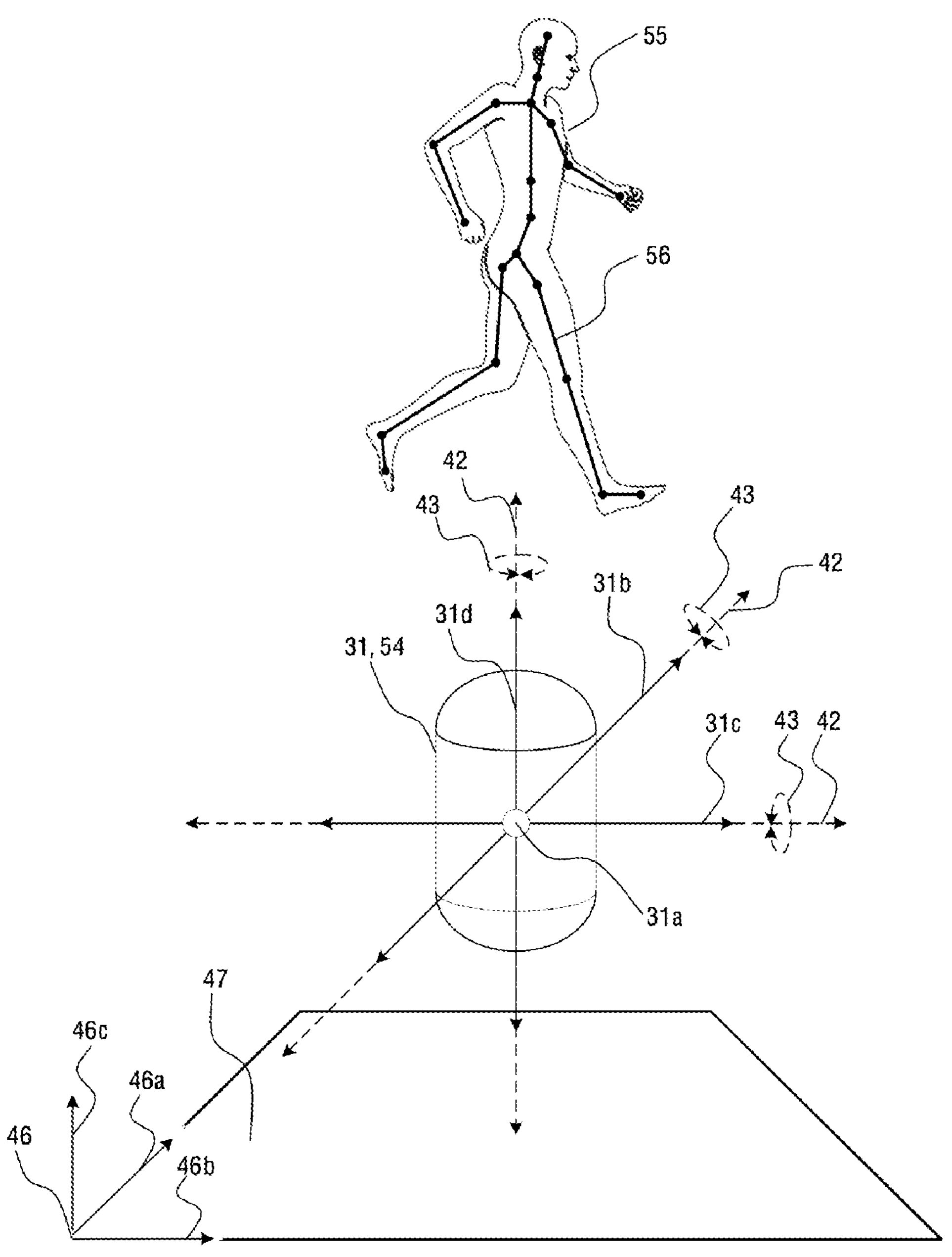
FIG. 6*a* may be a more detailed illustration of the elements of axial actions and role aspects for control, navigation, world space interactions for the prototypical user agent 3D control object of FIG. 3*c*.
Figure 6B:
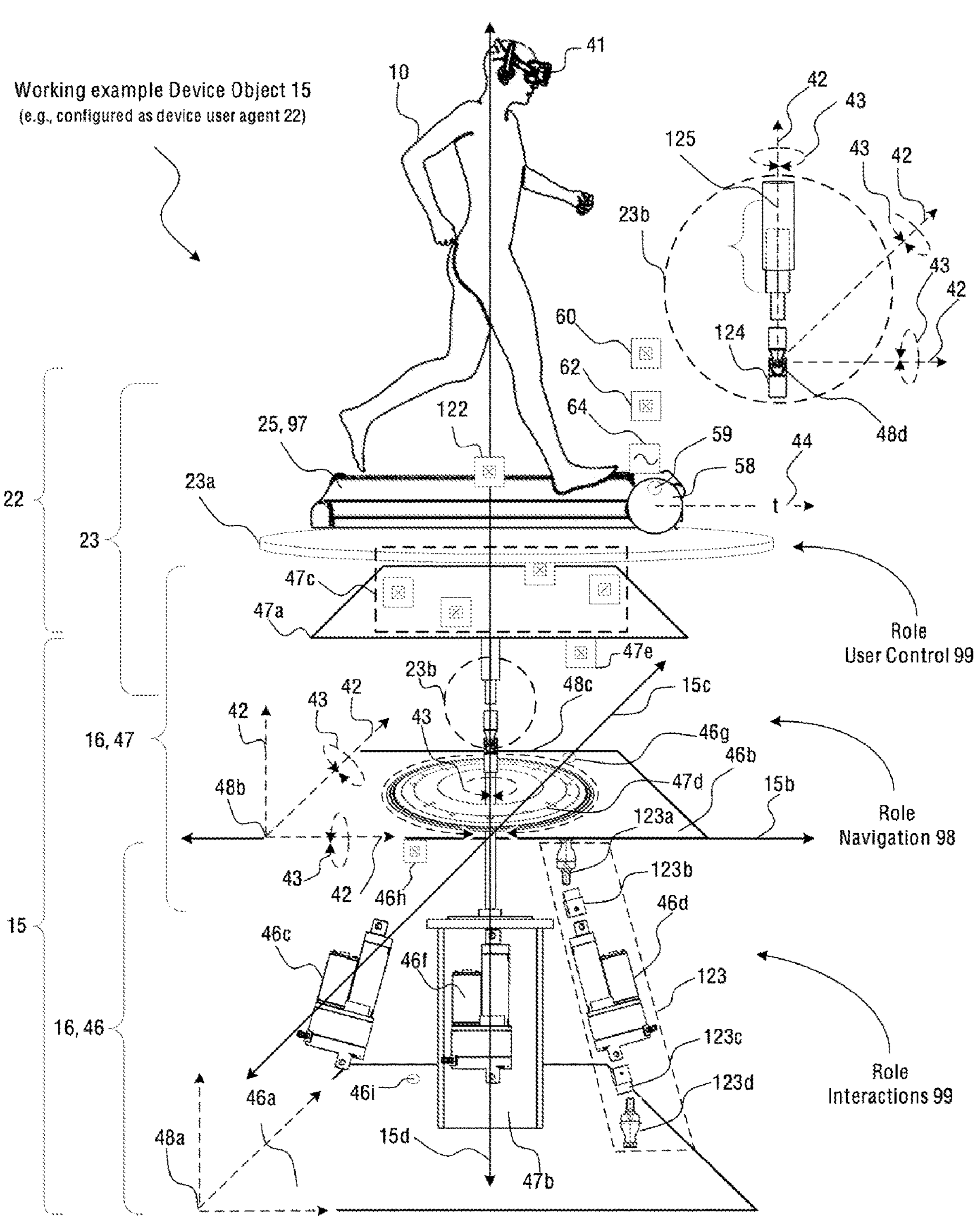
FIG. 6*b* is an exploded view of an example working mechanical construction of an example working embodiment of physical device object instance.

FIG. 20 in conjunction with FIG. 21 may allow that mechanical components and/or mechanical mechanism subassemblies of the axial platform providing axes controls for a device object instance may be alternate to and/or replace the mechanical components and/or mechanical mechanisms of the example device object instances of FIG. 2 and/or FIG. 6*b*.

Figure 22:
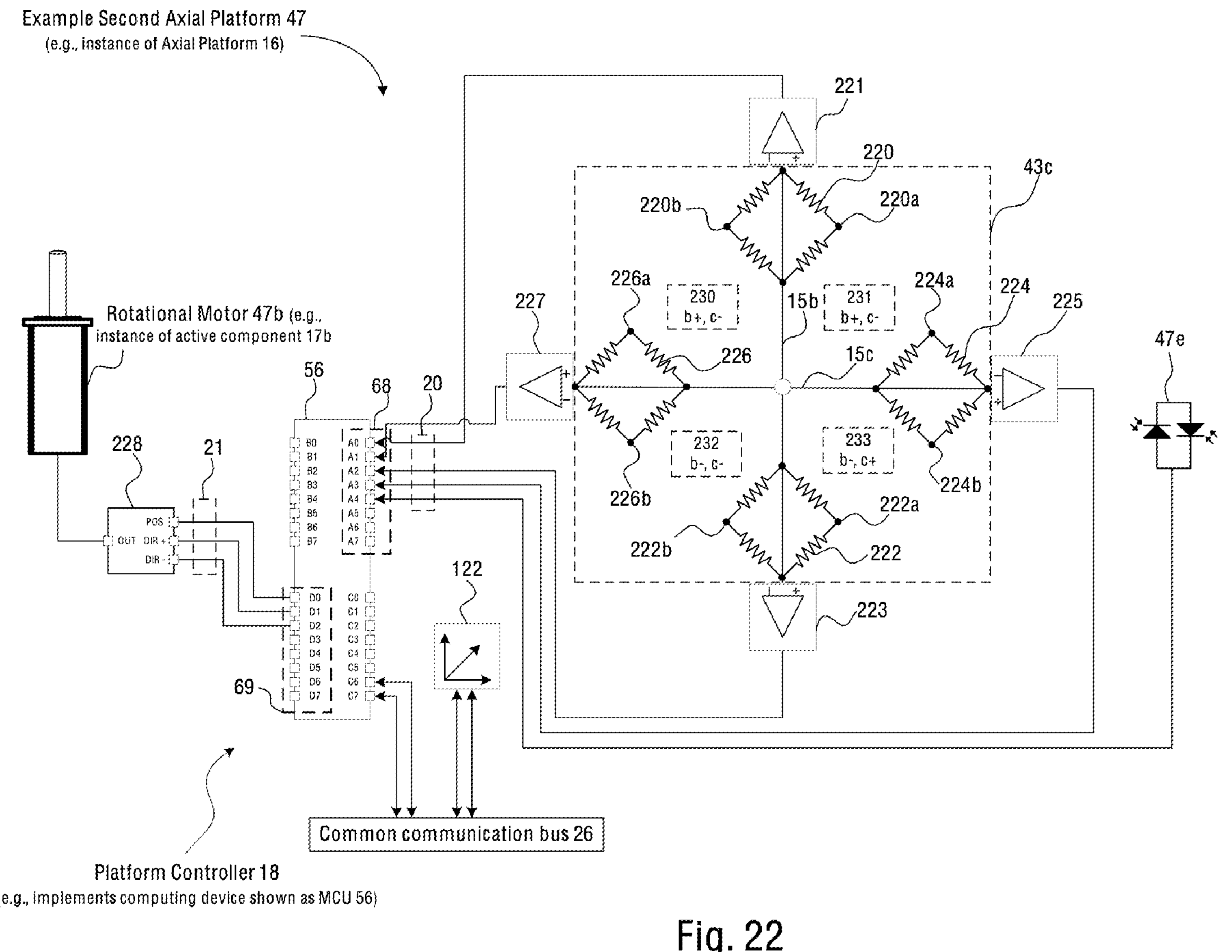

FIG. 22 is a diagram depicting the communicative coupling of the physical device components which may be the active components for the example second axial platform which may provide axes controls for control of axial action of one or more axial elements for the example working device object instance of FIG. 2 and/or FIG. 6*b*.

Figure 23:
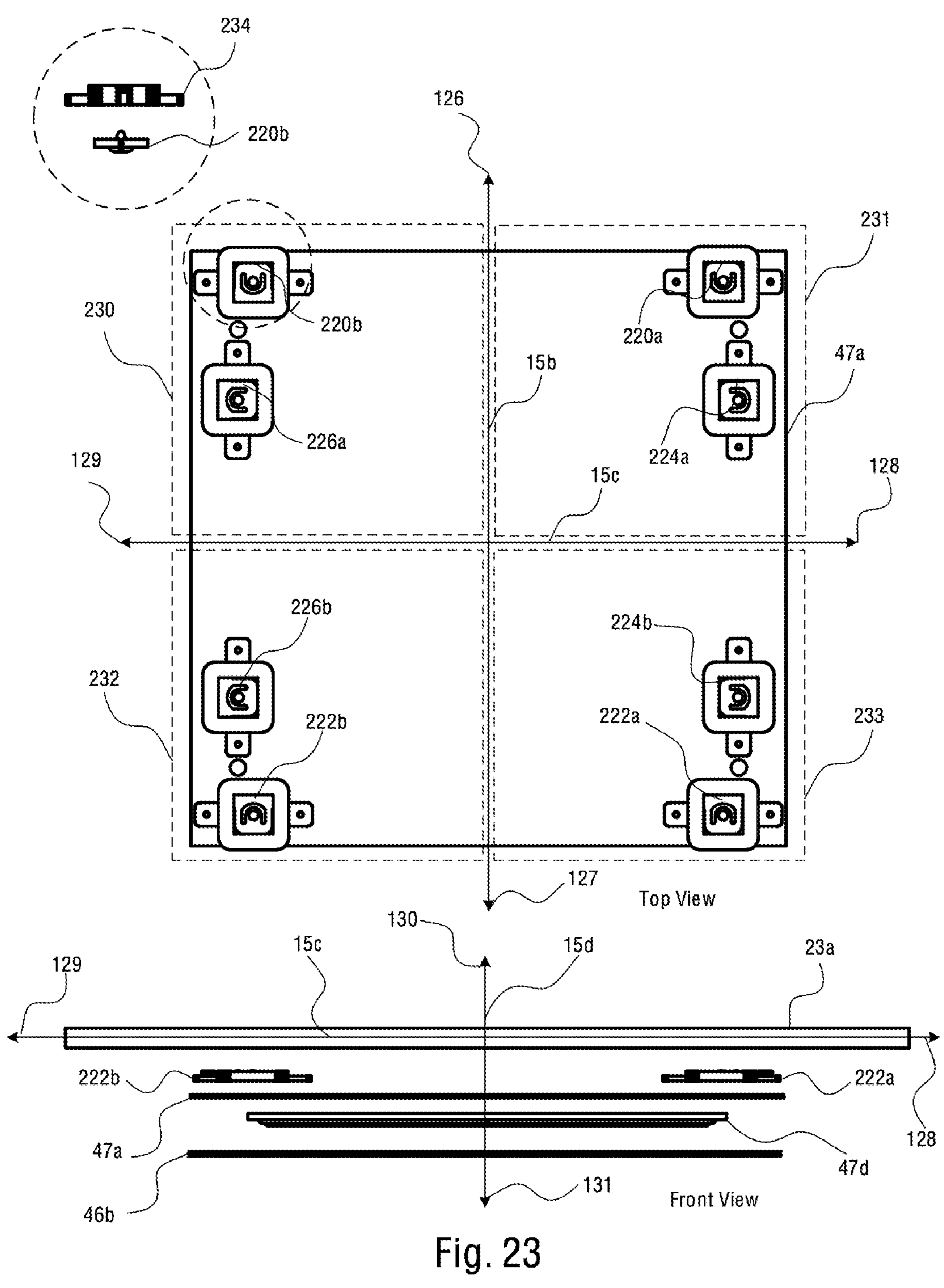

FIG. 23 depicts a top view of a plate comprising a rotational mechanism and side view of the rotational mechanism, wherein the rotational mechanism may be the mechanism of the example second axial platform of FIG. 2 and FIG. 6*b*. FIG. 23 additionally illustrates the configuration of active components on the top plate of the axial platform which may be utilized for acquisition of axes control axial behavior input as values of a user's physical interactions with a physical device object.

Figure 24:
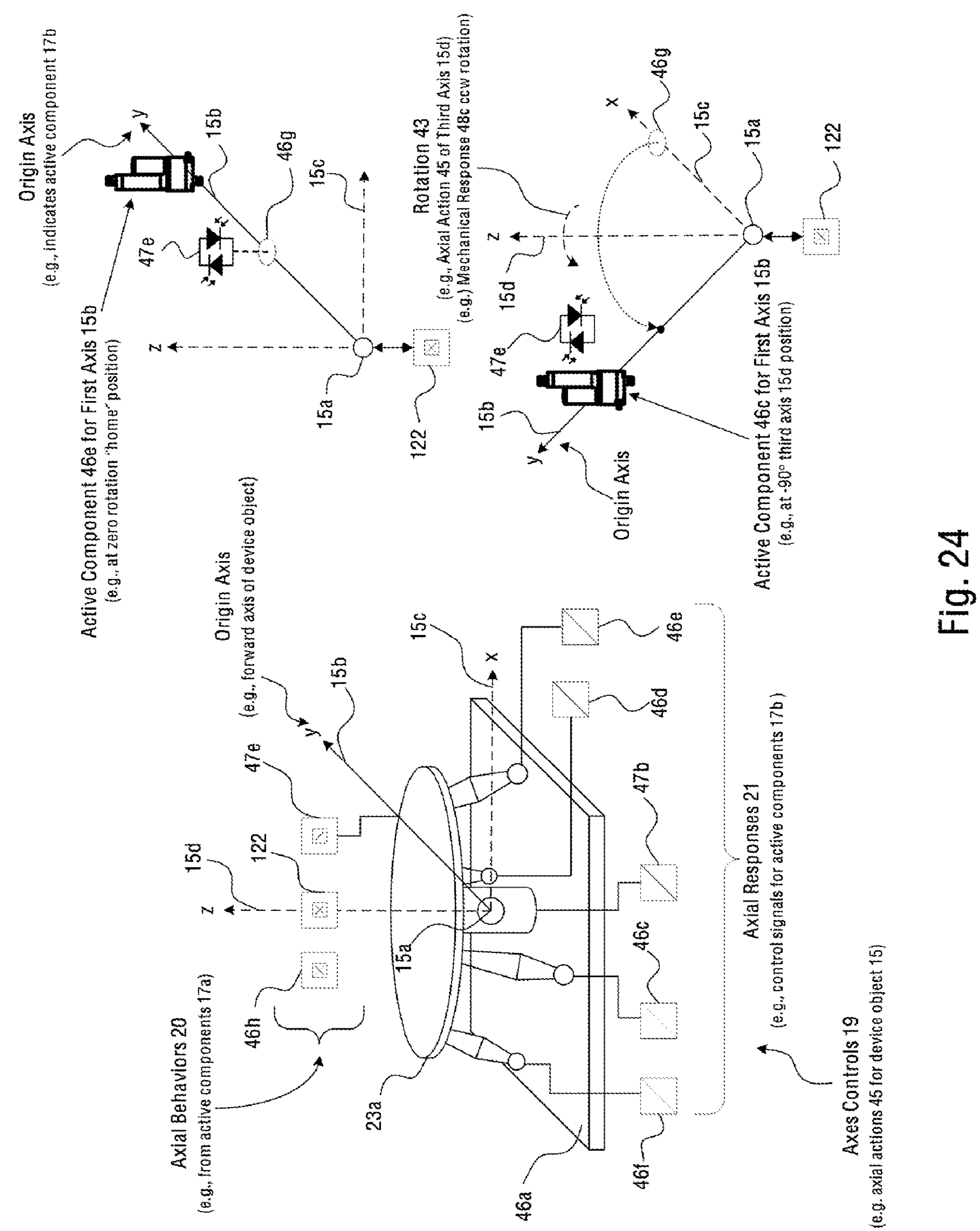

FIG. 24 depicts an example device object instance comprised of two axial platforms, wherein the mechanisms of the two platforms mechanically and communicatively coupled. FIG. 24 additionally introduces an origin axis which may be useful in locking the axes controls of each axial platform together which may allow the collective axial platforms to physically render axial actions of 3D motions and acquire physical control of axial action interaction as a collective physical device object.

Figure 25:
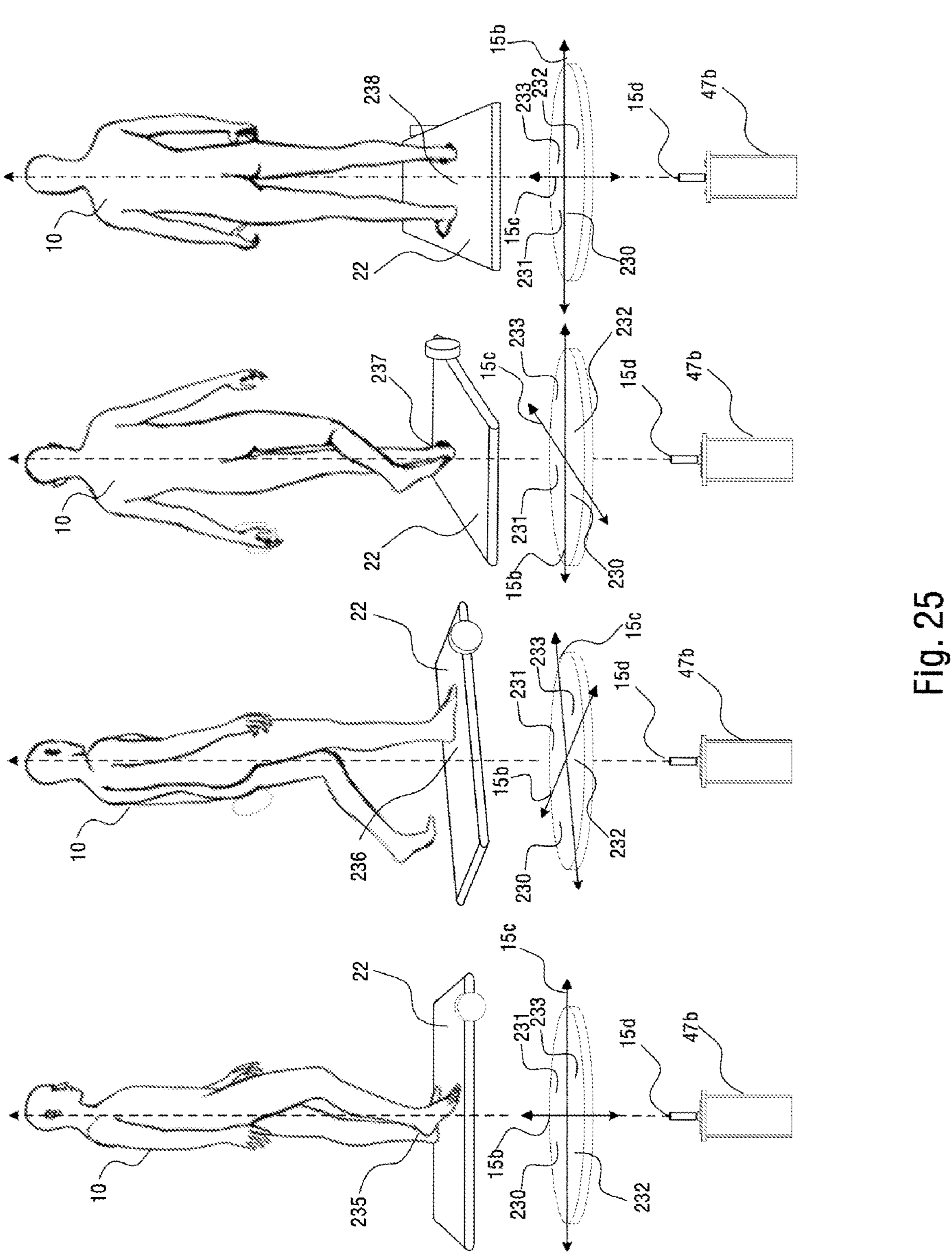

FIG. 25 illustrates a user's physical interaction with an example device object instance configured as a device user agent over four time instances. Additionally depicted the combined user's interactions measured by the axial platforms axes controls of the device object instance and the user's physical activity measured by axes controls of user control platforms may allow a device user agent to navigate the physical device world space provided by the physical render device.

Figure 26:
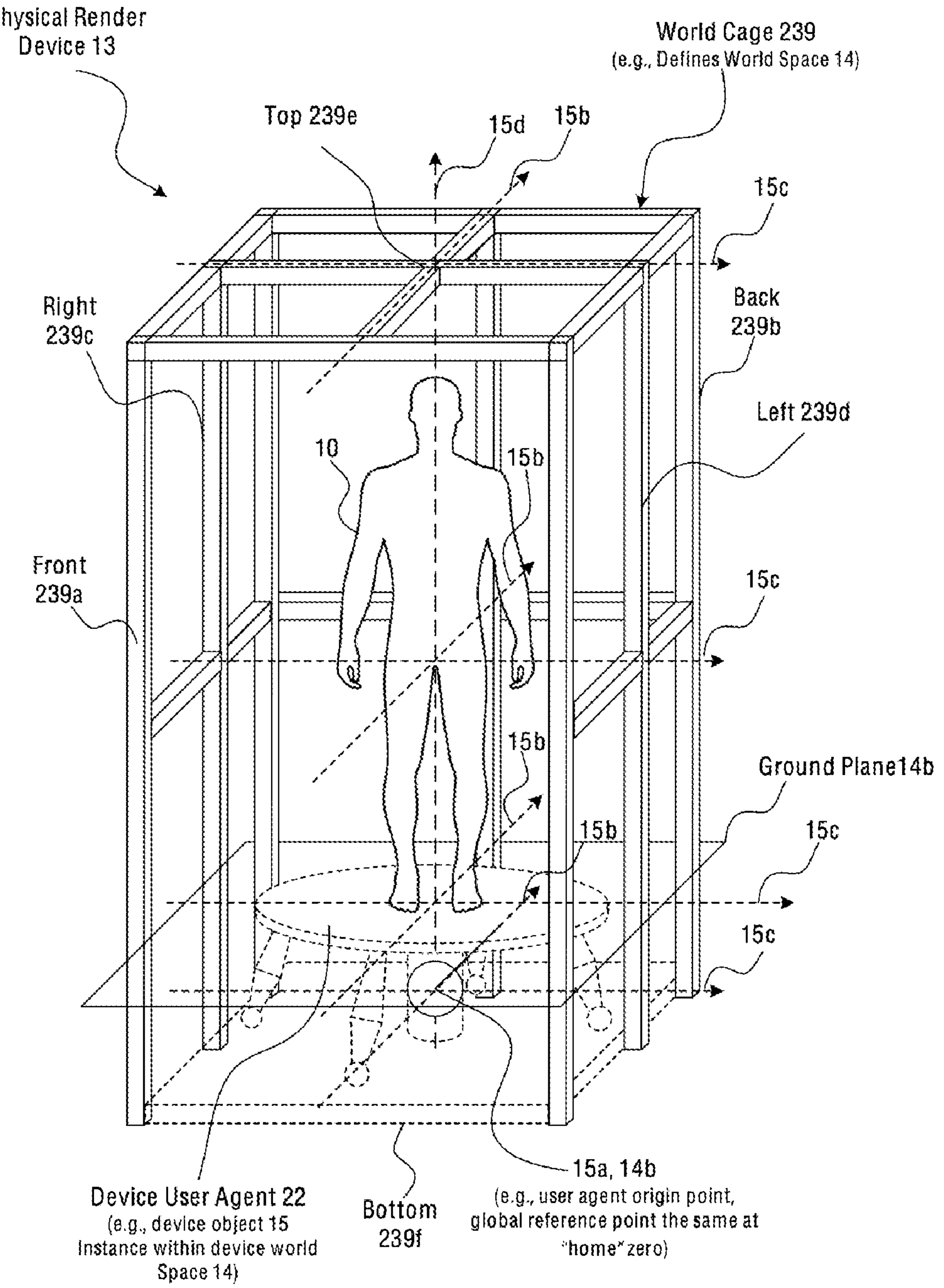

FIG. 26 illustrates a world cage exostructure implemented around the axial platforms and control platform of the example device object instance configured as a device user agent. Additionally shown, the configuration of a world cage's physical structure may be useful in the creation of a physical device world space by the physical render device.

Figure 27:
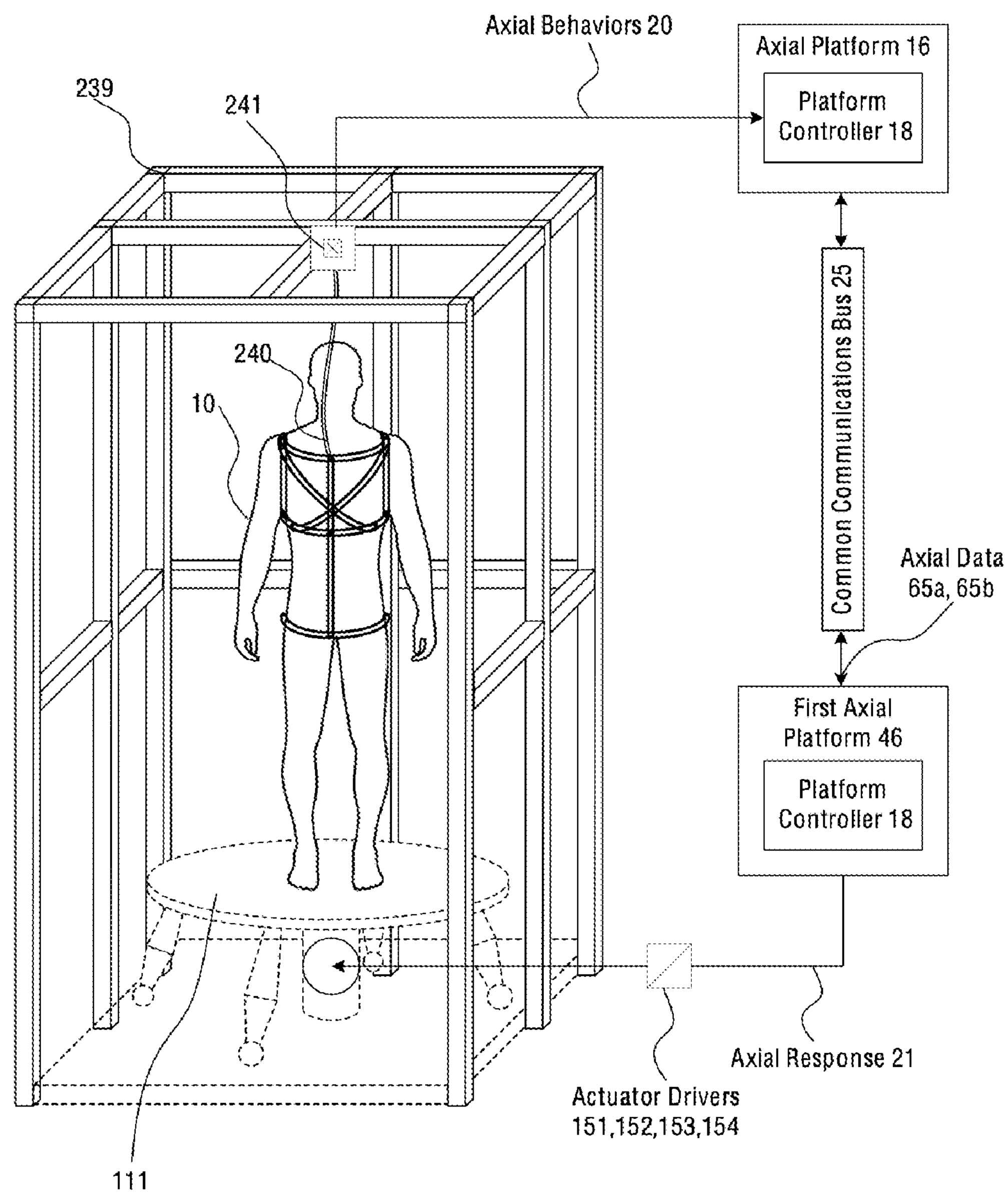

FIG. 27 illustrates the user of a physical render device physically interacting with a gravity band attached to an inverted two axis joystick, the two axis joystick mounted to the world cage. Additionally, the user's physical interaction and or physical activity measured as an axes control of axial action relative to physical device world space which may then allow for the inclusion of physics for the physical device world space.

Figure 28:
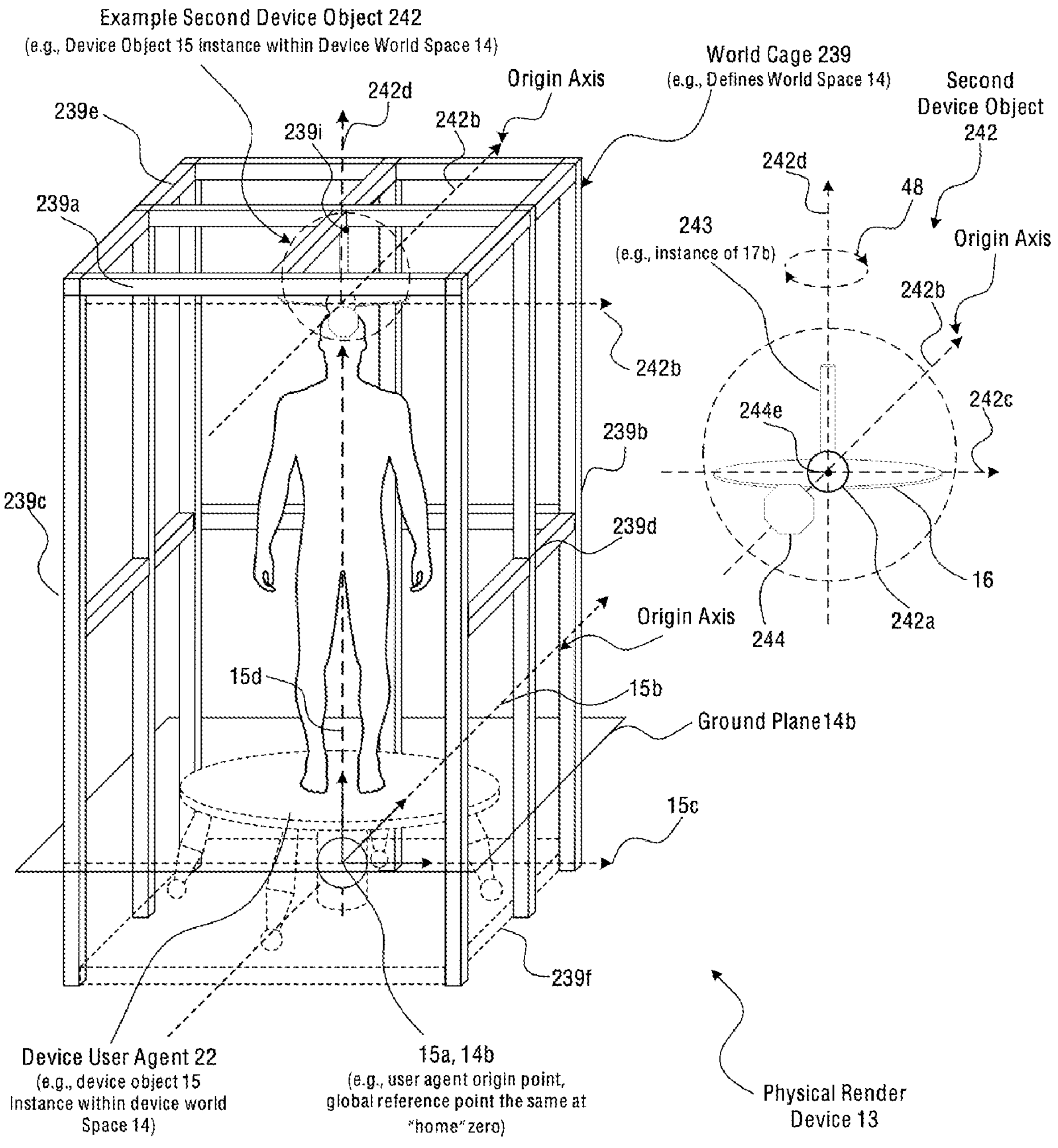

FIG. 28 depicting a second example device object comprised of a mechanism having an axial platform wherein the axial platform may provide for axis controls for axial behavior interactions and axial behaviors of the example second device object instance. Additionally, the placement and/or arrangement of the second example device object and the structural configuration of the world cage may determine axes controls for the second device object.

Figure 29:
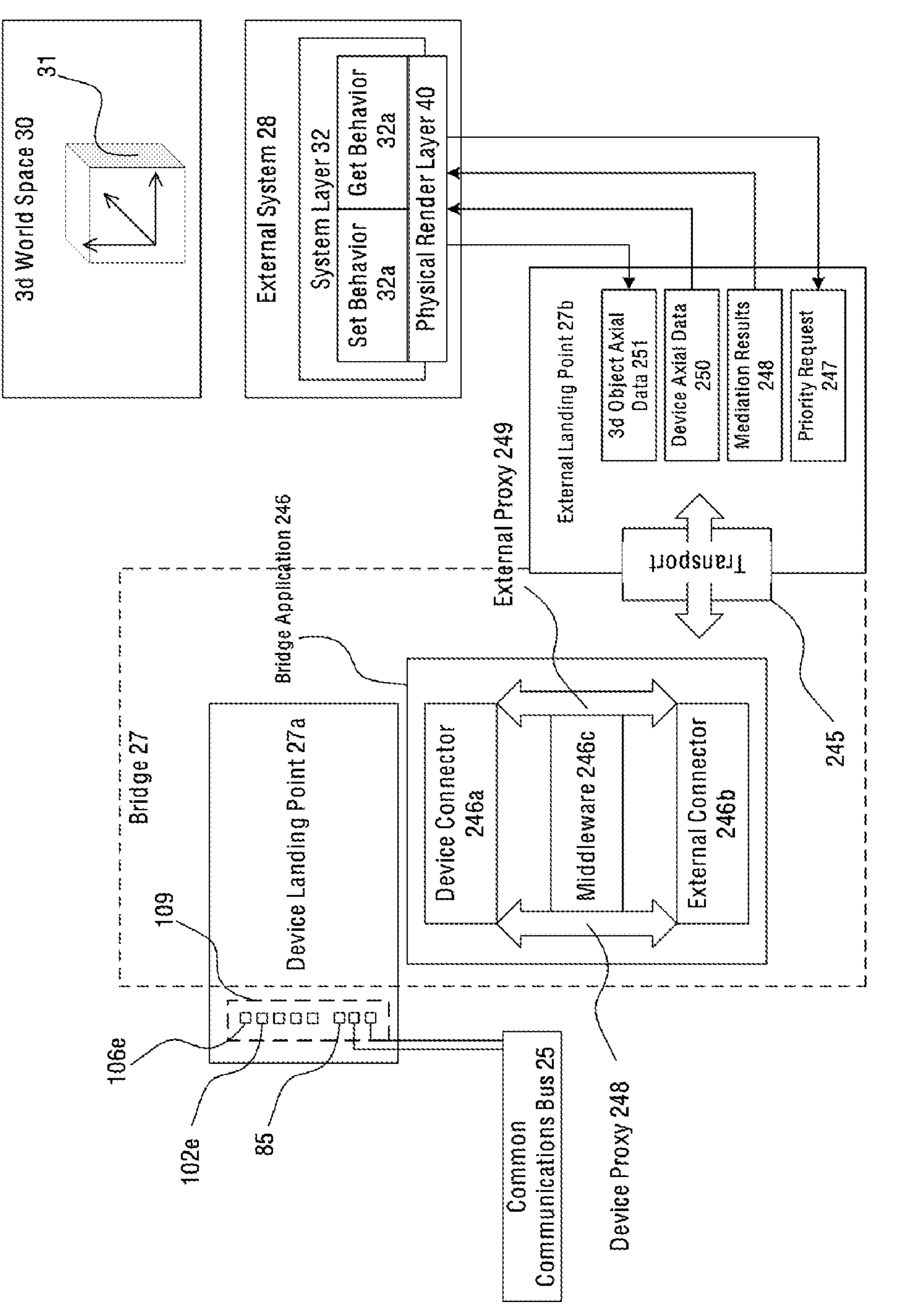

FIG. 29 is an illustration of a bridge platform which may be useful for bidirectionally communicatively coupling the physical render device with an external system providing a 3D world space. Upon coupling the physical 3D world space and external 3D world spaces may be synchronized for physical render and physical control.

Figure 30A:
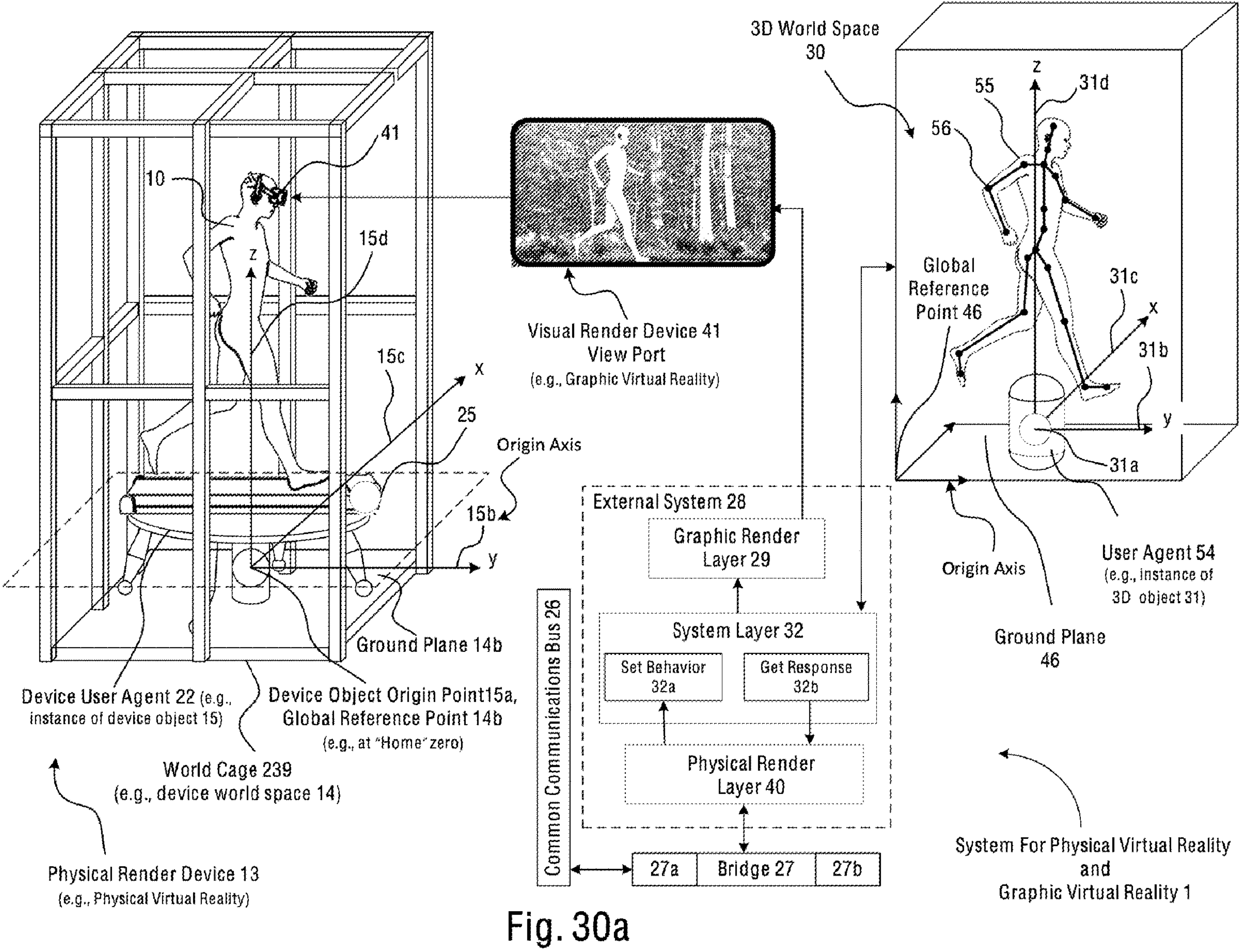

FIG. 30*a* illustrating a working example operational scenario for one or more embodiments the system providing an immersive physical and graphic virtual reality experience by a user of the system.

Figure 30B:
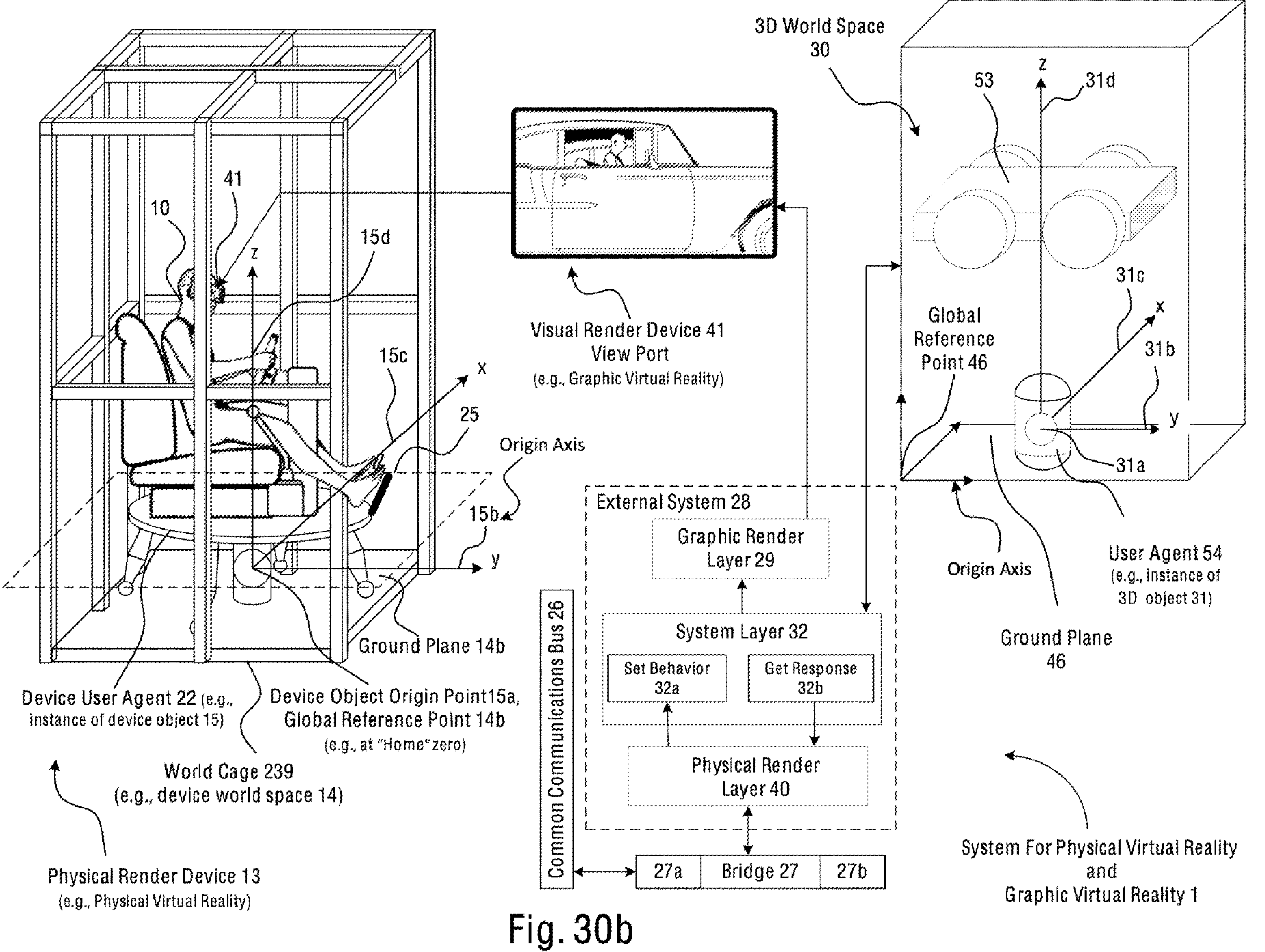

FIG. 30*b* illustrating a working example operational scenario wherein the control appliance has been replaced for one or more embodiments the system providing an immersive physical and graphic virtual reality experience by a user of the system.

FIG. 30*a* in conjunction with FIG. 30*b* may illustrate that physically rendering 3D motions and 3D interactions for an internal device user agent 3D object and not an external 3D graphic render object may allow for a more diverse virtual reality experience for a user of the system for physical virtual reality and graphic virtual reality.

DETAILED DESCRIPTION

Disclosed are a methods for system configured to provide a physically and graphically immersive virtual reality experience for a user of such system. According to one or more embodiments a device included in system configured to generate a physical 3D world space internal to the device. The physical 3D world space may provide a physical virtual reality for a user of the system. The device of the system may then be communicatively coupled with an external system which may generate an external graphical 3D world space. An external graphical 3D world space may then be rendered a visually relatable virtual reality for a user. Wherein the data types for the physical world space and graphical world space which may be compatible, the data of the physical 3d world space and graphic 3D world space may be bidirectionally exchange and synchronized. Accordingly, it should therefore be appreciated that one or more embodiments of such a system as configured herein may then provide an immersive physical and graphical virtual reality experience for a user of such system.

Although the present embodiments have been described with reference to specific example embodiments, it will be evident that various modifications and changes may be made to these embodiments without departing from the broader spirit and scope of the various embodiments.

Figure 1:
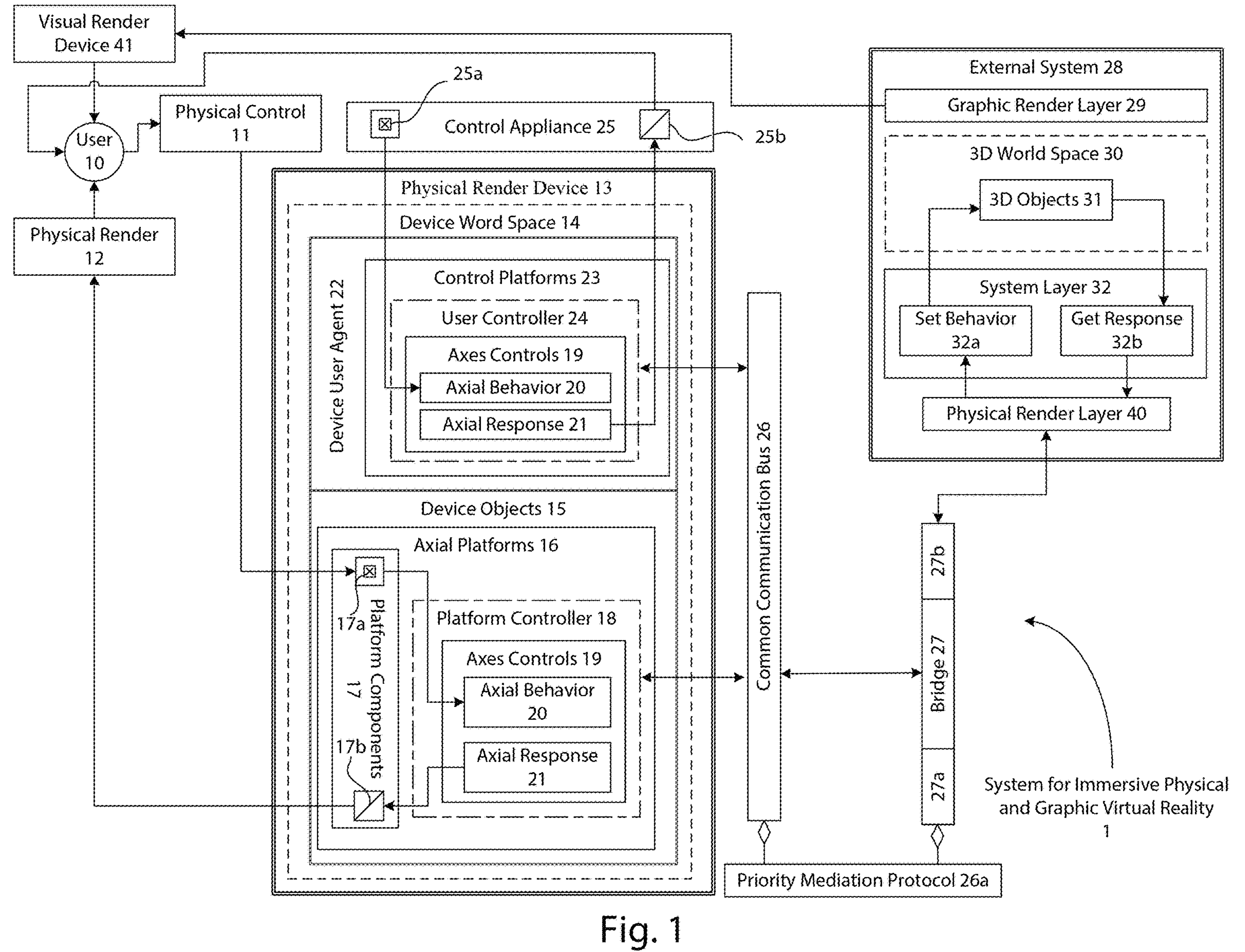
FIG. 1 is a block diagram for system configured to provide a user with an immersive physical and graphical virtual reality.

FIG. 1 illustrates a system comprised of a physical render device 13 configured to generate a physical 3D device world space 14 which may include one or more 3D physical device object 15 instances. At least one device object 15 instance may be configured as a device user agent 22 which may be a 3D control for the device object 15 instance according to one or more embodiments.

In one or more embodiments and as illustrated in FIG. 1 a physical render device 13 of the system may include a common communication bus 26 communicatively coupling the one or more device object 15 instances and the device world space 14 for data exchange internal to the system. Additionally, the flow of data exchange over the common communications bus may be subject to a hardware enforced priority mediation protocol 26*a*.

Additionally, according to one or more embodiments the system further comprised of a bridge platform 27 which may provide that the physical render device 13 of the system be bidirectionally communicatively coupled with an external system 28 which may generate a graphical 3D world space 30 including one or more graphical 3D objects 31. In one or more embodiments the data types of a 3D device world space 14 may be of the same data types of a graphical 3D world space, therefore values of the device world space 14 data and the graphical 3D world space data may be bidirectionally exchanged and synchronized. Wherein a bridge platform 27 may be a utility providing for such a bidirectional exchange and synchronization of world space data values between the 3D device world space 14 and communicatively coupled graphical 3D world space 30.

In further details of a bridge platform 27 communicatively coupling and synchronizing a device world space 14 and a graphical world space 30, in one or more embodiments a bridge platform include a device landing point 27*a* which may interface with the common communications bus 26 of the physical render device 13. Additionally, the bridge may have an external landing point 27 be which may communicate with a physical render layer 40. In one or more embodiments a physical render layer 40 may be introduced as an additional layer of the external system 28 generating a graphical 3D world space 30. A bridge platform 27 may utilize a physical render layer 40 to interact with the system layer 32 of the external system 28 utilizing the native methods of the system layer to set the behaviors 32*a* of the graphical 3D world space and to get responses 32*b* from the graphical 3D world space 32 which may then facilitate the bidirectional exchange of world space date used for synchronization of the device world space 14 and graphical world space 30.

According to one or more embodiments while still referencing FIG. 1 a user 10 physical interaction with the physical render device 13 included within the system may be a measurable physical control 11 for a 3D interaction with one or more 3D device object 15 instances within the device world space 14 generated by the physical render device. Additionally, an 3D interaction by a physical control 11 by the user 10 may effect a physical render 12 of the 3D interaction as mechanical response of 3D motion producing a physical sensation which then provide for physical virtual reality for the user 10. Additionally, wherein an at least one device object 15 instance configured as a device user agent 22 which may allow the device object 15 instance to respond as a 3D control object. Therefore, a user's 10 physical activities may a measurable physical control 11 for the device object 15 instance configured as a device user agent 22.

In a continued discussion of a device object 15 instance configured as a device user agent 22 internal to the device world space 14 generated by the physical render device 13 of the system, a non-fixed and replaceable control appliance 25 may be communicatively and mechanically coupled with the physical render device 13, wherein the control appliance 25 may allow for user's 10 physical activity to be measured as values of physical control 11, therefore a user's 10 physical activity may then be a 3D control of the device object 15 instance configured as a device user agent 22 3D control object according to one or more embodiments. Additionally, in one or more embodiments a physical render 11 of 3D motion may then physically alter the user's 10 physical activities, wherein the physical render 11 increasing and/or decreasing the user's 10 physical abilities which then may reflected the 3D control of the device object instance configured as a device user agent 22.

FIG. 2 is a diagram outlining the functional components comprising an example device object 15 instance internal to the device world space 14 of FIG. 1. As known in the relevant art, in one or more embodiments, a 3D world space 30 may include one or more 3D object 31 instances (e.g., as shown in FIG. 3*a*). Each one or more 3D objects may include axial elements (e.g., origin point 31*a* and an axes set 31*e* comprising a first axis 31*b*, a second axis 31*c*, and a third axis 31*d*) which may be the elements of the underlying 3D technology by which axial actions 45 of 3D interactions and 3D motion of a 3D object 31 are effected. According to one or more embodiments and depicted in Figured 1 in conjunction with FIG. 2 each device object 15 instance internal to the physical 3D world space generated by the physical render device may have one or more axial platforms 16 which may be mechanical subassemblies of the physical render device 13. Wherein one or more axial platforms 16 may provide axial actions 45 for physical control 11 for 3D interactions and physical render 12 of 3D motion by axial actions 45 wherein an origin point 15*a*, a first axis 15*b*, a second axis 15*c* and a third axis 15*d* may be generated internal to each device object 15 instance by the one or more axial platforms 16 comprising a device object instance 15 internal to the device world space 14.

In a continued discussion of FIG. 2 in conjunction with FIG. 1, according to one or more embodiments a device object may be comprised of one or more subassembly mechanisms constructing the physical render device 13 of FIG. 1. Each one subassembly mechanism may be an axial platform 16, wherein each axial platform 16 may include a platform controller 18 providing axes controls 19 for one or more axial elements (e.g., a first axis 15*b*, a second axis 15*c* and a third axis 15*d*) of the device object instance 15. Additionally, each one or more axial platforms 16 when mechanically and/or electrically and/or logical coupled forming a complete set of axes controls for all axial elements (e.g., origin point 15*a*, first axis 15*b*, second axis 15*c*, third axis 15*d*) may constitute a device object 15 instance of a world space device 15.

For example, the function diagram of FIG. 2 in conjunction with FIGS. 1 and 3*a* showing the example device object 15 instance as comprised of a two axial platforms 16. A first axial platform 46 may provide axes controls 19 for axial actions 45 a first axial element 15*b*, a second axial element 15*c* and partial control of a third axial element of 15*d*. A second axial platform 47 may partially provide axes controls 19 completing the axial actions 45 of third axial element 15*d*. The example device object 15 instance comprised of two axial platforms 16 having a complete set of axes controls 19 for the axial elements of a first axis 15*b*, second axis 15*c*, third axis 15*d*. Additionally, a complete set of axes controls 19 for a device object 15 instance may be utilized for determination of an origin point 15*a* for a device object 15 instance.

In a continued discussion of the example axial platforms 16 of FIG. 2, according to one or more embodiments the active components 17 of each axial platform 16 may be communicatively coupled with the platform controller 18, wherein the axes controls 19 of the platform controller 18 may acquire electronic signal from the active components 17*a* for axes controls 19 for axial behaviors 20 input produced by the user's 10 physical interaction with the active components 17*a* of the axial platform 16. Additionally, the platform controller 18 may output electronic signals to the active components 17*a* for axes controls 19 for axial response 21 output which may effect a mechanical motion by the axial platform 16.

As known to a person skilled in the relevant art the placement and/or arrangement and/or mechanical degrees of freedom (which may be referred to herein as "DOF") of the components comprising a mechanism may generate a known kinematic and/or inverse kinematic mechanical responses, the mechanical responses which may be effected by a kinematic action from one or more active device components (e.g., motors, actuators etc.) comprising the mechanism.

According to one or more embodiments the active components 17*b* may be the various device components of the active components 17 comprising an axial platform 16, wherein the active components 17*b* upon receiving a signal from the platform controller 18 for an axes control 19 of axial response 21 output may effect a kinematic action upon the mechanism of the axial platform 16 producing a known kinematic/inverse kinematic mechanical response 48. For example, as depicted in FIG. 2, an example first axial platform 46 mechanism (e.g., an instance of an axial platform 16) may have four mechanical devices (e.g., actuators, motors, etc.); the mechanical device 46*c*. the mechanical device 46*d*, the mechanical device 46*e*, the mechanical device 46*f*. wherein the mechanical devices arranged in a manner that the mechanical device 46*c* upon being activated may effect a possible kinematic/inverse kinematic mechanical response 48.

In one or more embodiments as illustrated in FIG. 2, wherein the possible kinematic/inverse kinematics of one or more axial platform 16 mechanisms may be relatable to the axial actions 45 for 3D motion (e.g., shown and discussed in conjunction with FIG. 3*a*) a correlation and/or association between the known possible mechanical kinematic/inverse kinematic responses and the relatable axial actions 45 may be possible. Such correlation and/or association may be the axes control 19 axial response 21 signal by the platform controller 18, wherein the axial response 21 signal to a coupled active component 17*b* may introduce a kinematic action into the axial platform 16 mechanism resulting in a known kinematic and/or inverse kinematic response 48 of the possible kinematic responses of the axial platform, the mechanical response 48 which may have been correlated and/or associated with an axial action 45 of 3D motion for a device object. For example, in a previous discussion the kinematic action introduced by an axes control 19 axial response 21 signal to the mechanical device 46*c* producing a mechanical response 48 wherein the mechanical response 48 may have been correlated and associated with an axial action for a 3D motion for a translation 42 (e.g., shown in FIG. 3*a*), therefore it should be appreciated that the axial responses 19 output of axes controls 19 may be used to provide a physical render 11 of 3D motion for a first axis 15*b*, a second axis 15*c*, and a third axis 15*d* for a device object 15 instance. A further details of the correlation and association of kinematic/inverse kinematic mechanical responses and axes controls 10 axial responses of 3D motion discussed in greater detail later herein commencing in conjunction with a discussion of FIG. 10.

As previously discussed herein, the configuration and/or placement/arrangement of the active components 17*b* of an axial platform 16 may define the axes controls 19 for axial actions 45 of 3D motion. According to one or more embodiments the active components 17*a* of the axial platform 16 mechanism subassembly may be the active components for axes control 19 axial behaviors 20. In one or more embodiments the configuration and/or placement/arrangement of the active components 17*a* wherein placed in concert with the configuration and/or placement/arrangement of the active components 17 for axes controls 19 axial responses 21 may allow for a user's 10 physical interaction with the active controls 17*a* as 3D interactions with a device object 15.

In further details of active components 17*a* of an axial platform 16 illustrated in FIG. 1 and FIG. 2, the active components 17*a* may be electrical signaling components (e.g., sensors, switches etc.) communicatively coupled with the platform controller 18 of the axial platform 16. The configuration placement and/or arrangement of the axes components 17*a* measuring the user's 10 physical interaction (e.g., strain, pressure, motion etc.) as values of axial actions 45 relative to one or more of a first axis 15*b*, second axis 15*c*, third axis 15*d* of a device object 15 instance. The values of axial actions 45 for a first axis 15*b*, second axis 15*c*, third axis 15*d* of a device object 15 instance may be acquired as input of axes control acquired as axial behaviors 20. Axial behaviors 20 may be a user's 10 physical control 11 as intention to effect 3D interaction for an axial action 45 of 3D motion by a device object 15 instance. For example, FIG. 1 in conjunction with FIG. 2 may illustrate an example second axial platform 47 mechanism (e.g., an instance of axial platform 16) comprising the example device object 15 instance depicted in FIG. 2. The active component 47*c* may be an active component 17 of the second axial platform 47 for axes control 19 input of axial behaviors 20. Wherein the active component 47*c* positioned to measure a user's 10 physical interaction as a strain across a plate 47*a*. The configuration of the placement and/or arrangement of the active component 47 which may be coupled with the axes controls 19 input for the acquisition of axial behaviors 20 by controller platform 18 (e.g., shown in FIG. 1) of the second axial platform 47, where in a user 10 lifted their left foot an axial behavior 20 may possibly acquire axes controls 19 as a value of axial action 45 for a translation 42 value along second axis 15*c* element of a device object 15 instance and/or possibly a rotation 43 value around a third axis 15*d* element of the same device object 15 instance as a physical control 11 according to one or more embodiments.

According to one or more embodiments and as illustrated in FIG. 1 in conjunction with FIG. 2 a physical render device 13 may be comprised or one or more axial platform 16 mechanical subassemblies, each mechanical subassembly having a platform controller 18 which may acquire a user's 10 physical interactions with the physical render device 13 as physical control 12 for axial actions 45 or 3D interaction as axial behavior 20 input for axes controls 19 for a device object 15 instance within a device world space 14 generated by the physical render device 13. Additionally, the known possible kinematic and/or inverse kinematic mechanical responses 48 of the axial platform mechanical subassemblies may be correlated and/or associated with an axial action 45 or 3D motion. Wherein a platform controller 18 included in the axial platform 15 communicates an axes control 19 axial response 21 signal activating an active component 17*b* generating a kinematic action within the axial platform 16 effecting a possible kinematic and or inverse kinematic response as an associated and/or correlated axial action 45 of 3D motion as a physical render 12 of 3D motion experienced by the user 10. It should therefore be appreciated that a physical render device 13 of the system may provide a user 10 of the system including a physical render device 13 with a physical virtual reality of 3D interactions and 3D motion of a device object 15 instance within a physical 3D world space 14 generated by the physical render device 13.

According to one or more embodiments at least one device object 15 instance within the physical device world space may be configured as a device user agent 22 which may be a 3D control object allowing for user's 10 physical activities to control the device object 15. As illustrated in FIG. 1 in conjunction with FIG. 2 a device object 15 instance configured as a device user agent 22 may include a control platform 23 which may include a user control platform 24 for acquisition of axes control 19. In one or more embodiments a device object 15 instance configured as a device user agent 22 may be configured to provide a physical device world space 14 with the operational capabilities that a user agent 54 3D control object may provide a graphical 3D world space, a user agent 54 shown and discussed in conjunction with FIG. 3*b* and FIG. 3*c*.

In a continued discussion of a device object 15 instance configured as a device user agent 22 the active components 25*a* for axes control 19 input of axial behavior input 20 and the active components 25*b* for axes control 19 output of axial responses may be the active components of a non-fixed and replaceable control appliance 25. According to one or more embodiments A control appliance 25 may be communicatively coupled with a user controller 24 of a control platform 23 as illustrated in FIG. 1. A control appliance 25 as depicted in FIG. 2 may be mechanically affixed and/or coupled with one or more axial platform subassembly mechanisms comprising a world space device. A user controller 23 may be an additional platform component of a device object instance 15 configured as a device user agent 22 as illustrated in FIG. 2.

According to one or more embodiments as depicted in FIG. 1 in conjunction with FIG. 2 and FIG. 3*a* the active components 25*a* of an affixed control appliance 25 may be communicatively coupled with the user controller 24 of a control platform 23 for acquisition of axes controls 19 input of axial behaviors 20. Axial behaviors 20 input of a control platform may measure a user's physical activity as axial actions 45 of linear and/or angular motions over time 44 for a device object 15 instance configured as a device user agent 22. Additionally, the active components 22*b* of an affixed control appliance 25 may take signals for axial responses 21 axes controls 19 output effecting a change either mechanically and/or electrically in a user's physical activity.

A further more detailed discussion pertaining to control appliances 22 and the axes controls 19, the acquisition of axial behaviors 20 and the application of axial responses 21 for a device object 15 instance configure as a device user agent may be contained herein commencing with a discussion in conjunction with FIG. 6*a*.

As may be known in the relevant art, a 3D object 31 of FIG. 3*a* may include an origin point 31*a* as a reference point for tracking the location and/or rotation of the 3D object 31 within a defined 3D world space 30. The origin point 31*a* may include and/or may be associated with an axes set 31*e* of a first axis 31*b*, a second axis 31*c*, and a third axis 31*d*, for example usable as reference indicators for direction of location and/or rotation of a 3D object within the defined 3D world space 30. According to one or more embodiments and as relevant to one or more embodiments the first axis 31*b*, a second axis 31*c*, and a third axis 31*d* may be taken individually and/or referenced as axial elements of axial action 45. Additionally, the according to one or more embodiments a location of an intersection, including any offset from center of one or more of an axis set 31*e* comprised a first axis 31*b*, a second axis 31*c*, and a third axis 31*d* may be taken individually and/or referenced as an axial element of axial action 45.

FIG. 3*a* additionally illustrates that the motions of axial actions 45 may be known to a person skilled in the relevant art as translations 42 of a 3D object 31 along one or more axis of the axes set 31*e*, and/or a rotation around one or more axis of the axis set 31*e*, and/or motions over time 44. The operation of a motion over time 44 as illustrated may be applied to a 3D object 31 as a linear motion over time (e.g., a translation 42.) Additionally, not shown, a motion over time 44 operation may be applied to a 3D object 31 as an angular motion over time (e.g., a rotation over time.) Axial actions 45 motions may be applied and/or operated on the axes set 31*e* of the 3D object 31*e* relative to the origin point 31*a* of the 3D object 31.

In one or more embodiments as illustrated in FIG. 3*a* in conjunction with FIG. 2 axial actions 45 of a 3D object 31 may be replicated as kinematic and/or inverse kinematic mechanical responses 48 of one or more axial platform 16 subassembly mechanism of a physical render device 13. The mechanical responses 48 of the axial platform 16 which may be correlated to axes controls 19 of an origin point 15*a*, first axis 15*b*, second axis 15*c*, third axis 15 axial actions 45 for one or more axial platforms 16 comprising a device object 15 instance.

Accordingly, it should therefore be appreciated that a device object 15 instance of the physical render device 13 may include the elements of axial action 45 motion for 3D object 31. A device object 15 instance may replicate the axial actions 45 of a 3D object 31.

Figure 3B:
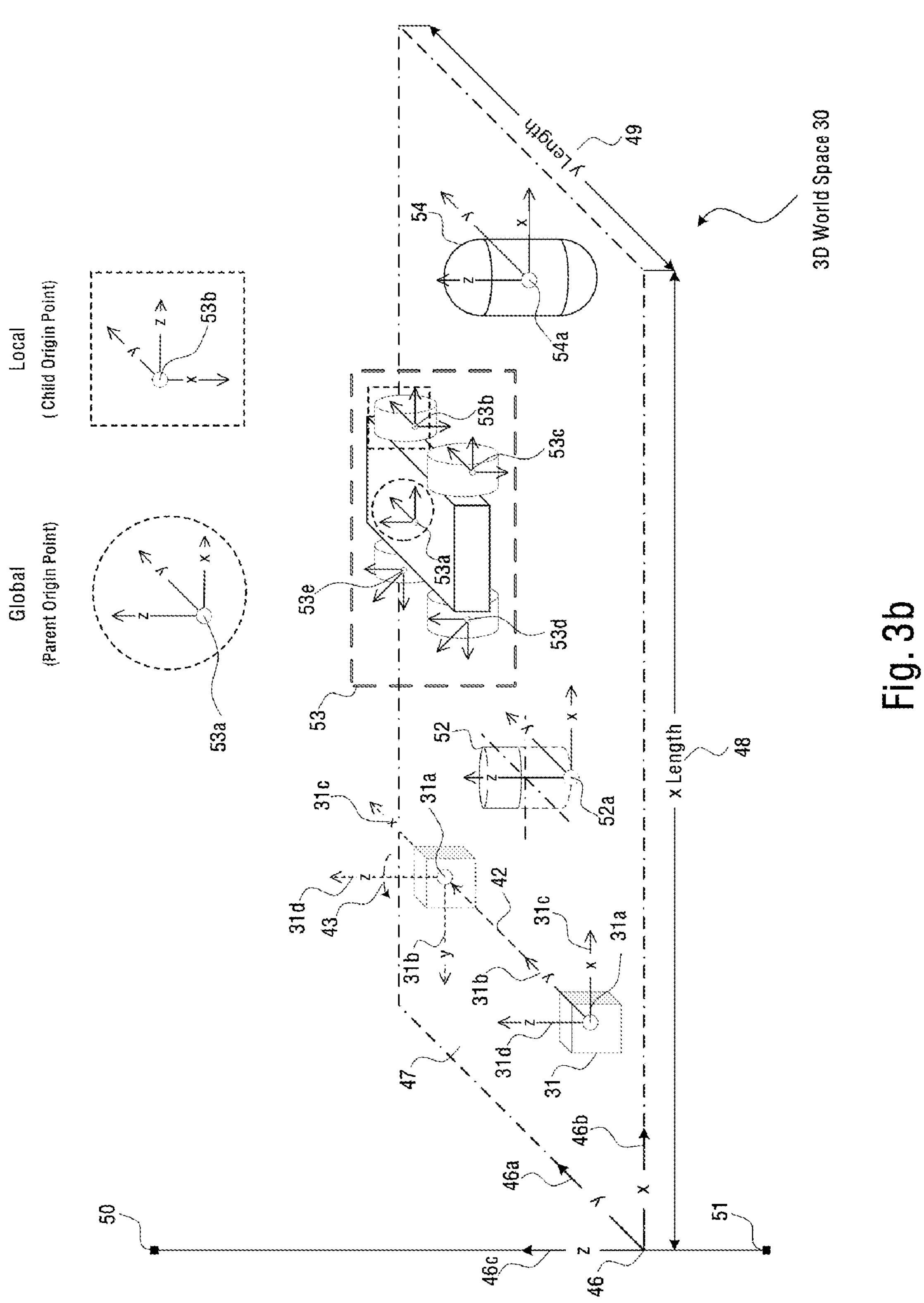
FIG. 3*b* illustrates an example of the underlying 3D technology for prototypical 3D world space including various 3D objects and the application of 3D interactions and 3D motion for the 3D world space as currently known in the relevant art.

FIG. 3*b* illustrates an example of a defined 3D world space 30. As known by a person skilled in the relevant art a first parameter defining a 3D world space may be a global reference point 46 indicating axial direction. A second parameter may be a ground plane reference 47 which may establish the boundaries of a 3D world space 30.

As depicted in FIG. 3*b* the example 3D world space 30 having four instances of 3D objects 31: the 3D object 52, the 3D object 53, and the 3D object 54. Respectively, each the origin points for each 3D object instance may be an origin point 31*a*, the origin point 52*a*, the origin point 53*a*, and the origin point 54*a*. As known to a person reasonably skilled in the relevant art the global reference point 46 and the ground plane 47 may be used for control of the axial actions 45 for 3D object 31 instance.

In a discussion of FIG. 3*a* in conjunction with FIG. 3*b* may pertain to axial actions 45 motions of the various 3D object instances in conjunction with the various 3D object instance interaction with the 3D world space 30 as known in the relevant art. According to one or more embodiments the axial actions 45 of one or more 3D object instances and/or interactions of the one or more 3D object instance with the 3D world space 30 may be replicated for physical control 11 and physical render 12 for a user 10.

As known to a person skilled in the relevant art and illustrated in FIG. 3*b*. a 3D world space 30 may include a global reference point 46 which may define direction parameters for a 3D world space 30. The global reference point 46 may function as a reference for the "starting position" of the defined 3D world space 30. The global reference point 46 may include three axial direction indicators, the first axial indicator 46*a*, the second axial indicator 46*b*, and the third axial indicator 46*c*. The axial indicators may each have an assigned designation for orientation and/or direction of the 3D world space 30. For example, the first axial indicator 46*a* may be designated as a direction of a y axis, a second axial indicator 46*b* may be designated as a direction of an x axis, and/or a third axial indicator 46*c* may be designated as a direction of a z axis. In one or more embodiments, and as illustrated in FIG. 3*b*, the first axial indicator 46*a* is shown pointing towards the "front" of the 3D world space 30, the second axial indicator 46*b* is pointing towards the "right" side of the world space 30, and the third axial indicator 46*c* is show pointing in an "upward" direction. In one or more embodiments, as known in the relevant art, such axis designations may be traditional axial directions. However, the designations may be arbitrary, and are different in other embodiments, e.g., the second axial indicator 46*a* may point to the right side of the 3D world space 30. As may be further discussed herein, a traditional orientation of the 3D worlds spaces 30 and/or the device world space 14 of the world space device 13 (e.g., as shown in FIG. 1) may be aligned, where a positive y axis points towards the front, a positive x axis points towards the right side, and a positive z axis points upwards.

In a continuing discussion of a 3D world space and as known to a person skilled in the relevant art, in one or more embodiments as illustrated in FIG. 3*b*, a 3D world space may include a ground plane 47 additionally defining the parameters of a 3D world space 30. A ground plane 47 may be a reference for extents of x, y, z boundaries of the defined world space 30. The parameters for a ground plane 47 may be defined by a length of x extents (labeled the x length 48) and the length of y extents (labeled the y length 49). In one or more embodiments, a 3D world space 30 may have a ceiling of 50 extents as a cap for the upward extents above the ground plane 47, and a floor 51 as a cap for the downward extents below the ground plane 47. The global reference point 46 may be a reference starting point for the extents of the ground plane x, y direction, the upward and downward extents of a ceiling and floor defining the boundaries of the 3D world space 30.

Each of the 3D object 52, the 3D object 53, and the 3D object 54 may be prototypical of the 3D object 31 of FIG. 3*a*, each having elements of axial actions 45 (e.g., an origin point 31*a*, a first axis 31*b*, second axis 31*c*, and a third axis 31*d*.) The first axis 31*b* may be assigned as orientation foray axis, the second axis 31*c* may be assigned as orientation for an x axis, and the third axis 31*d* may be assigned as orientation for a z axis According to one or more embodiments as depicted in FIG. 3*a* in conjunction with FIG. 3*b* each axis element (e.g., first axis 31*b*, second axis 31*c*, third axis 31*d*) of a 3D object 31 instance may include an axial orientation of x, y, z for a translation 42 motion direction along the axial elements relative to each instance of the 3D object 31 instance origin point 31*a*.

In a continued discussion of the example 3D world space 30 of FIG. 3*a* and FIG. 3*b*, the axial orientation x, y, z for axis elements (e.g., first axis 31*b*, second axis 31*c*, third axis 31*d*) of each instance of the 3D object 31 may have a direction for rotation relative to 3D object's origin point 31*a*.

All the axis elements for each 3D object instances each of the 3D object 31, the 3D object 52, the 3D object 53, and the 3D object 54 as prototypical of 3D object 31 as illustrated in FIG. 3*b* additionally may have axial orientation for x, y, z for each of their respective axes for translation 42 and/or rotation 43 direction relative to the origin point of each respective 3D object's respective origin point, origin point 31*a*, origin point 52*a*, origin point 53*a* and origin point 54*a*. For example, the axes of the 3D object instance 52 may have an axial orientations x, y, and z for direction and/or rotation of the relative to the origin point 52*a*.

In a continued discussion of the example world space 30 of FIG. 3*b*, each of the 3D object 31, the 3D object 52, the 3D object 53, and the 3D object 54 which may have their origin points, referred to, respectively, as the origin point 31*a*, the origin point 52*a*, the origin point 53*a* and the origin point 54*a*, each of which may be located within the established boundaries of the ground plane 47, the location relative to the global reference point 47 of the defined 3D world space 30.

As known in the relevant art an instance of a 3D object 31 may have a "global loc value" (a global location value) for the position the x, y, and z position of a 3D object instance origin point 31*a* within the x, y, z ground plane 47 boundary extents of the 3D world space 30 relative to the global reference point 46. As known in the relevant art, a global loc value within a 3D world space may be represented and/or stored a vector having a position value for <x, y, z>, the values being defined by the measuring values used for extents defining the ground plane boundaries (e.g., x length 48, y length 49, ceiling 50, floor 51.)

In one or more embodiments, a 3D object 31 instance may have a "global rot value" (global rotation value") for the rotation of the origin point 31*a*, in terms of x, y, z which may be determined by comparison of rotation of each axis of the axes set 31*e* (e.g., shown FIG. 3*a*) relative to the rotation of the first axial indicator 46*a*, a second axial indicator 46*b*, and third axial indicator 46*c* of the global reference point 46. As known in the relevant art, a rot value within a 3D world space 30 may be represented and/or stored as a quaternion. However, in one or more embodiments, for simplicity a quaternion may be expressed as a Euler vector either in degrees and/or radians having a position value for <x, y, z>. Rot values or rotation values used herein are commonly expressed as Euler vectors in degrees.

In a continued discussion of the example 3D world space 30, an example of global loc and global rot is presented for the prototypical 3D object 31 labeled in FIG. 3*b*. The global reference point 46 may be a starting point of <0, 0, 0>, the x length 48 and the y length 49 being 16 meters and 8 meters, respectively (it is noted that this may be considered a small instance of the 3D world space 30—in practice the 3D world space 30 may be much larger). The prototypical 3D object 31, in this example may be representative of a cube 1 meter in length, width, height, and having an origin point 31*a* at a center mass (and/or volume). Specifically, in the present example at a first time, the 3D object 31 may have an approximate global loc <3.5, 1.5, 0.5> (0.5 for z being half the height of the 3D object 31) meters when referenced from the origin point 31*a* from the starting point of the global reference point 46 <0, 0, 0>. The same 3D object 31 is also shown having undergoing a translation 42 (for example, at a second time) along the y axis orientation (the first axis 31*b*) in a positive y direction 46*a* (towards the "front"). Following such translation, the 3D object 31 may have a new global loc <3.5, 5, 0.5>.

The global rot of the 3D object 31 may be represented as a Euler vector in degrees being <0, 0, 0>, as referenced from the global reference point 46. The same object 31 (after translation) may undergo a rotation 43 of ninety degrees applied to the z axis indicator (e.g., a rotation around the third axis 31*d* counterclockwise as viewed from the top down), resulting in a new global rot <90, (−90/+270), 90>

In a continued discussion of the example 3D world space 30 of FIG. 3*b*, where a 3D object instance 52 may be referenced by the origin point 52*a*, the origin point 52*a* need not be a center mass and/or volume of the object 52. Rather, the origin point 52*a* may be offset along the negative y, negative z orientation axes (e.g., the first axis 52*b* and third axis 52*d*). The offsetting of the origin point 52*a* may affect the global loc and global rot of the 3D object 52. For example, as illustrated in FIG. 3*b*, the 3D object 52 may be 1.5 meters in height, and the bottom edge of the 3D object 52 may be below the ground plane 47, with the origin point 52*a* being offset along the z orientation axis such that the z axis value of the global loc may be z.-.75 meters.

In one or more embodiments, various instances of the 3D object 31 within the defined 3D world space need not be a singular 3D object 31, but rather may be comprised of multiple instances of the 3D object 31 that may be a collection, link set, or other defined association. In one or more embodiments, a 3D object 31 may be comprised of multiple 3D objects 31 sharing a common root. For example, in FIG. 3*b*, the object 53 may be comprised of a 3D object 53*a* that is a root object, and four instances of child 3D objects, the 3D object 53*b*, the 3D object 53*c*, the 3D object 53D, and the 3D object 53*e*. All such grouped objects may comprise the 3D object 53 instance, axial actions 45 (e.g., shown in FIG. 3*a*) may be applied to the 3D object 53 resulting in a change in global location and/or global rotation relative to the origin point 53*a* for all such grouped objects.

As known to a person skilled in the relevant art, each instance of 3D object 31, including those in groups as child objects, may have a local loc (e.g., local location) and local rot (e.g., a local rotation). As known in the relevant art, a local location may be the vector values of the axis elements (e.g., first axis 31*b*, second axis 31*c* and third axis element 31*d*) relative to the same origin point 31*a* of the same 3D object 31. A local rotation be the rotation values (e.g., quaternions, radians, degrees) of the axis elements (e.g., first axis 31*b*, second axis 31*c* and third axis element 31*d*) relative to the same origin point 31*a* of the same 3D object 31

It is noted that checking a local loc and/or loc rot for a singular instance of the 3D object 31 may not be very useful, however, as illustrated in FIG. 3*b*, a 3D object 31 comprised of one or more 3D objects such the object 53, each child object (the 3D object 53*b*, the 3D object 53*c*, the 3D object 53D, and the 3D object 53*e*) may have a local loc and local rot as referenced from the child object's origin point relative to the origin point 53*a* of the root 3D object 53. The global loc and global rot of the 3D object 53*a*, as a root object, may be referenced from the origin point 53*a* of the 3D object 53. For example, the 3D object 53 may include a root 3D object 53*a* with a global loc of <9, 7, 0.5>, 3D object 53*b* having a global loc <10.5, 8, 0.5>, the 3D object 53*b* additionally having a local loc referenced from the origin point 53*a* of object 53 of <1.5, 0.5, 0>.

In one or more embodiments, the translations 42 and/or rotations 43 of axial actions 45 (e.g., as shown in FIG. 3*a*) may be applied to the various instances of the 3D objects 31 within a defined 3D world space 30. As known in the relevant art, the application of a translation 42 and/or rotation 43 may allow that the 3D object 31 to appears to "jump". For example, in a previous discussion of global loc, a translation 42 was applied to the 3D object 31 of FIG. 3*b* to move the 3D object 31 location in the defined 3D world space 30. In one or more embodiments, the external system 28 hosting the 3D world space 30 and/or the system layer 32 managing the 3D world space 30 may include software and/or software methods allowing for a motion over time 44, for example as shown in FIG. 3*a*. In one or more other embodiments, the terminology for motion over time may be different. Motion over time 44 may allow for a "linear motion" as a controlled acceleration to a given rate of translation 42 of a 3D object 31 along one or more of the x, y, and/or z orientation axes of the 3D object 31 over a specified time (e.g., a velocity of an 3d object 31 within the 3D world space 30). Additionally, while not shown in FIG. 3*a*, motion over time 44 may allow for an "angular motion" as a controlled acceleration to a given rate of rotation of a 3D object around one or more of the x, y, z orientation axes of the 3D object 31 over a specified time.

For example, translating the 3D object 31 along the orientation x axis (e.g., the second axis 31*c*), a translation may be replaced with motion over time 44 as a linear motion. In the example motion over time 44 in FIG. 3*c*, a time value t 44*a* and rate r 44*b* or speed for the translation of the 3D object 31 may be specified. An ingress value as an acceleration 44*h* may ramp the 3D object 31 to the rate of desired translation shown at t0 44*c*-t1 44*d*. The translation 42 of the 3D object 31 progresses along the second axis 31*c* at the specified rate r 44*b* for each time t2 44*e* and t3 44*f*, until the total specified time $t_t$ 44*g* has been reached at which time the motion over time 44 may be release on the 3D object 31 (it should be noted that an ingress value and/or egress value may be employed to ramp up and or ramp down the translation, additionally time t may be controlled by an event with translations happening until released.)

In one or more other embodiments, the system layer 32 of an external system 28 hosting the 3D world space 30 may apply physics to 3D objects interacting within the 3D world space 30, as previously discussed herein. The applied physics by the system layer 32 upon a 3D object 31 may alter the motion over time 44 as applied to the 3D object 31. For example, physical forces applied to the 3D object 31 that may hinder an ability of the 3D objects 31 to reach the rater 44*b* by the specified acceleration 44*h* ingress. In one or more embodiments, a time-to-win 44*i* may be incorporated into the motion over time 44 as a controlling modifier as a value governing the ability of the 3D objects 31 to overcome the physical forces.

In a continued discussion of the example 3D world space 30 of FIG. 3*b*, a 3D object 54 is introduced as a user agent. In one or more embodiments, a user agent 54 may be a special type of a 3D object 31 providing a user 10 with the means of interaction within the defined 3D world space 30. In one or more other embodiments, and as known in the art, the term for "user agent" may differ. In one or more embodiments, a user agent 54 may allow a user to control the axial actions 45 of one or more 3D objects 31 within the defined world space 30, e.g., applying one or more translations 42, rotations 43, and motions over time 44 as linear motions and/or angular motions as described herein. For example, in FIG. 3*c*, the 3D object 53 may have been defined as a user-controlled object, such that the user 10 may utilize the user agent 54 to control the 3D object 53.

Figure 3C:
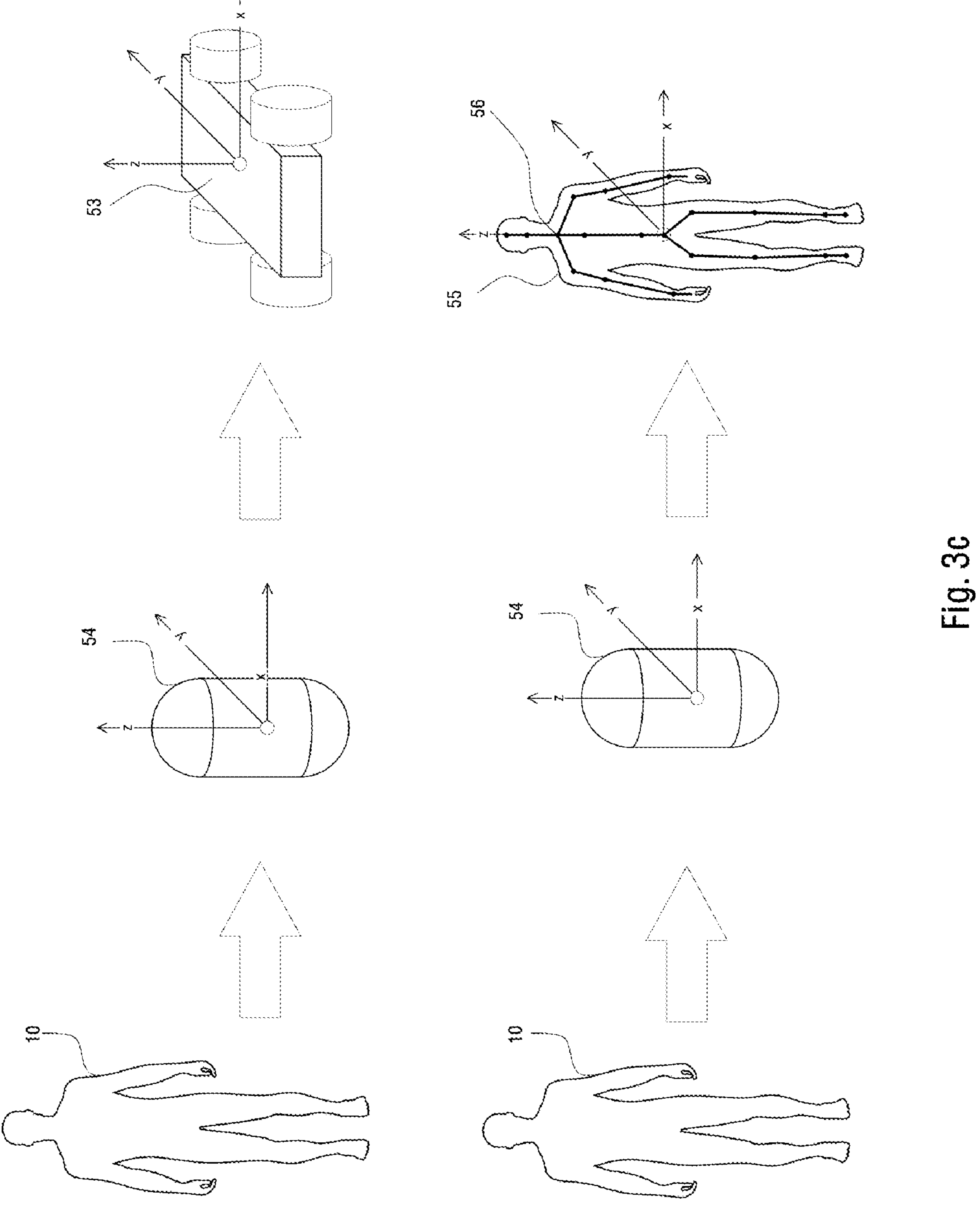
FIG. 3*c* illustrates a prototypical 3D control object known herein as a user agent object. A user interacting with the 3D control object to control associated 3D objects including an 3d avatar object and a 3D object.

In one or more embodiments, a 3D object 55 (also referred to herein as an avatar 55) may be known in the relevant art as an "avatar", an example of which is shown in FIG. 3*c*. The avatar 55 may be an instance of a 3D object 31 representative of a user 10 within the defined 3D world space 30. The avatar 55 may have an animation skeleton comprising bones known in the relevant art as an "armature" or "rig", referred to herein as an armature 56. In one or more embodiments, a user 10 may use the user agent 54 to control the avatar 55 by applying axial actions 45 as described herein. In one or more embodiments, application of axial actions 45 may trigger animation of the armature 56 (e.g., skeletal bones) of the avatar 55. For example, a user 10 may apply a liner motion as a translation 42 of motion over time 44 moving the avatar instance of the 3D object 53. The armature 56 may be animated moving the skeletal bones in a manner that the 3D object 53 (e.g., the avatar 55) appears to be visually "running" in a graphic render of the 3D world space 30.

Figure 4A:
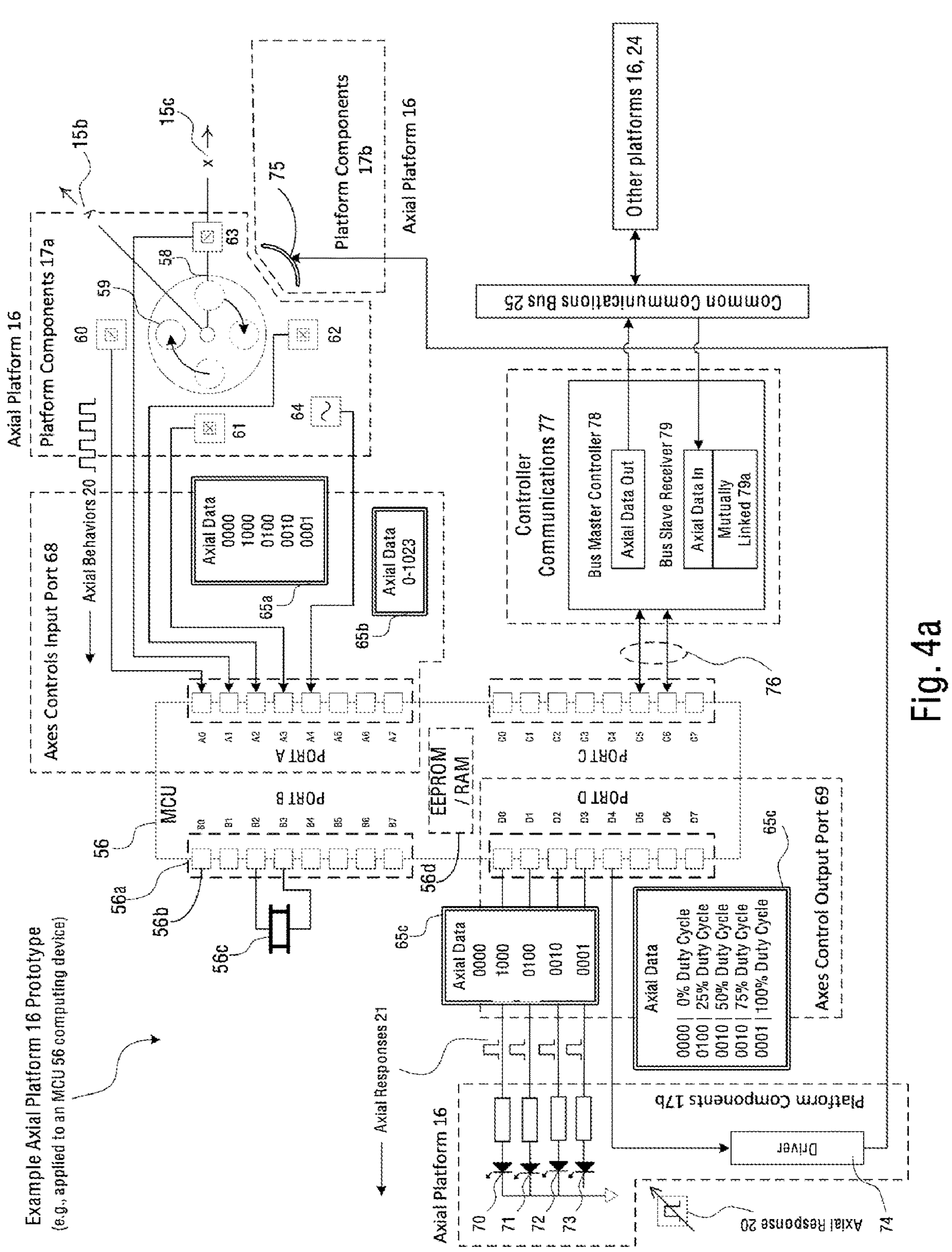
FIG. 4*a* illustrates an example of the prototypical configuration of axes controls for a physical 3D object. Axes controls axial behaviors which may allow for the acquisition of physical control 3D interactions and axes control physical render which may allow for a physical render of 3D motion by a physical device object.
Figure 4B:
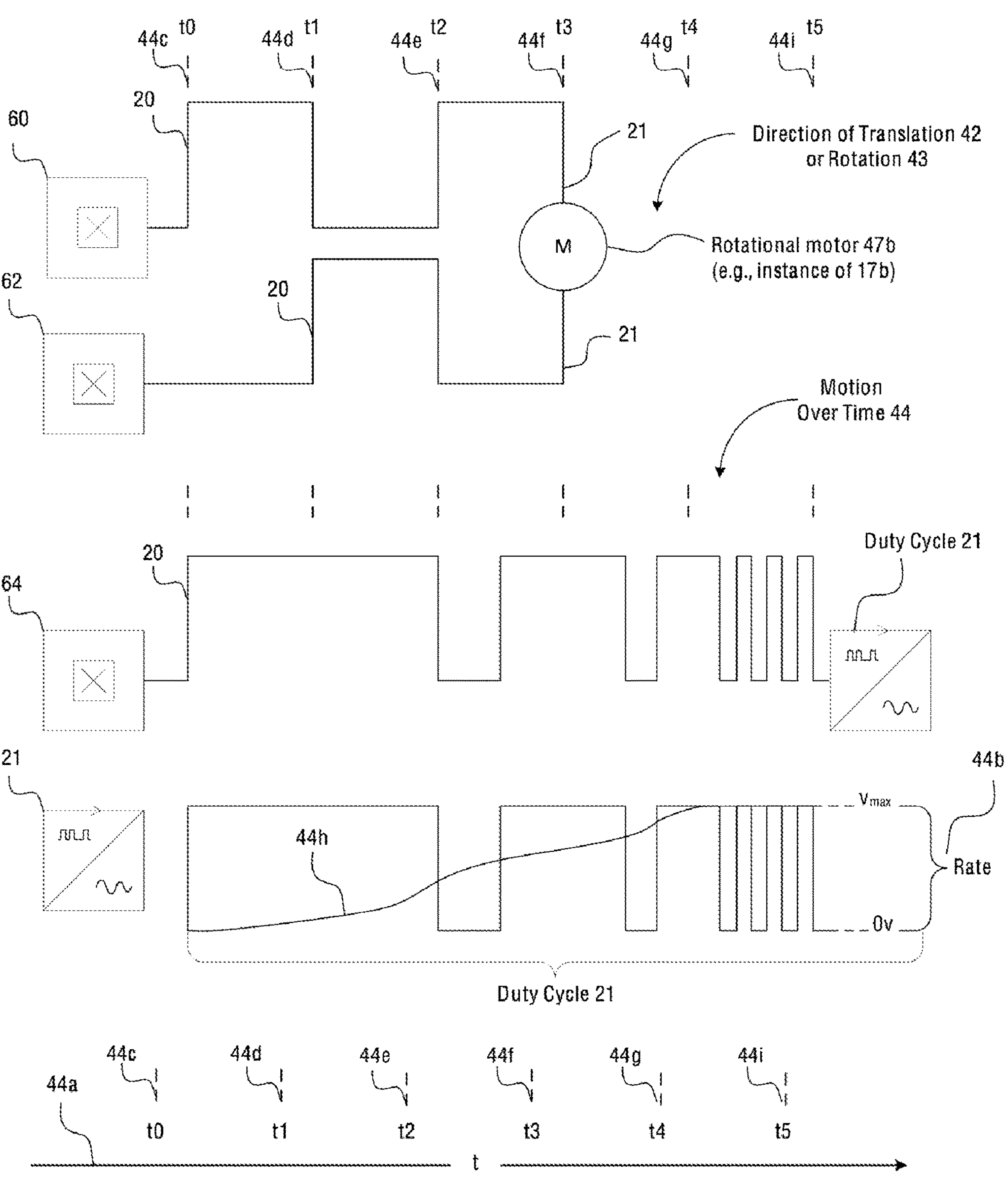
FIG. 4*b* illustrates that axes controls axial behavior signals values may be acquired as values of axial actions of 3D interactions. Additionally, axes control axial response signal values output may effect a mechanical response, wherein the mechanical response associated with an axial action of 3D motion.

FIG. 4*b* illustrates an example the coupling of the axial platform's 16 active components 17 with the axial platform's 16 platform controller 18. According to one or more embodiment the example configuration of the active components 17*a* may provide for the acquisition of axes control 19 axial behavior 20 input used for physical control. Additionally, the active components 17*b* may allow for axes controls 19 axial response 21 output used for physical render.

As previously discussed in conjunction with FIG. 1 and FIG. 2, in one or more embodiments the axial platforms 16 that may comprise the device objects 15 of the physical render device 13 and the control platforms 23 which may be used in configuration of a device object instance 15 as a device user agent 22, may each utilize computing devices, for the platform controllers 18 and user controller 24, respectively. A Micro Control Unit, or MCU, is presented herein being the example embodiments of computing devices herein. In one or more other embodiments, a different type of computing devices may be used (or may be used in addition to MCUs).

As known in the relevant art, an MCU may be a type of computing device having built-in features allowing the MCU to acquire information signals from external peripheral components (e.g., sensors, limit switches, etc.) Additionally, an MCU may output control signals for the control of peripheral components (e.g., motors, actuators etc.) Additionally, an MCU may have other features such as building communication protocols (e.g., TWI, SPI, CAN, etc.) While described here in as an MCU herein in one or more other embodiments the computing device the computing device may be any type of computing device capable of supporting the acquisition of axial behavior 20 input, axial response output 21 and/or communications on the common communication bus 26 (e.g., a single board computer "Raspberry Pi®", a hardware breakout for PC, etc.)

A prototype as known in the relevant art may be an original type, form, or instance serving as a basis or standard. In one or more embodiments, the example computing devices of the platform controllers 18 and/or user controller 24 may be hardware prototyped, for example the MCU 56 computing device may have a hardware prototype as shown in FIG. 4*a*. The usage of the hardware prototypes described herein may allow for a consistency in of the axes controls 19 of acquisition of axial behaviors 20 and corresponding axial response output 21 for each platform controller 18 of the axial platforms 16 and/or the user controller 24 of the control platforms 23.

In one or more embodiments, and as shown in the example computing device of FIG. 4*a*, the computing device may be a "micro control unit", shown and referred to as the MCU 56. As known in the relevant art, the MCU 56 may have ports with a register of pins defining data bits for the port. For simplicity in illustration of operations, the MCU 56 has an 8 Bit architecture, having four 8-bit ports and four 8-bit registers. The MCU 56 of FIG. 4*a* is shown, for example, having a Port B 56*a*, a data pin B2 56*b*, and the register of Port B 56*a* comprising all data pins B0-B7 within the port. The ports, registers and pin designations, etc., described herein are for illustration purpose, and the actual ports, pin designation may vary being determined by the manufacture's specification of the computing device used.

In one or more embodiments, the computing device such as the MCU 56 may offer defined features on the register data pins for a port. For example, the MCU 56 may include a feature supporting an external oscillator 56*c* allowing for an increase in clock time. For instance, the external oscillator may be specified by the manufacturer of the MCU 56 as being on Port B 56*a* with data pins B2 and B3 of the register B. The MCU 56 may have eeprom ("electrically erasable programmable read-only memory") and/or ram "random access memory", labeled EEPROM/RAM 56*e*, usable for storing and execution of logic which may be known in the relevant art as "firmware."

In one or more embodiments, the computing device such as the MCU 56 may have data pins may defined for the digital input of electronic signals from various peripheral devices (e.g., electronic sensors, switches etc.). In one or more embodiments, the MCU 56 may have an analog-to-digital converter allowing for the MCU 56 to receive analog signals on defined data pins. In one or more embodiments, a computing device (e.g., MCU 56) may use data pins of the computing devices to prototype the definition of a axes input port 68. In one or more embodiments, the prototype of the axes input port 68 may acquire the axes controls 19 axial behaviors 20 values from the various active components 17*a* of the axial platforms 16 and/or the various active components 25*a* of a mechanically coupled control appliance 25 device, which may be communicatively coupled to the control platform 23 as previously discussed.

In one or more embodiments, the computing device such as the MCU 56 may include data pins that may be defined for the digital output electronic signals for the control of various peripheral devices (e.g., actuators, motors, etc.). In one or more embodiments, the example MCU 56 may not directly output the electronic signals in analog format, however, and the example MCU 56 may have a feature allowing for PWM ("pulse width modulation") signals on defined pins. PWM signals as known in the art may mean varying the duty cycle of the digital pulses on a pin (e.g., frequency between pulses). It may be possible to use the duty cycle of PWM as the representation of an analog electronic signal. In one or more embodiments, the data pins of the computing devices may be hardware prototyped for the definition of a axes output port 69. In one or more embodiments the prototype of the axis output port 69 may output the axes controls 19 of axial response 21 values to the various active components 17*b* of the axial platforms 16 and/or the various active components 22*b* of control appliance 25 coupled to the control platform 23, as previously discussed.

The axial behaviors 20 may be acquired as the values for the intent of the user 10 for physical control 11 of an axial action 45 for one or more axes (e.g., first axis 15*b*, second axis 15*c* and third axis element 15*d*) of a device object 15. The prototype of the of the acquisition of the axial behaviors 20 by MCU 56 will now be described.

In one or more embodiments, an example axial platform 16 of FIG. 4*a* may be comprised of various components 17, the components 17 for example being a flywheel 58, a magnet 59 attached to the flywheel 58, and four electronic active components 17*a* (the sensor 60, the sensor 61, the sensor 62, and the sensor 63) arranged around the flywheel 58 detecting the magnetic field of the magnet 59. The configuration and/or placement and/or arrangement of the sensors may produce the first axis 15*b*, the second axis 15*c* of a device object 15 instance, for example as illustrated in FIG. 4*a* the configuration of the sensors producing the first axis 15*b* and the second axis 15*c* (e.g., the methods detailed latter in conjunction with a discussion commencing with FIG. 10) herein. As illustrated in FIG. 4*a*, the motion of the flywheel may indicate an axial action 45 of rotation 43 around a first axis 15*b* and/or a translation 42 along a second axis 15*c*. A physical interaction of the user 10 with the flywheel 58 rotating the magnetic field of the magnet 59 through each one of the electronic sensors (e.g., the sensor 60, the sensor 61, the sensor 62, the sensor 63) may pick-up the magnetic field sequentially, producing a series of electronic pules. In the continued example of the embodiment of the acquisition of the axial behaviors 20 from the axial platform 16, the four sensors may be communicatively coupled to the prototype of the axes input port 68 on Port A, data pins A0, A1, A2, and A3. The electronic pulses may be read by the MCU 56 producing axes control 19 values which may be axial behavior 20 input (see chart 65*a*).

In a continued discussion of the example axial platform 16 of FIG. 4*a*, four LEDs ("light emitting diodes") may be communicatively coupled to the MCU 56, referred to as the LED 70, the LED 71, the LED 72, and the LED 73. The LEDs are substituted herein for electromechanical/mechanical components 17*b* to better illustrate an example of the relationships which may be axial behavior 20 input 65*a* which may be representative of the user's 10 physical interaction and/or physical activities as values for the first axis 15*b* and the second axis 15*c* of the device object 15*a*. The four LEDs may be communicatively coupled to the axes controls 19 output port 69, here having been defined as digital output on data pins D0, D1, D2, D3 on port D of the MCU 56. The data pin D0, D1, D2, D3 may produce axes control response data 65*c* for an axes control 19 axial response 21 which may be representative of the axes controls 19 axial behavior 20 input axes control interaction data 65*a* produced by the acquisition of the axial behaviors 20.

In the continuation of the example axial platform 16 of FIG. 4*a*, the magnet 59 may be located between the pick-up fields of the four sensors producing an axes control 19 axial behavior 20 value of 0000 (e.g., according to chart 65*a*), which results in all four LEDs being off and/or unlit. The magnet 59 may then pass through each sensor of the four sensors (the sensor 60, the sensor 61, the sensor 62, and the sensor 63) causing each LED (the LED 70, the LED 71, the LED 72, and the LED 73) to illuminate as the magnet 59 passed through the corresponding sensor's pick-up field, according to the chart of values of which may be the axes controls 19 axial response 21 output (see chart 65*c*.) The glowing LED may be a tangible real world response to the value of the axial response 21 indicative of a the representative values of the axes control 19 axial behavior 20 input data 65*a*. The representative axial behavior 20 value may be the rotation 43 around a first axis 31*b* and/or possibly a translation 42 of the second axis 31*c* (e.g., as shown in FIG. 3*a*). The direction of the possible translation 43 of the second axis 31*c* may be dependent of the mechanical freedoms of the mechanical response 48 allowed by the configuration of the active components 17*b* comprising the axial platform 16 (e.g., as shown in FIG. 2).

FIG. 4*a* in conjunction with FIG. 3*a* may provide an example more specific to physical control 11 and physical render 12. the flywheel 58 may produce a mechanical response for linear motion over time 44 for a second axis 31*c*, where the sensor 60, the sensor 61, the sensor 62, and the sensor 63 may be communicatively coupled to the data pin A0, the data pin A1, the data pin A2, and the data pin A3, respectively, for example as shown in FIG. 4*a* with the axes controls 19 axes input port 68. The data pin D4 of the axes controls 19 output port 69 which may have been defined as a PWM signal controlling an electromechanical braking device 75 (e.g., clutch, electronic friction brake, gearbox etc.) as an active component 17*b* of the example axial platform 16.

In continuation of the example of axes controls 19 axial behavior 20 input as physical control 12 and axial response output 12 for physical render. A user's 10 physical interaction may be a measurement of a user activity as a value (acceleration 44*h*, rate 44*b*) for an axial action 45 of a linear motion over time 44 for a second axis 15*c*. The measurement value may be acquired by axes control 19 axial behavior 20 (e.g., chart 65*a*). The axes controls 19 axial response 21 output of PMW (e.g., chart 65*c*) might possibly be connected to an electronic driver 74 accepting the axial response 21 output as values for controlling the braking device 75 limiting the flywheel's 58 rotational ability. According one or more embodiments limiting the flywheel's rotational ability may be analogous to limiting the rate r 44*b* and/or acceleration 44*h* of a linear motion over time 44 for a second axis 15*c* which may then be a physical render 12 effecting a correlated mechanical response by application of the breaking device 75 active component 17*a*.

FIG. 4*b* in conjunction with FIG. 2, FIG. 3*a* and FIG. 4*a* may illustrating that axes controls 19 which may acquire axial behaviors 20 input from the electronic signals of the active components 17*a* electronic signals may produce axial response 21 signals that when applied to the active components 17*b* may effect a mechanical response 48, where axial actions 45 of a device object 15 instance may be analogous to the axial actions of a 3D object 31 instance. For example, and as illustrated the sensors 60 and 62 may produce a direction of a rotational motor 47*b* (e.g., shown in FIG. 2), sensors 60 and 62 may be acquired as axes control 19 axial behavior 20 input for an axial action 45 around a third axis 15*c* of a device object 15 instance. The axes controls axial response 21 may produce a signal determining the direction of rotation 43 for the third axis 15*c*.

According to one or more embodiments and as illustrated by FIG. 4*a* the type of active controls 17*a* used for acquisition of axes controls 19 axial behavior 20 input may vary which may allow for acquisition of axes controls 19 which may more closely replicate values axial behavior 20 values of the axial actions 45. For example, replacing the of the four sensors (the sensor 60, the sensor 61, the sensor 62, and the sensor 63) with an analog sensor 64 may produce axes control 19 axial behavior 20 input having a value range from zero to one thousand twenty three (e.g., shown in chart 65*b*), the value range of sensor 64 may be more suitable for measure a rate 44*b* and/or acceleration 44*h* of an axial action 45 of motion over time 44. The type of the four sensors (the sensor 60, the sensor 61, the sensor 62, and the sensor 63) each producing singular electronic pulses may be more suitable for other measuring other axial actions 45 such as direction.

In one or more embodiments, each of the one or more platform controllers 18 and control platforms 23 may be connected to a common communications bus 25, access for communications over the bus controlled by a priority mediation protocol 26*a*, for example as illustrated in FIG. 1. The prototype instance of the MCU 56 of FIG. 4*a* may define a communications feature in accordance with the manufacturer's specification for the MCU 56. As illustrated in one or more embodiments, of the MCU 56 may include a controller communications 77 comprising hardware, firmware, per the manufacture's specification. Illustrated in FIG. 4*a*, the controller communications 77 is implemented on Port C 76, specifically data pin C5 and data pin C6, providing the MCU 56 with capabilities exchanging axes control axial behaviors 20 input data 65*a* and axes control interaction data 65*b* with one or more other platform controllers 18 and/or user controllers 24 as output when acting as a bus master controller 78, and/or accepting axes control interaction data 65*a* and axes control interaction data 65*b* as a bus slave receiver 79.

Figure 5:
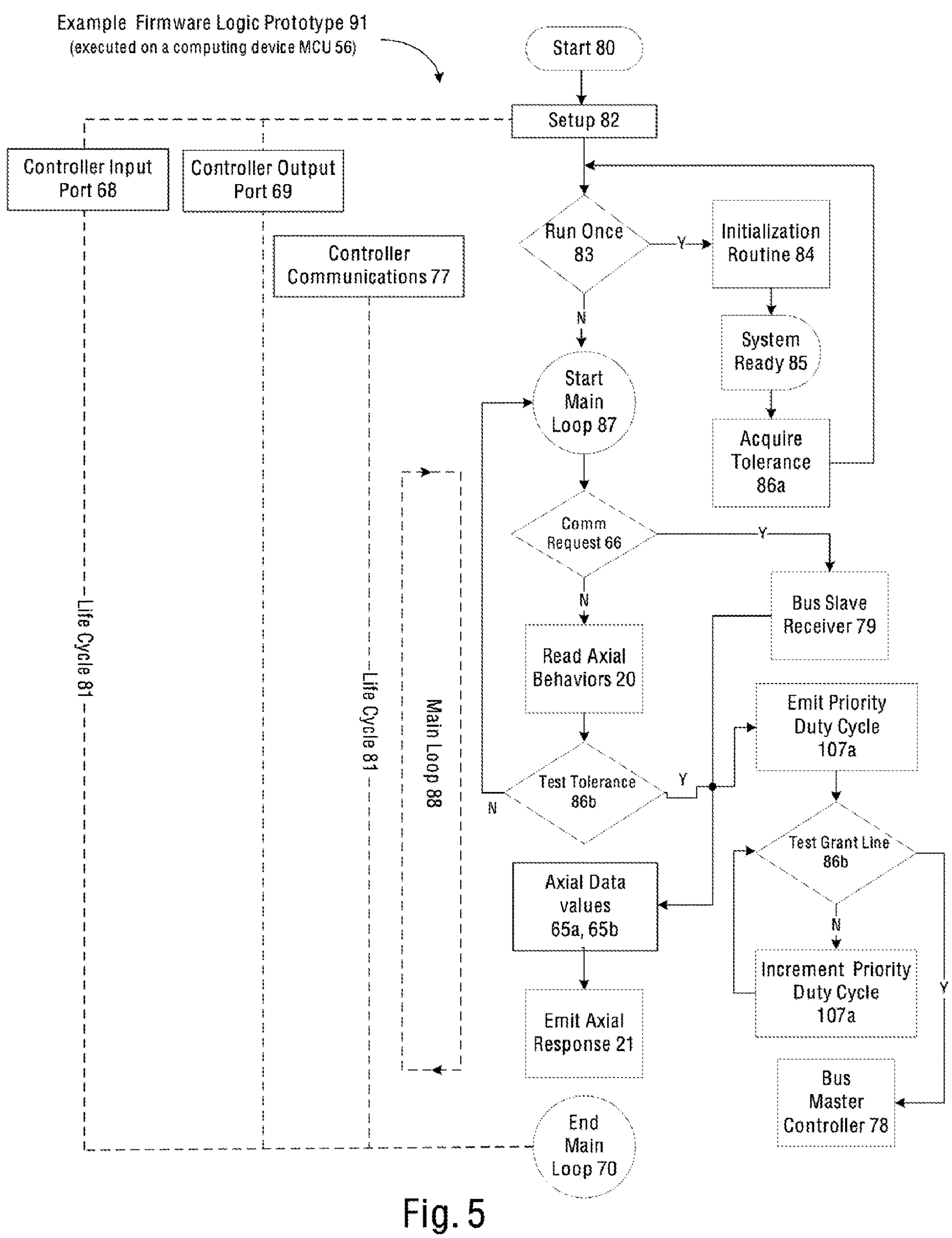
FIG. 5 illustrates a prototype logic chart outlining the operation execution sequence for a lifecycle of each computing device of axial platforms and/or controller platforms providing axes controls for axial actions of a physical device object.

FIG. 5 introduces a logic chart outlining which may prototype the execution sequence for Lifecycle of the firmware for each computing device (e.g., the MCU 56) of the platform controllers 18 of the axial platforms 16 and/or the user controllers 24 of the control platforms 16. As previously discussed herein in conjunction with FIG. 4*a*. a firmware prototype 91 of FIG. 5 may be used by the computing device for establishing axes controls 19 for axial behavior 20 and axial response output 21.

In one or more embodiments of the firmware prototype of the illustrative MCU 56 computing device of FIG. 4*a* may start at operation 80, for example when the execution of firmware when the MCU 56 is powered on, and may execute the firmware in a continuous loop of the firmware lifecycle 81 until an operation 90 is generated by either a "soft or hard" reset being caught by the MCU and/or the MCU 56 is powered off. Upon start at operation 80, the ports, registers, and/or data pins may be defined in the operation 82 that may set up the axes input port 68, the axes output port 69, and controller communications 77 (e.g., shown and discussed in conjunction with FIG. 7.) The definition of the ports may remain active throughout the firmware lifecycle 81 of the MCU 56 computing device executing the controller MCU firmware prototype logic of FIG. 5 (e.g., example firmware logic 91). For example, the Port A may be defined as the axes input port 68, data pin A1 having been defined as digital input and data pin A4 being defined as analog input. Port D may be defined for axis output port 69 data pin D4, for example defined and/or usable for PWM output.

In the present example of the example firmware logic 91 of FIG. 5, the register data pins of the axes input port 68 and axis output port 69 of the MCU 56 may have been setup in operation 82, where the execution of all active firmware code logic within the loop of the lifecycle 81 may begin. Operation 83 may be a run once condition that may ensure that operation 84 and operation 86, an initialization routine and a tolerance acquisition routine, respectively, may be each executed one time. Operation 83, operation 84, operation 85, and operation 86 may become inactive during the lifecycle 81 once the condition of operation 83 is satisfied, which may reduce the number of instruction executed at each iteration of the firmware lifecycle 81 of the firmware.

In the present example, the example firmware logic 91 of FIG. 5 and operation 84 may define a correlation between the acquisition of axes controls 19 axial behaviors 20 as input of the values for the axial elements (e.g., origin point 15*a*, first axis 15*b*, the second axis 15*c*, and the third axis 15*d*) of the one or more device objects 15 on the axes input port 68 and the kinematic and/or inverse kinematic mechanical responses 48 effected by the axes controls 19 of axial response 21 on the axes output port.

In a continued discussion of the present example, during operation 84, the defined data pins on the axes input port 68 may be digital or analog, and may be defined for input of the variables for the acquisition of the values for axial behavior 20 for the first axis 15*b*, the second axis 15*c*, and/or the third axis 15*d*. During operation 84, the defined data pins on the axis output port 69 may be digital or PMW, and may be defined as the variables for output of the electronic signals for values of axial responses 21 for a first axis 15*b*, the second axis 15*c*, and/or the third axis 15*d* effecting a mechanical response for electromechanical components. For example, the flywheel 58 may produce a mechanical response for linear motion over time 44 for a second axis 31*c*, where the sensor 60, the sensor 61, the sensor 62, and the sensor 63 may be wired to the data pin A0, the data pin A1, the data pin A2, and the data pin A3, respectively, for example as shown in FIG. 4*a* with the axes input port 68. The data pin D4 of the axis output port 69 may have been defined as a PWM signal controlling an electromechanical braking device 75 of the flywheel 58 limiting the rate r 44*b* and/or acceleration 44*h* of a linear motion over time 44 for a second axis 31*c*. The variables of the axial behaviors 20 may be defined for the acquisition of axial behavior 20 signal values as resistance to the linear motion over time 44 to a second axis 31*c*, and the variable assigned to the axial responses 21 may affect the electrotechnical engagement of the breaking device 75 the mechanical response 48 physically restricting the linear motion over time 44 of the second axis 15*c*.

In further details of the example embodiments of the example firmware logic 91 of FIG. 5, operation 84 may be utilized to determine an initial position stating position for the world space device 18. The initial position may be a "home" or "zero" position for axes control 19 axial response 21 output effecting a mechanical response 48 of the axial platforms 16 comprising the physical render device 13. Additionally, the initial position may be a starting position for the axes controls 19 for acquisition of axes behavior 20 input as values of axial actions 45 of a device object 15. The initial position of axes action may be representative of zero vector values for the global location and global rotation values (e.g., global location, global rotation discussed in conjunction with FIG. 3*b*) for the axial elements of the origin point 15*a*, the first axis 15*b*, the second axis 15*c*, the third axis 15*d* of a device object 15 comprised of the same axial platforms 16. The correlation of the axis controls 19 being more fully disclosed latter in conjunction with a discussion commencing at FIG. 10.

In one or more embodiments, the MCU 56 computing device for each axial platform 16 platform controller 18 and/or control platform 32 user controller 24 may report system ready in operation 85, and a user 10 may have establishing a unique tolerance in operation 86 for interaction to the axes control 19 axial behaviors 20 input for one or more axial platforms 16 and/or controller platform 23 (e.g., the device object 15 instance when configured as a device user agent 22) comprising the device object 15 instance and axial response 21 output of the axes controls 19 for the same one or more axial platforms 16 and/or control platform 23 having a control appliance coupled as subassemblies of the physical render device 13. System ready 85 and tolerance being more fully disclosed in conjunction with a discussion of FIG. 7 herein.

Operation 86 may then return to operation 83. Operation 83 having been completed and now satisfied as true, the example firmware logic 91 may initiate operation 87 to start the main loop 88. The main loop 88 may be executing the code logic and return to operation 87 throughout the lifecycle 81 of operation of the MCU 56.

In one or more embodiments, at each iteration of the main loop 88 may test for a communication request in operation 89. The communication request is abbreviated "comm. request 89"). Where a comm request 89 is present, one or more instances of the MCU 56 (e.g., computing devices of one or more platform controllers 18 and/or user controllers 24) communicating on the common communications bus 25 may be attempting to communicate and/or send signals. If a comm request 66 is detected and/or received, the example firmware logic 91 may invoke the controller communications 77 acting as a bus slave receiver 79 accepting incoming axes control interaction data (e.g., the data from chart 65*a* and/or chart data 65*b* shown in FIG. 4*a*) from the one or more instances of the MCU 56 from a platform controller 18 and/or user controller 24 acting as a bus master controller 78. The incoming axes control interaction data may then be utilized to effect an axial response 21, as previously discussed herein. The operations of the controller communications 77 and the common communication bus 26 more fully disclosed in a discussion of FIG. 7.

In one or more embodiments of the example firmware logic 91, where operation 89 is false, the axial behaviors 20 electronic signal values (e.g., the state of the pins, pulse count and or analog value) from the hardware prototype of the data pins of the axes input port 68 (FIG. 4*a*), read at each instance of the main loop 88 are read and conditionally evaluated against the tolerance variable values defined in operation 82 and determined in operation 85 for each of the first axis 15*b*, the second axis 15*c*, and/or the third axis 15*d* associated with platform controller 18 and or user controller 24.

Where the axial behavior 20 signal values (e.g., the electronic signal levels on the data pins of the axes input port 68) which may have been read and acquired may be conditionally evaluated and/or compared with tolerance variable values in operation 86*b* (e.g., the tolerance values determined in operation 86) the tolerance variable values when may not be exceeded returning a with a false condition at operation 86*b*, the example firmware logic 91 generating the values for axes control 19 axial response 21 from the values of axes control interaction data which may effect a mechanical response 48 of the first axis 15*b*, the second axis 15*c*, and/or the third axis 15*d* through the corresponding active components 17*b*. In one or more embodiments and as illustrated, the tolerance variable values when exceeded returning a with a false condition at operation 86*b*, the example firmware logic 91 additionally generating a priority request by generation of a PWM duty cycle 107*a*. The priority request 107 evaluated by the priority mediation protocol 26*a* (e.g., shown in FIG. 1), a winning priority request indicated by the priority mediation protocol through an electronic state of a grant line, the state of the grant line conditionally tested at operation 86*b*. According to one or more embodiments the state of the grant line determined at operation 87*b* which may indicate a winning priority bid may provide that MCU 56 now may be a bus master controller 78 may place the axes control interaction data upon the common communications bus 25. In an event where operation 87*b* indicates that the initial emitted priority duty cycle 107*a* resulting a bid losing priority bid by the priority mediation circuit 26, the priority duty cycle may be incremented and re-emitted 107*a* and the grant line state reevaluated. A priority mediation circuit 26 for control of directional flow and/or exchange of axes control interaction data (e.g., the example data of chart 65*a* and/or chart 65*b*) may be more fully disclosed in a discussion in conjunction with FIG. 7 herein.

As previously disclosed in conjunction with FIG. 1 and FIG. 2 a physical render device 13 which may define a device world space including at least one device object 15 instance configured as a device user agent 22. In one or more embodiments, FIG. 6*a* illustrates a user agent 54 (e.g., an instance of the 3D object 31) the functionality of a user agent 54 as previously described herein in conjunction with FIG. 3*b* and FIG. 3*b*. The user agent 54 of FIG. 6*a* depicted in a relationship with the parameters defining a world space 30, the parameters defined by the ground plane 47 and global reference point 46, as previously discussed herein. The user agent 54 may have the prototypical axial elements of a device object 15 instance (e.g., an origin point 31*a*, a first axis 31*b*, a second axis 31*c*, and a third axis 31*d*.)

FIG. 6*b* may illustrate a working example for physical construction of the functional diagram of the components of a device object 15 instance, the device object instance 15 configured as a device user agent 22. According to one or more embodiments, and as illustrated the active components 17*b* for the first axial platform 46 which may be the active component 46*c*, the active component 46*d*, the active component 46*e*, and the active component 46*f* of FIG. 2*b* utilized for axes controls for axial response 21 may be defined as physical device components in FIG. 6*b* which may substituted and/or exchanged with and/or replacing be the active component 46*c*, the active component 46*d*, the active component 46*e*, and the active component 46*f* (the view of active component 46*d* obstructed by other physical device components. In one or more embodiments the example working physical construction the physical devices of the active component 46*c*, the active component 46*d*, the active component 46*d*, and the active component 46*e* components illustrated as actuator devices. In other embodiments, the type and number of active components physical device may be different. For example, and as illustrated and disclosed in conjunction with FIG. 20 and FIG. 21 the type of the physical devices may be servo motors, mechanical linkages, etc. As illustrated in FIG. 6*b* the active component 47*b* of the second axial platform 47 may be similarly substituted and/or exchanged with and/or replaced with a rotational motor According to one or more embodiments and as depicted in FIG. 6*b* and previously discussed in conjunction with FIG. 2, the active components 17*b* of one or more axial platforms 16 as mechanical subassemblies of the device may effect a known desired mechanical response 48 from the configuration and/or arrangement and/or placement of the various supporting components of the same axial platform 16.

For example, in one or more embodiments and as depicted in FIG. 6*b* the active component 46*e* may form a mechanical linkage coupling a base plate 46*a* and manipulator plate 46 of the example first axial platform 46. The supporting mechanical linkage components which then may include an upper spherical joint 123*a* and an upper coupler 123*b* affixing the upper spherical joint 123*a* to the rod of the active component 46*e* and a lower coupler 123*c* affixing a lower spherical joint 123*d* to the body of the active component 46*e*. Applying an axial response 21 by axes controls 19 may then cause the rod of the active component 46*e* to extend and/or retract as a kinematic motion upon base plate 46*a*, the manipulator 46*b*, through the linkage components the upper spherical joint 123*a*, the active component 46*e*, the lower coupler 123*c*, the lower spherical joint 123*d* effecting a known and desirable kinematic and/or inverse kinematic mechanical response 48

In a continuation of the present example for physical construction of a working example device object 15 instance configured as a device user agent 22, in one or more embodiments a second axial platform 47 as a mechanical subassembly of the physical render device 13 may include a rotational motor 47*b* which then may be an active component 17*b* of which may have the supporting components of a turntable bearing 47*d* mechanically coupling a plate 47*a* of the second axial platform 47 mechanical subassembly with the manipulator plate 47*b* of the first axial platform 46 mechanical subassembly. Applying an axial response 21 by axes controls 19 to the active component 47*b* may then effect that the plate 47*a* may effect a desirable known mechanical response 48 of a physical rotation.

According to one or more embodiments and as illustrated in FIG. 6*b* in conjunction with a previous discussion of FIG. 2 and FIG. 3 herein, a known desirable mechanical response 48 effected by the active components 17*a* of the one or more mechanical subassemblies of the one or more axial platforms 16 comprising the device object 15 instances may have axes controls 19 wherein the known desirable mechanical responses 48 may correlated and/or associated with axial response 21 output for the active components which may be representative of axial actions 45 motions for one or more translations 42 and/or rotations 43 for the one more or more correlated and/or associated first axis 15*b*, the second axis 15*c* and the third axis 15*d* axial elements of a device object 15 instance.

Additionally, as illustrated one or more axial platforms 16 mechanical subassemblies, wherein the desired known mechanical responses 48 which may be associated and/or correlated with the complete axial action 45 motions of one or more translations 42 along and/or rotations around all axial elements of the correlated and/or associated first axis 15*b*, the second axis 15*c* and the third axis 15*d* axial may then constitute a device object 15 instance.

For example, in one or more embodiments of the example device object of FIG. 6*b* According to one or more embodiments and as depicted in FIG. 6*b* and previously discussed in conjunction with FIG. 2, the active components 17*a* of one or more axial platforms 16 as mechanical subassemblies of the device may allow that a user's 10 physical interaction with the each axial platform mechanical subassembly may provide a measurement of the user's 10 physical interaction relative to the configuration and/or arrangement and/or placement of the various supporting components of the same axial platform 16. Wherein the active components 17*b* effecting a known desired mechanical response correlated and/or associated with axes controls 19 or axial response 21 output for axial action 45 of the axial elements (e.g., first axis 15*b*, second axis 15*c* and third axis element 15*d*), the configuration, placement and or arrangement of the active components 17*a* correlated and/or associated and or aligned with the active components 17*b* and therefore the same first axis 15*b* element, and/or second axis 15*c* element and/or third axis 15 element the active components 17*b* may then measure an axes control 19 for axial behavior 20 input as a value of a user's 10 physical interaction as a value for the user's 10 intentions for an axial action 45 motion for translation 42 and or rotation 43 for one or more axial elements.

For example, in one or more embodiments as illustrated in FIG. 6*b* a second axial platform 47 may have a sensor group 47*c* configured to measure the strain front to back and/or left to right over a plate 47*a* produced by a user's 10 interaction with the example second axial platform 47. As illustrated, the user 10 may physically facing and stepping leftward direction relative to the axial platforms subassemblies comprising the world space device. The know and desired mechanical responses 48 correlated and or associated for axial action 45 for a second axis 15*c* element of a device object 15 instance. The left and right strain measured by the sensor group 47*c* may be measured as a value of the user's 10 step, the value may then be a value of a user' 10 intention for an axial action 45 of the second axial element 15.

As previously discussed in conjunction with FIG. 1 and FIG. 2 the axes control 19 axial behavior 20 input may produce a value for axes control 19 axial response 21 output effecting the desired known mechanical response 48. The configuration and/or placement and/or arrangement of or one or more active components 17*a* of one or more axial platforms 16 may additionally measure the mechanical responses 48 of the axial platform subassemblies which may enforce that correlated and/or associated axial actions 45 for the one or more the first axis 15*b* element, the second axis 15*c* element and the third axis 15*d* element has a value equitable and or readable as value for the global location and global rotation and/or a local location and local rotation previously discussed herein in conjunction with FIG. 3*b* according to one or more embodiments.

For example, in one or more embodiments the sensor 122 may be an active component 17*a* common to both the first axial platform 46 and the second axial platform 47 of the example physically constructed working example device object 15. The sensor 122 may possibly be a three axis gyrometer capable of measuring the desired known mechanical responses 48*a* of the axial platform 16 mechanical subassemblies effected by the axes controls 19 axial responses 21 as values of axial actions 45 for translation 42 along the first axis 15*b* element, the second axis 15*c* element and the third axis 15*d* element, the desired mechanical responses 48*b* may then provide axial actions 45 of rotations 43 around the first axis 15*b* element, the second axis 15*c* element. A desired mechanical response 48*c* may then provide axial actions 45 around a third axis 15*c*.

In a continued discussion of the present example, the cumulative of all known desired mechanical responses 48 (e.g., mechanical responses 48*a*, mechanical responses 48*b*, mechanical response 48*c*) wherein each mechanical response 48 may be correlated and/or associated with one or more axial actions 45 for one or more cumulative axial elements (e.g., the first axis element 15*b*, second axis element 15*c*, third axis element 15*d*). It should therefore be appreciated that each one or more mechanical response (e.g., mechanical responses 48*a*, mechanical responses 48*b*, mechanical response 48*c*) may be effected as a direction axial response 45 for translation 42 and or rotation 43 for one or more axial elements (e.g., the first axis element 15*b*, second axis element 15*c*, third axis element 15*d*). The direction of motion may be measurable by one or more active components 17*a* for axial behavior input until determination of a new global location and global rotation and/or a local location and local rotation for the device object 15 instance.

Figure 10:
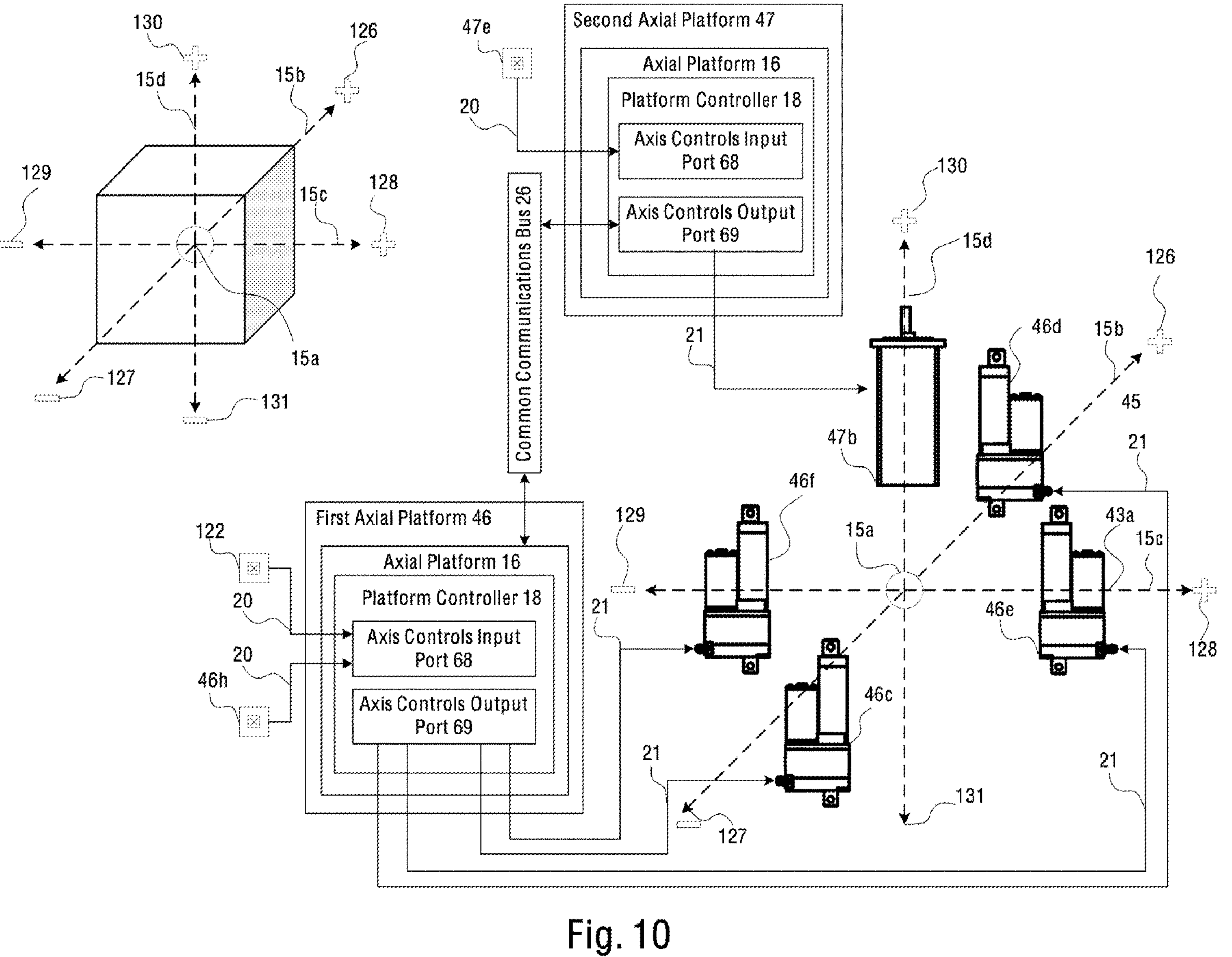
FIG. 10 depicting to the right of a prototypical 3d object as known in the relevant art. Additionally depicting to the left an example of the placement and/or arrangement of the physical devices components as the active components of two axial platforms comprising axes controls for an axial action of 3D motion for an example physical device object instance.

The method for configuration, placement and/or arrangement of the active components 17*a* and the active components 17*b* of the one or more axial platform 16 mechanical subassemblies and the correlation and/or association of the axes controls 19 for axial actions 45 of the axial elements including the origin point 15*a*, the first axis 15*b*, the second axis 15*c* and third axis element 15*d* for a device object 15 instance may be more fully disclosed in a discussion herein commencing with FIG. 10.

FIG. 6*b* depicting a user control platform 23 which may in one or more embodiments may include control appliance mounting plate 23*a* component of a control platform 23 mechanically coupled to the top of the plate 47*a* of the second axial platform 47 mechanical subassembly of the physical render device 13. Additionally, a mechanical linkage 23*b* comprising a u-joint 124 and adjustable drive shaft 125. The mechanical linkage 23*b* may have mechanical response 48*d* and mechanical response 48*e* may allow for the known desired mechanical responses 48 (e.g., mechanical responses 48*a*, mechanical responses 48*b*, mechanical response 48*c*) of the first axial platform 46 and the second axial platform 47 mechanical subassemblies to the user 10. Additionally, as illustrated a control appliance 25 which may possibly be a variant of a treadmill 97 mechanism has been mechanically coupled to the control appliance mounting plate 23*a*.

In a previous discussion of a user agent 54 3*d* object in conjunction with FIG. 3*b* and FIG. 3*c*, as known in the relevant art a user agent 54 may allow a user of a 3D world space 30 to control an 3D object instance for interaction with, and navigation of the 3D world space 30. According to one or more embodiments and as discussed previously in conjunction with a discussion of FIG. 1 and FIG. 2 at least one instance of a device object 15 may be configured as a device user agent 22. According to one or more embodiments as illustrated in FIG. 6*b* and in conjunction with the chart of FIG. 6*c* the at least one device object 15 instance may be configured as a device user agent 22 which may allow the device object 15 instance to provide for a user control role 97, a navigation role 99, an interaction role 97.

For illustrative clarity, the sensor arrangement including the sensor 60, the sensor 62, the sensor 64 of FIG. 6*b* may be of the same physical type and providing the same functionality for acquisition of axes control axial behavior 20 input as the sensor arrangements for the flywheel 58 discussed in conjunction with FIG. 4*a*.

In a previous discussion of FIG. 2 the active components 25*a* of a control appliance 25 may measure a user's 10 physical activity for input of axial behavior 20 for axes controls of the user controller 24 of the control platform 23. As illustrated in the working example physical construction of the device object 15 instance configured as a device user agent 22 the mounted control appliance 25 may have an arrangement of sensors (e.g., sensor 60, sensor 62, sensor 64) as the active components 25*a*. The arrangement of sensors mounted to a flywheel component 58 the of the treadmill 97 mechanism, the arrangement of sensor measuring the user's 10 physical activity as axial behavior 20 input for the axes control 19 by the magnetic pickup field as each (e.g., sensor 60, sensor 62, sensor 64) pass by the magnet 59. The acquired axial behavior 20 input measuring a user's 10 physical activity may then be similar to the signal patterns expressed for axial actions 45 previously discussed in conjunction with FIG. 4*b*.

Figure 6C:
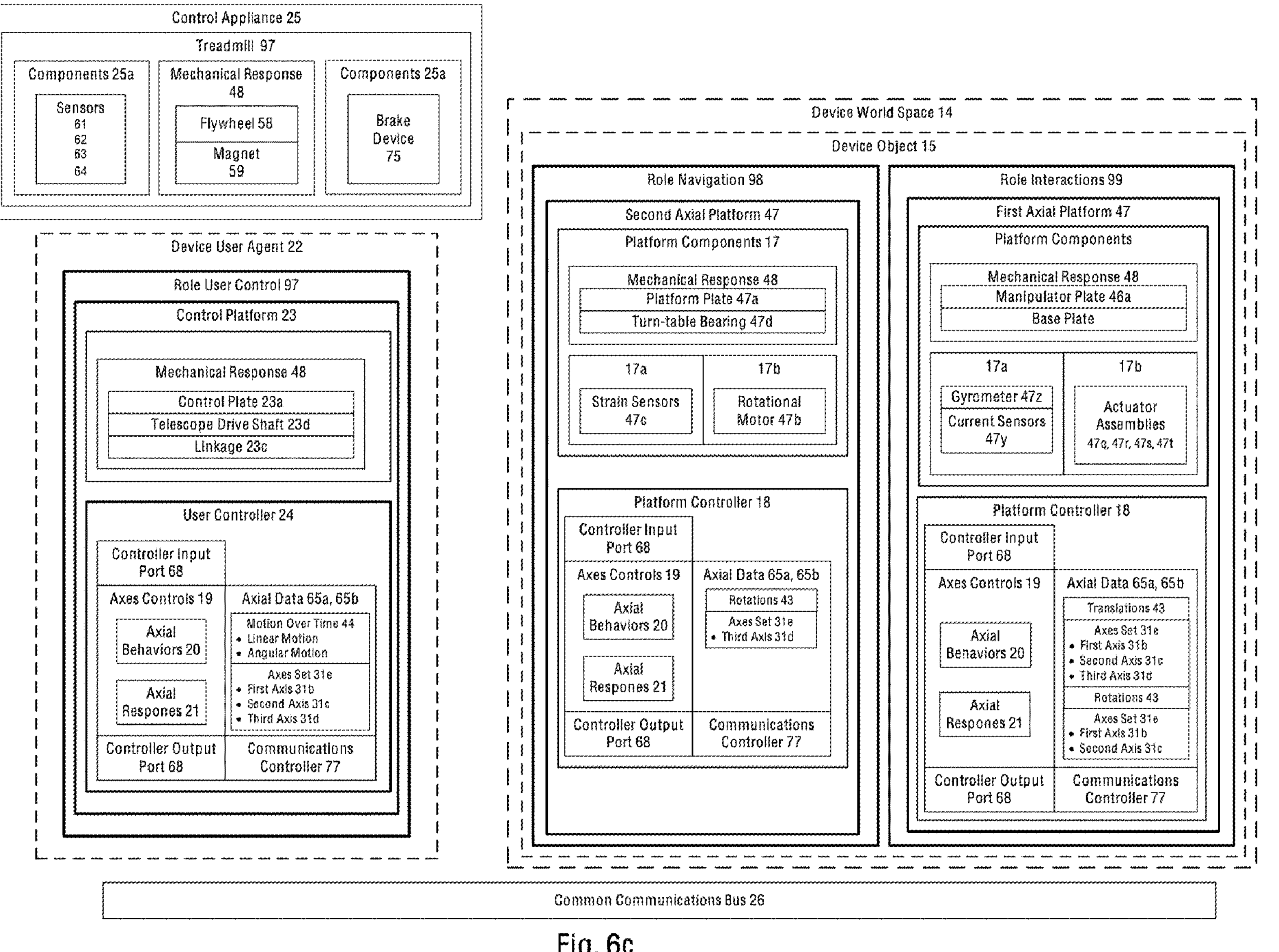
FIG. 6*c* is a chart correlating each physical device components constructing the example physical device object instance, the with the role aspects for control, navigation, world space interactions of a user agent 3D control object axes controls may play, wherein the physical device object configured as a device user agent 3D control object.

According to one or more embodiments as shown in the chart of FIG. 6*c* in conjunction with FIG. 6*b*, the components of the first axial platforms 16 comprising a device object 15 may provide for axial actions 45 motion for the device object 15 (e.g., shown in FIG. 3) the axial actions 45 may provide for the navigation role 98 and the interaction role.

For example, the working example of a first device object 15 instance comprised as having a first axial platform which may provide for axes controls 19 for axial actions 45 for translations 42 of one or more first axis 15*b*, second axis 15*c*, third axis 15*d* and/or rotations 43 of for a first axis 15*b* and/or a second axis 15*d*, the axial actions 45 may provide for interactions of the device object 15 relative to the global reference point 46 and the ground plane 47 which may define device world space 14, the first axial platform 47 then providing an interaction role 97.

In a continued discussion of the present example, the second axial platform 47 which may be providing for axes controls 19 for axial actions 45 for a rotation around a third axis 15*d* may allow the device object 15 to change have forward the axis designated as forward rotated 43 by axial action 45 towards a navigation direction relative to the global reference point 46. The second axial platform 47 may then provide a navigation role 98.

In further details of the present example, a control platform measuring as user's physical activity may provide axial actions 45 by applying the user's physical activity as motion over time 44 allowing a user 10 to provide a user control role 97 which may provide a user 10 with the ability to the control the device object 15 for navigation and interaction with device world space 14.

Refocusing on FIG. 6*a* in conjunction with FIG. 3*a*, FIG. 3*b* and FIG. 3*c*. The user 10 utilizing a user agent 54 for control of the avatar 55 allowing the user 10 to navigate the user agent 54 through extents of the defined 3D world space 30 using axial actions 45 of translations 42, rotations 43, linear instances of the motion over time 44 and/or angular instances of the motions over time 44. The user agent 54 may interact with other various other 3D objects 31, features and/or physics within the defined 3D world space 30. Such interactions may affect the global loc and/or global rot of the user agent 54, for example by affecting the global loc "location" and/or rot "rotation" of the user agent object 54 axes set 31*e* as referenced from the global reference point 46. The interactions of the user agent 54 additionally effecting the local location and local rotation of the user agent 54, as also previously discussed herein.

According to one or more embodiments and as illustrated in a discussion of a user agent 54 of FIG. 6*a* in conjunction with a discussion the device object 15 configured as a device user agent as depicted in FIG. 6*b* may then share similar component and analogous operability. It should then be appreciated that a device object 15 instance configured as a device user agent 22 in device world space 14 may replicate a user agent 54 object in 3D world space 30.

In previous discussions of FIG. 1 in conjunction with FIG. 2, FIG. 4*a* and FIG. 6*b* the one or more axial platform 16 which may be the mechanical subassemblies of the physical render device 13. The one or more axial platforms may additionally provide axes controls 19 which may provide a correlation and/or association of the desired mechanical responses 48 of the mechanical subassemblies and the one or more axis elements of axial action 45 of a device object 15 instance. A cumulative of all axial platforms 16 representative of axial actions 45 of translations 42 along and/or rotations 43 around a cumulative set of a first axis 15*b*, second axis 15*c* and third axis 15*d* may be representative of a device object instance 15. According to one or more embodiments one or more axial platforms 16 providing axes controls 19 for axial action 45 for one or more of a first axis 15*b*, second axis 15*c*, third axis 15*c* wherein more than one axial platform, the axes control axial behavior 20 input data 65*a* and/or 65*b* of FIG. 4*a* may be exchanged and/or synchronized between the one or more axial platforms 16 which may ensure that the first axial action 45 of a device object 15 instance and each subsequent axial action 45 of a device object 15 instance may be determined and respective to cumulative set of the first axis 15*b*, second axis 15*c*, third axis 15*d* and relative to the parameters defining device world space 14.

In previous discussions of FIG. 1 in conjunction with FIG. 2, and FIG. 6*b* a device object 15 instance may be configured as a device user agent 22. A control platform 23 may measure a user's 10 physical activities for axes control 19 which may allow the user 10 to control a device object 15 instance for interaction with the device world space 14. A disclosure of the methods for definition of device world space 14 more fully discussed herein in conjunction with a discussion commencing with FIG. 24.

As previously discussed, in one or more embodiments each axial platform 16 may have a platform controller 18 including a computing device (e.g., the example MCU 56). The axial platforms 16 including the platform controller 18 which may have a configuration for a hardware prototype as illustrated in FIG. 4*a*, additionally the firmware logic for each computing device may have a logic prototype depicted in FIG. 5. According to one or more embodiments each one or more control platforms 23 may have a user controller 24 including a computing device which may then be similarly be hardware prototyped as depicted in FIG. 4*a* and may have a firmware logic prototype similar to the logic prototype of FIG. 5.

Figure 7:
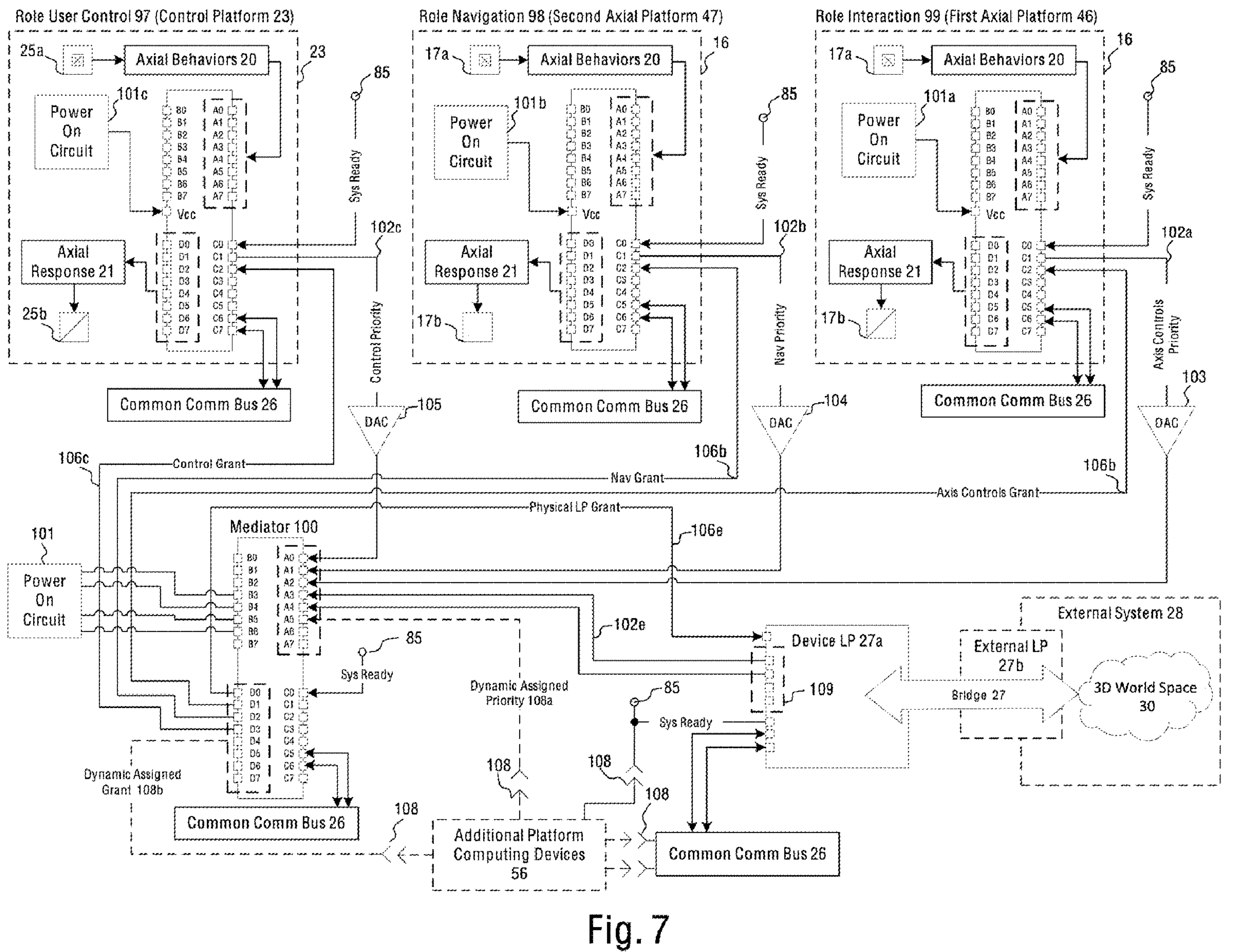
FIG. 7 illustrates an electronic circuitry which may provide a hardware enforced instance of a priority mediation protocol of the axes controls of a physical device object.

According to one or more embodiments and as depicted in FIG. 1 the computing device (e.g., the example MCUs 56) for each platform controller 18 and user controller 24 may be communicatively coupled with a common communications bus 25 for exchange and/or synchronization of axes control 19 data acquired as axial behavior 20 input (the example data depicted in chart 65*a* and/or the example data 65*b* shown in FIG. 4*a*.) FIG. 7 depicts a priority mediation protocol 26*a* which may be utilized to control the flow of axes control 19 data between the one or more axial platforms 16 and the one or more control platforms 23.

In one or more embodiments, FIG. 7 illustrates a multi-master instance of the priority mediation protocol 26. In one or more embodiments, an example priority mediation protocol 26*a* may be implemented as multi-master control of a TWI ("two wire interface") master/slave communication protocol. In one or more other embodiments, a priority mediation protocol 26*a* may be implemented with other master/slave protocols (e.g., SPI "Serial Peripheral Interface") by modifying the hardware prototype and firmware prototype of the control lines per the specification of the master/slave protocol communication feature being implemented.

As known in the relevant art, each device on a communications bus being a master or slave device may have a unique address identifying the device. A master device may address a slave device by its unique address, and/or a slave may respond by "ack" and/or acknowledge on the communications bus. A master may then generate a request sent to a write bit and data/or read bit, and a slave may respond by receiving data from the master write request and/or or returning the data requested by the master read request. Additionally, a master may broadcast a general call addressing all slaves on the bus, where all slaves may be configured to accept a general call may then accept the data from the master device.

In one or more embodiments, and as illustrated in conjunction with FIG. 4*a* and FIG. 5 a priority mediation protocol 26 may introduce a new third state of a slave device where a slave device may be mutually linked (e.g., the mutual link 79*a* of FIG. 4*a*). A bus slave receiver 79 may be in a mutually linked state (e.g., the mutual link 79*a*) that may allow the bus slave receiver 79 to listen for a general call from one or more mutually linked instances of the bus master controller 78, for example listen for axes control interaction data (e.g., the example data of chart 65*a* and/or example axes control interaction data of chart 65*b* shown in FIG. 5) pertaining to one or more of the first axis 15*b*, the second axis 15*c*, and/or the third axis 15*d*. In one or more embodiments, computing devices of the one or more user controllers 24 and/or platform controllers 18 may establish a mutual link 79*a* with one or more other user controllers 24 and/or platform controllers 18 during the initialization (e.g., operation 84 shown in FIG. 5) of the computing device firmware prototype by the definition of a mutual link variable containing a device address for bus master controller 78. The computing device acting as the bus master controller 78 may prefix a message for the exchange and/or synchronization of the example axes control interaction data 65*a* and/or axes control interaction data 65*b* with a message containing the bus master controller 78 device address. In one or more embodiments, a different computing device on the common communications bus 25 acting as a bus slave receiver 79 having a mutual link 79*a* variable containing an axis of general call for the bus master controller 78 address may check the prefix message and accept the example axes control interaction data 65*a* and/or the axes control interaction data 65*b* effecting an axial response 21 for the mutually linked axis. In one or more embodiments, a different computing device on the common communications bus 25 may act as a bus slave receiver 79, which may not have a mutual link 79*a* variable containing a mutually linked axis, and may therefore discard messages prefixed with the bus master controller 78 address.

A mutual link 79*a* may be beneficial for allowing a computing device on the common communications bus 25 to listen for general calls and/or selectively listening for mutually linked general calls comprising axes control interaction data (e.g., the example data of 65*a* and/or axes control interaction data 65*b*.) This may provide the ability to exchange the axes control interaction data for one or more axis element (e.g., the first axis 15*b*, the second axis 15*c*, the third axis 15*d*) between one or more computing devices, allowing the other computing devices to continue collecting axes control 19 axial behaviors 20 input and effecting axial responses 21 for one or more other axes without interruption. For example, referencing FIG. 7, a control platform 23 may act as a role user control 97 for a device user agent 22 (an instance of a device object 15) in the device world space 14 (e.g., as shown in FIG. 1 and FIG. 26.) The control platform 23 may take a user's activity as axes control 19 axial behavior 20 input for control of a device object 15 instance, the control may which possibly indication a desire to navigate in a leftward direction relative to a global reference point 46 of device world space 14. A second axial platform 47 taking axes controls 19 for axial behaviors 20 for and effecting an axial response 21 that is a rotation 43 around a third axis 15*d* of a device object 15 instance. A user control around for a leftward direction axes control 19 axial behavior 20 by the active components 25*a* of a control appliance 25 (e.g., shown and discussed herein in conjunction with FIG. 9*a*) mounted to a control platform 23 may be mutually linked 79*a* with the third axis 15*d* for axial action 45 for rotation 43 of a device object 15 instance allowing for an axial action 45 as a rotation 43 of the device object 15 instance in a leftward direction relative to the global reference point 46 of device world space 14. The computing device (e.g., an MCU) of an axial platform 16 platform controller 18, as a first platform 46 of the device object 15 providing axial actions for translations 42 for the first axis 15*b*, second axis 15*c* and third axis 15*d* and/or rotations for the first axis 15*a* and second axis 15*b* may not be defined for a mutually linked 79*a* rotation around the third axis 15*d* and the computing device may ignore the general calls prefixed for third axis 15*d* rotations which may avoid interruption of the main loop 88 of the firmware prototype of FIG. 5 while still maintain an ability to participating in other general calls over the communication communications bus 25.

In one or more embodiments, each computing device of the one or more user controllers 24 and/or platform controllers 18 may be connected to the common communications bus 25 and/or a participatory member of the priority mediation protocol 26. In one or more embodiments, a mediation of increasing level of priority may be introduced for determination of the state of the computing devices on the common communications bus 25, the computing devices being in one state of bus master controller 78 and/or bus slave receiver 79. The mediation of increased level of priority may be implemented with the priority mediation protocol 26*a*.

In one or more embodiments, a method of mediation may be integrated into and/or functionally associated with the physical render device 13 as additional hardware and/or firmware solution in order to leverage the characteristics of the computing devices of the platform controllers 18 and user controllers 24. FIG. 4*a* introduced a discussion of an example computing device, the MCUs 56, as hardware and firmware that may accept electronic signals on data pins 56*b* defined as input for a port 56*a* that may control electronic signals of data pins 56*b* defined as output for a port 56*a*. In one or more embodiments, the priority mediation protocol of the priority mediation protocol 26*a* may be comprised of electronic circuitry for mediation of a level of priority determining the assignment of a state, where the state may be a bus master controller 78 and/or bus slave controller 80 assigned to each computing device on the common communications bus 25.

In one or more embodiments, an example a of the priority mediation protocol circuitry as illustrated in FIG. 7, a mediator 100 (e.g., an MCU) may interact with the one or more control platforms 23 and/or platform controllers 18 by electronic signals over control lines wired to the data pins of the computing device ports. In one or more embodiments, the example computing devices may be instances of the MCU 56. In one or more other embodiments, the computing devices may share the traits of an MCU, processor, or other integrated circuit, as previously discussed herein. Each MCU 56 computing device during a setup step (e.g., operation 82 of FIG. 5) may have a data pins defined for the output of a common system ready line 85. As illustrated in the example circuitry of FIG. 7, the data pin may have been defined on Port C data pin C0 for controller communications 77 (e.g., operation 84 of FIG. 5) for each instance of the MCU (e.g., the MCU of the control platform 23, the MCU of the first axial platform 46, the MCU of the second axial platform 47, the mediator 100). Additionally, each MCU 56 may have a second data pin defined for unique priority, the priority control line 102*a*, the priority control line 102*b*, and the control line output 103*c* shown on Port C data pin cl of the MCU of the first axial platform 46, the MCU of the second axial platform 47, and the MCU of the control platform 23, respectively. Each MCU 56 may include a data pin defined for input of a unique grant control line, the grant control line 106*a*, the grant control line 106*b*, and the grant control line 106*c* shown on Port C data pin cl of the first axial platform 46, the MCU of the second axial platform 47, and the MCU of the control platform 23, respectively.

In one or more embodiments, each of the system ready line 85, the control line output of the priority control line 102*a*, the priority control line 102*b*, the priority control line 102*c*, the grant control line 106*a*, the grant control line 106*b*, and the grant control line 106*c* may be communicatively coupled (e.g., "wired" via a trace on a circuit board, a physical wire, and/or connected through a wireless connection) to the mediator 100 for intake of priority control lines 102 collectively, system ready line 85 and the output of the grant control line 106, collectively. In the present example embodiment of the priority mediation protocol 26*a*, circuitry of the mediator 100 may be an MCU 56 computing device as previously described herein. In one or more other embodiments, the mediator 100 may be a different computing device, including one sharing one or more of the features and capabilities of an MCU as previously described in conjunction with FIG. 4*a* herein. Additionally, the mediator 100 may be comprised of discrete electronic components (e.g., resistors, capacitors, integrated circuits, transistors etc.) arranged in a manner to take the signals of the various control lines electronically effecting the methods of a priority mediation protocol 26*a*.

A discussion of the method of enforcement of the example priority mediation protocol 26*a* circuitry as depicted in FIG. 7 is now presented according to one or more embodiments. The MCU 56 computing devices as the platform controllers 18 and user controllers 24 may be master and/or slave devices of a multi-master master/slave communication protocol. The computing devices additionally may be participating members of a priority mediation protocol 26*a* wherein each instance of the MCU 56 being mediated and/or prioritized may include a priority control line 102 (e.g., the priority control line 102*a*, the priority control line 102*b*, and the priority control line 102*c*). Each priority control line 102 may be defined for PWM "pulse width modulation" where an increasing duty cycle of the PWM signal output by each MCU 56 computing device may indicate the level of priority request by each MCU 56.

In a continued discussion of the priority mediation protocol 26*a*, each of the priority control line 102*a*, the priority control line 102*b*, and the priority control line 102*c* may be passed through a DAC ("digital to analog converter"), the DAC 103, the DAC 104, and the DAC 105, respectively. A DAC may convert the variable digital pulses of the PWM duty cycle to an analog reference value for the priority request for each MCU 56 computing device on the common communications bus 25. In one or more embodiments, the analog values may be determined as priority input on priority control lines 102 by the mediator 100. The mediator 100 may read and compare the analog values for each priority request from the priority control line 102*a*, the priority control line 102*b*, and/or the priority control line 102*c* to determine a winner by the highest reference value.

In a continued discussion the example priority mediation protocol 26*a* circuitry of FIG. 7, each MCU 56 computing devices of the one or more control platform 23, and the one or more axial platforms 16 (e.g., the example first axial platform 46 and the example second axial platform 47 of the example device object 15 instance) may include a defined digital input grant control line, the grant control line 106*a*, the grant control line 106*b*, and the grant control line 106*c*. A mediator 100 implemented as an MCU 56 may have collective grant control lines 106 defined as digital output pins for each of the grant control line 106*a*, the grant control line 106*b*, and the grant control line 106*c*. The grant control line 106*a*, the grant control line 106*b*, and the grant control line 106*c* may be communicatively coupled (e.g., wired) to the defined grant control line pins of the MCU 56 of the mediator 100 (e.g., data pin d0 through d3).

In a continued discussion the example priority mediation protocol 26*a* circuitry of FIG. 7, each one of the one or more instance of the MCU 56 may communicate on the common communications bus 25 beginning in a state of bus slave receiver 79 after completion of the run once condition in operation 83 and at the start of the execution of the main loop 88 in operation 87 for the firmware logic 91 of FIG. 5. The mediator 100, upon determining an instance of an MCU 56 having a winning priority from the collective analog inputs of the priority control lines 102, may pull the corresponding digital grant control lines 106 for the winning MCU 56 computing device (e.g., pull to a "low" voltage), granting the MCU 56 computing device (e.g., operation 106 shown in FIG. 5) invoking the bus master controller 78 master state of the defined controller communications 77 which may allow the computing device to place axes control interaction data (e.g., the example data of chart 65*a* and/or the example data of chart 65*b* shown in FIG. 4*a*) on the common communications bus 25. For example, where the signal from the second axial platform 47 transmitted from pin C1 along the priority control line 102*b* and received by the mediator at pin A1 is the highest signal strength, the mediator 100 may drop the voltage on pin D2 to transmit the grant of winning priority along the grant control line 106*b* that is then received on pin C2 of the second axial platform 47.

In one or more embodiments, a MCU 56 having won priority and having invoked the controller communications 77 bus master controller 78 the MCU 56 may pull the defined output digital pin for common system ready control line 85 low. As known by a person skilled in the art, a common named signal and/or "wire" on a schematic may be indicated as showing a common "trace" connecting various components throughout the circuit reducing the number traces improving clarity while interpreting the circuit. The system ready line 85 may be a named signal common connecting Port c data pin c0 on each MCU 56 and the mediator 100 as shown in FIG. 7. or on 85. The common system ready line 85 may be wired to the mediator 100 at (Port c, data pin c0) and may be defined as digital input, where the mediator 100 reading the change in state of the common system ready line 85 may not "grant" any other MCU 56 a state of bus master controller 78 so long as the common system ready 85 has a low state preventing an occurrence of more than one master on the common communication bus 26 per the specifications for a master/slave protocol.

In one or more embodiments, an MCU 56 computing device having won priority and having invoked the bus master controller 78 state of the controller communications 77 may communicate the example axes control interaction data 65*a* and/or the axes control interaction data 65*b* from the acquired axial behaviors 20 to one or more other instances of the MCU 56 computing being in a state of bus slave receiver 79 on the common communication bus 26, as previously discussed. The MCU 56 acting as the bus master controller 79 may then release the common system ready 85 back to high. The mediator 100 reading the changing in state of the common system ready line 85 may release the grant control line 106*a*, the grant control line 106*b*, and/or the grant control line 106*c* to the appropriate instance of the MCU 56. The MCU 56 in the bus master controller 78 state without a "grant" (e.g., without prioritization) may then return to a state of the bus slave receiver 79. The mediator 100 may then repeat the selection of a new winner and/or grantee of an instance of the MCU 56 computing device, again assigning the bus master controller 78 by the level of priority as requested on one or more instances of the priority control line 102.

In one or more embodiments, a computing device such as the MCU 56 having a losing priority request as read by the mediator 100 may increase the level and/or signal strength (e.g., operation 107*a* of FIG. 5) of a signal on an instance of the priority control line 102 (e.g., the priority control line 102*a*, the priority control line 102*b*, and/or the priority control line 102*c*), for example by increasingly adjusting the PMW duty cycle 107 at each iteration of the main loop 88 of the example firmware logic of FIG. 5. Alternatively, or in addition, an MCU 56 computing device, during the execution of a next iteration of the main loop 88, may determine that a priority request is no longer required and may discard the priority request from the collective priority determined read by the mediator 100. For example, an instance of the MCU 56 may relinquish its priority request on its priority control line 102 by setting the PMW duty cycle 107 to zero.

In one or more embodiments, an interaction of a user 10 with the axial platforms 16 and/or control platforms 23 of the physical render device 13 may effect an acquisition of a tolerance in operation 86 of FIG. 5 of the user 10 from the axial behaviors 20 and/or axial responses 21 of the 25*a* control platforms 23 and/or axial platforms 16. The computing devices, for example the user controllers 24 and/or platform controllers 18 of the one or more control platforms 23 and/or axial platforms 16, may gather such tolerances of the user 10 in operation 86*a* of FIG. 5. During an iteration of a main loop 88, the values of the currently collected axial behaviors 20 acquired as axes control interaction data 65*a* and/or axes control interaction data 65*b* may be conditionally compared to acquire what may be a unique tolerance for a user 10. A current set of axes control interaction data 65*a* and/or axes control interaction data 65*b* exceeding unique tolerance of the user 10 may produce a PWM duty cycle on the priority control line 102*a*, the priority control line 102*b*, and/or the priority control line 102*c*, as may transmit signals to the priority mediation protocol 26*a*. In such case, the unique tolerance of the user 10 for the control platform 23 and/or axial platform 16 may first be evaluated before a priority request is generated.

In one or more embodiments, the mediator 100 may supply power to the computing devices (e.g., each MCU 56) in a sequence such that: (i) each one of the platform controllers 18 for axial platforms 16 that may be useable for a role of interaction 97 may be powered on first, (ii) the platform controllers 18 for axial platforms 16 act as the role navigation 98 are powered on second, and (iii) that the user controllers 24 for control platforms 23 act as the role user control 97 are powered on last.

A Discussion of the power on circuit 101 of FIG. 7 will now be continued. Each device and/or computing device communicating on the common communication bus 26 may set up in operation 82 and initialize in operation 84, including initialization of the ports and data pins for a axes input port 68 and axis output port 69 necessary for axes control 19 acquisition of axial behaviors 20 and/or axial responses 21 for the first axis 15*b*, the second axis 15*c*, and/or the third axis 15*d* device user agent 22. Additionally, each computing device (e.g., MCU 56) may set a home or zero position during the initialization of operation 84 allowing that each of the first axis 15*b*, the second axis 15*c*, and the third axis 15*d* of the device object 15 may be synchronized for the role of device user agent 22.

In a continued discussion of the power on circuit 101 of FIG. 7, each computing device (e.g., MCU 56) powered on sequentially may make a priority request on a priority control line 102 (e.g., the priority control line 102*a*, the priority control line 102*b*, the priority control line 102*c*) as previously discussed herein to a mediator 100. The priority request may establish that the first instance of an MCU 56 computing device has established a system ready state (e.g., the change in signal level of the common system ready control line 85) and may be ready to be a participating member of a priority mediation protocol 26*a*. A mediator 100 recognizing a system ready by the MCU 56 which may be determined by the change in signal level of the common system ready control line 85 signal may then power on the next instance of the MCU 56 computing device of a sequence, the role axis control 99, the role navigation 98, and then the role user control 97.

In a previous discussion of the special type user agent 54 3D object in conjunction with FIG. 3*c*, as known to a person skilled in the relevant the user agent 54 may allow a user 10 to control other 3D object 31 instances which may be configured for user control which then may allow for a user 10 to navigation and/or interact with a 3D world space 30. For example, as illustrated the 3D object 53 shown in FIG. 3*b* and FIG. 3*c* which may be a vehicle type of 3D object, the 3D object 55 shown in FIG. 3*c* may be an avatar 55 including an armature 55 representative of the user 10.

According to one or more embodiments a device object 15 instance as illustrated and previously discussed in conjunction with FIG. 6*a*, FIG. 6*b* and FIG. 6*c* each one or more axial platform 16 comprising the device object 15 instance configured as a device user agent which may provide roles for navigation 98 and/or interaction 99, a control platform 23 may provide for a role of user control 97 of the configured device user agent 22 which may then allow a user 10 to interact with and/or navigate device world space 14. In one or more embodiments FIG. 8 illustrates an example user controller 24 of a control platform 23 that may include a computing device such as an MCU 56, which may be set up similar to the prototype for hardware (e.g., as shown and described in conjunction with FIG. 4*a*) and/or may store and/or execute the example firmware logic (e.g., as shown and described in conjunction with FIG. 5).

Figure 8:
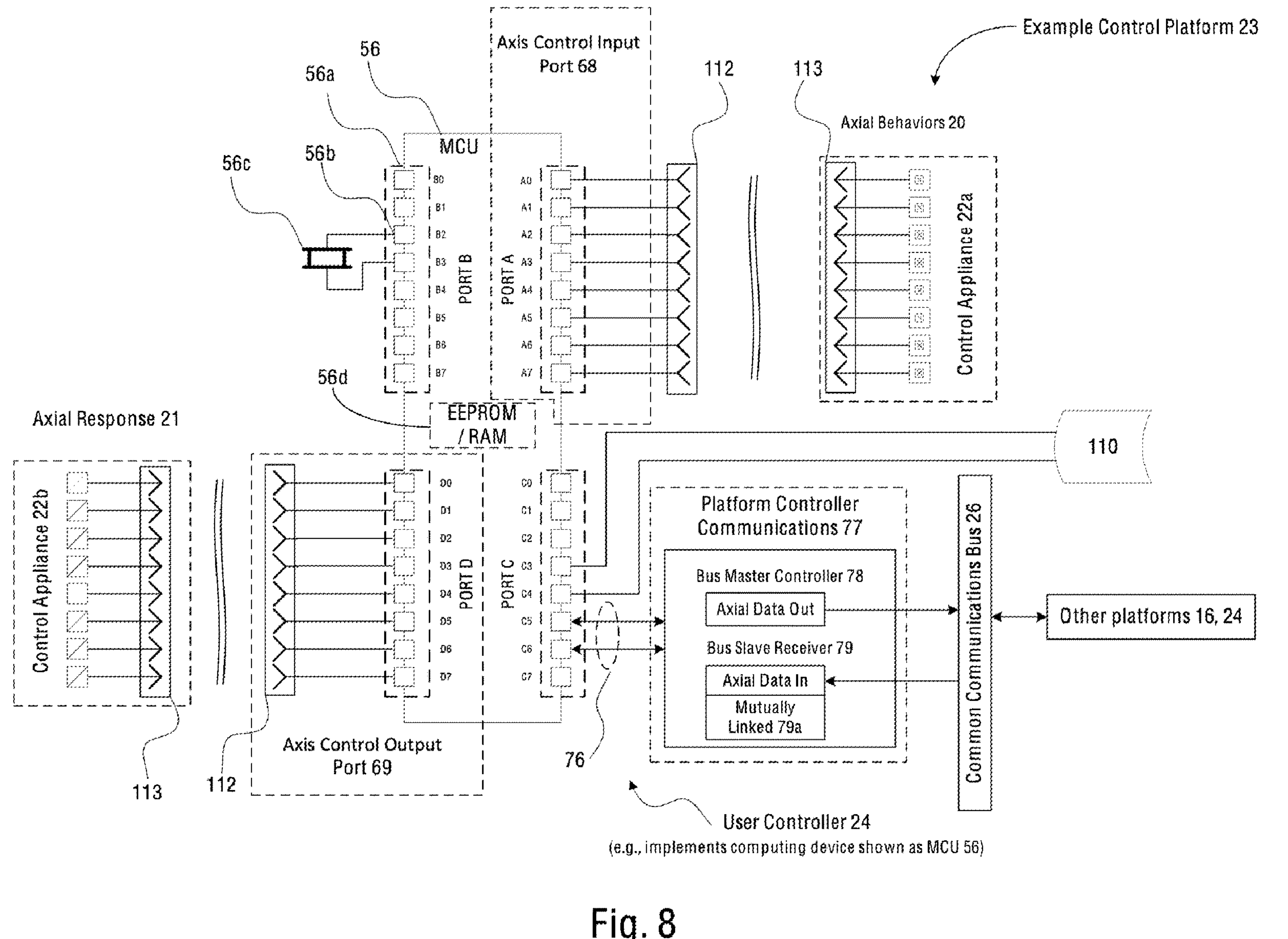
FIG. 8 illustrates an example configuration of a control platform including a user controller. The control platform providing axes controls for a physical device object configured as a device user agent.
Figure 9A:
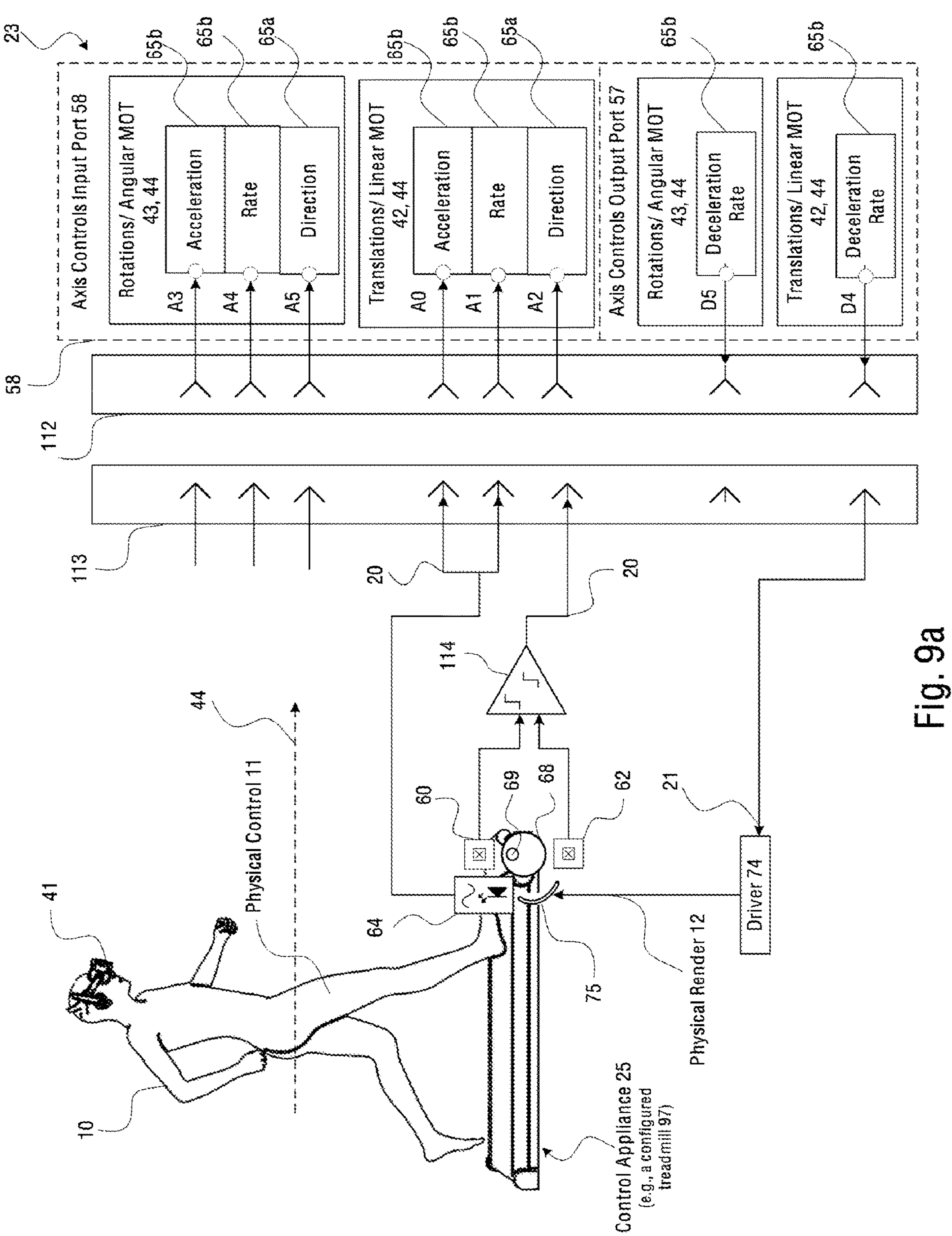
FIG. 9*a* illustrates an example of a first control appliance device that may be communicatively coupled with control platform of the world space device. According to one or more embodiments the mechanics of a user's physical activity may be a source for generation of the axes controls.

While still referencing FIG. 8, and additionally FIG. 6*b* and FIG. 9*a*, in one or more embodiments a device user agent 22 (a configured instance of a device object 15) may include one or more one control platforms 23 (FIG. 1 and FIG. 6*b*) A control platform 23 may include a control appliance mounting plate 23*a* for mechanically coupling a non-fixed, non-permanent and swappable control appliance 25. The active components 25*a* and 22*b* included in a control appliance 25 which may be fixed to the physical render device 13 and communicatively coupled with the user controller 18 for input and output the axes controls 19 which may be the axial behavior 20 signals acquired (e.g., analog, digital) by the user controller 24 input port 66—and/or the definition of the axial response 21 signals output on the user controller 18 output port 69 data pins during setup in operation 82. Additionally, the variables defined for acquisition of axial behaviors 20 signals as values of axes control interaction data (e.g., the example data 65*a* and/or 65*b* of FIG. 4*a*) defined in the set-up operation 82 for the axes set of the device object further defining the user controller 24 which may allow the user controller to act in the role of user control 97 for the device user agent 22 (a configured device object 15 instance).

For illustrative clarity, the sensor arrangement including the sensor 60, the sensor 62, the sensor 64 of FIG. 9*a* may be of the same physical type and providing the same functionality for acquisition of axes control axial behavior 20 input as the sensor arrangements for the flywheel 58 discussed in conjunction with FIG. 4*a*. The acquired axial behavior 20 input measuring a user's 10 physical activity may then be similar to the signal patterns expressed for axial actions 45 previously discussed in conjunction with FIG. 4*b*.

In one or more embodiments, the device user agent 22 as the user controller 24 (an MCU 56 computing device) may have been prototyped for a axes input port 68, with data pins A0, A1, A3, and A4 may have been defined in the firmware logic as analog inputs, and where the data pins A2, and A5 may have been defined for digital input. The defined pins of the axes input port 68 may be wired to a connector 112, for example as shown in FIG. 8. In a previous discussion of FIG. 6*b* a control appliance 25 of the present example may include a treadmill 97 having a flywheel 58 with a magnet 59 positioned on a portion of the flywheel 58. A mechanical response may be the flywheel rotating as a user 10 physically interacts with the treadmill 93 (e.g., as shown in the embodiment of FIG. 6*b* and FIG. 9*a*.) The active components and/or electronic circuitry 25*a* of the control appliance 25 may produce the electronic signals of the axes controls 19 for input of axial behaviors 20, the active controls 25*a* may then be measuring a user's 10 physical activity for axes control 19 input according to one or more embodiments.

For example, a sensor 64 (e.g., as shown in FIG. 4*a*) may be an optical speed sensor of FIG. 9*a* outputting an analog value, the sensor 64 which may be an active component 25*a* included in the control appliance 25. An output of the analog sensor 64 may be wired to a plug 113 and/or other interface connector. The plug 113 or other interface connector, when coupled with the connector 112 of the user controller 24, may electrically connect the output of the optical speed sensor (e.g., an analog speed sensor 64) to data pin A0 and data pin A1 of the axes input port 68 defined for analog input. The variables defined for collection of the axial behaviors 20 may be the axes control interaction data (e.g., an analog range as shown and described in conjunction with chart 65*b*, FIG. 5) representative of an acceleration 44*h* and/or rate 44*b* of an axial action 45 of linear motion over time 44 (e.g., as shown and described in conjunction with FIG. 3*c*).

In a continued discussion of the present example device user agent 22 (a configured device object 15 instance) and the control appliance 25 shown in FIG. 9*a*, the sensor 60 and the sensor 62 may be hall effect sensors which may detect a magnetic pickup field for the position of the magnet 59, for example as the flywheel 58 rotates (the sensor 61 and the sensor 62 of FIG. 4*a* being removed). Rotation of the magnet 59 on the flywheel 58 may then producing a sequence of electronic pulses, for example as previously discussed in conjunction with FIG. 4*a*. The arrangement of the sensor 60 and the sensor 62 may be opposed, resulting in a leading edge pulse being phased by 180 degrees. The pulses may be electronically compared by comparator 114 to produce a digital signal. In one or more embodiments, the electronic signal of the leading edge of the pulse from sensor 60 may be first indicate the flywheel rotating in forward direction, where the resultant comparison may be equivalent to zero or "low" (e.g., a low voltage signal). The electronic signal of the leading edge of the pulse from sensor 62 may first indicate the flywheel rotating in a reverse direction, where the resultant comparison may be equivalent to 1 or "high". The output of a comparator circuitry may be wired to a plug 113. The plug 113 when coupled with the connector 112 of the user controller 24 may electrically connect the output of the comparator 114 to data pins A2 of the axes input port 68 defined for digital input. The variables defined for collection of the axial behaviors 20 may be all or a portion of the axes control interaction data (e.g., chart 65*a* of FIG. 5 may be an example of digital data collection) which representative of a direction of an axial action 45 of a translation 42.

For illustrative clarity, the breaking device 75 and/or driver 74 of FIG. 9*a* may be of the same physical type and providing the same functionality for output of axes control axial response 21 as the breaking device arrangement for the flywheel 58 discussed in conjunction with FIG. 4*a*. The axial response output effecting mechanical response 48 may then be similar to the signal patterns expressed for axial actions 45 previously discussed in conjunction with FIG. 4*b*.

In one or more embodiments, the device user agent 22 (a configured instance of a device object 15) the user controller 24 may include the computing device (e.g., user controller 24) may have been prototyped for a controller output port 69, with the data pin D4 and the data pin D5 defined for a PWM signal as previously discussed in conjunction with FIG. 4*a* and FIG. 5. The active components 22*b* may accept taking an axial response 21 that may be an electronic signal which may activate an electromechanical breaking device 75 (e.g., solenoid clutch, break etc.) and a driver 74 having an output wired to the breaking device 75 for converting PWM input signals to the required signals for proportionally engaging and/or restricting the rotational the rotation of the flywheel 58. The input of the driver 74 may be wired to the plug 113. The plug 113, when coupled with the connector 112 of the user controller 24, may electrically connect the axial response 21 electronic signals of the MCU 56 to the axis output port 69 data pin D4 defined for PWM output, to the input of the driver 74. The variables defined for output of the axial response 21 may be the axes control response data (an example PWM data type depicted in chart 65*d* of FIG. 4*a*) effecting a mechanical response 48 response applying and/or releasing the breaking device 75 increasing and/or decreasing the freedom of the flywheel's 58 ability to rotate. The flywheel's ability to rotate may moderate a user's 10 physical activity, the measurement of the user's 10 activity by axes control 19 axial behavior 20 input representative of axial action 45 for acceleration 44*h* and/or rate 44*b* of an axial action 45 of linear motion over time 44 (e.g., as shown and described in conjunction with FIG. 3*c*).

It should be appreciated that control appliance 25 in one or more embodiments, the treadmill 93 may be replaced with one or more different devices capable of having various electronic components 25*a* for axes controls 19 and/or the acquisition of axial behaviors 20 as digital values of instances of the axes control interaction data 65*a* values, analog values of instances of the axes control interaction data 65*b*. It should also be appreciated that in one or more embodiments, the treadmill 93 may be replaced with one or more different devices capable of having various electromechanical/mechanical components effecting mechanical responses 48 from the application electronic axial responses 21 signals values of the axes control interaction data 65*a* and/or the axes control interaction data 65*b*. For example, the active components 25*a* and active components 22*b* may be applied to a stationary bicycle (e.g., where the pedals rotate the flywheel 58), or possibly a rowing machine (e.g., where the user 10 generating linear and/or elliptical motion of handholds may result in an acceleration 44*h* and/or rate 44*b* of an axial action 45 of linear motion over time 44). The application possibilities are numerous and will be recognized by one skilled in the art.

Figure 9B:
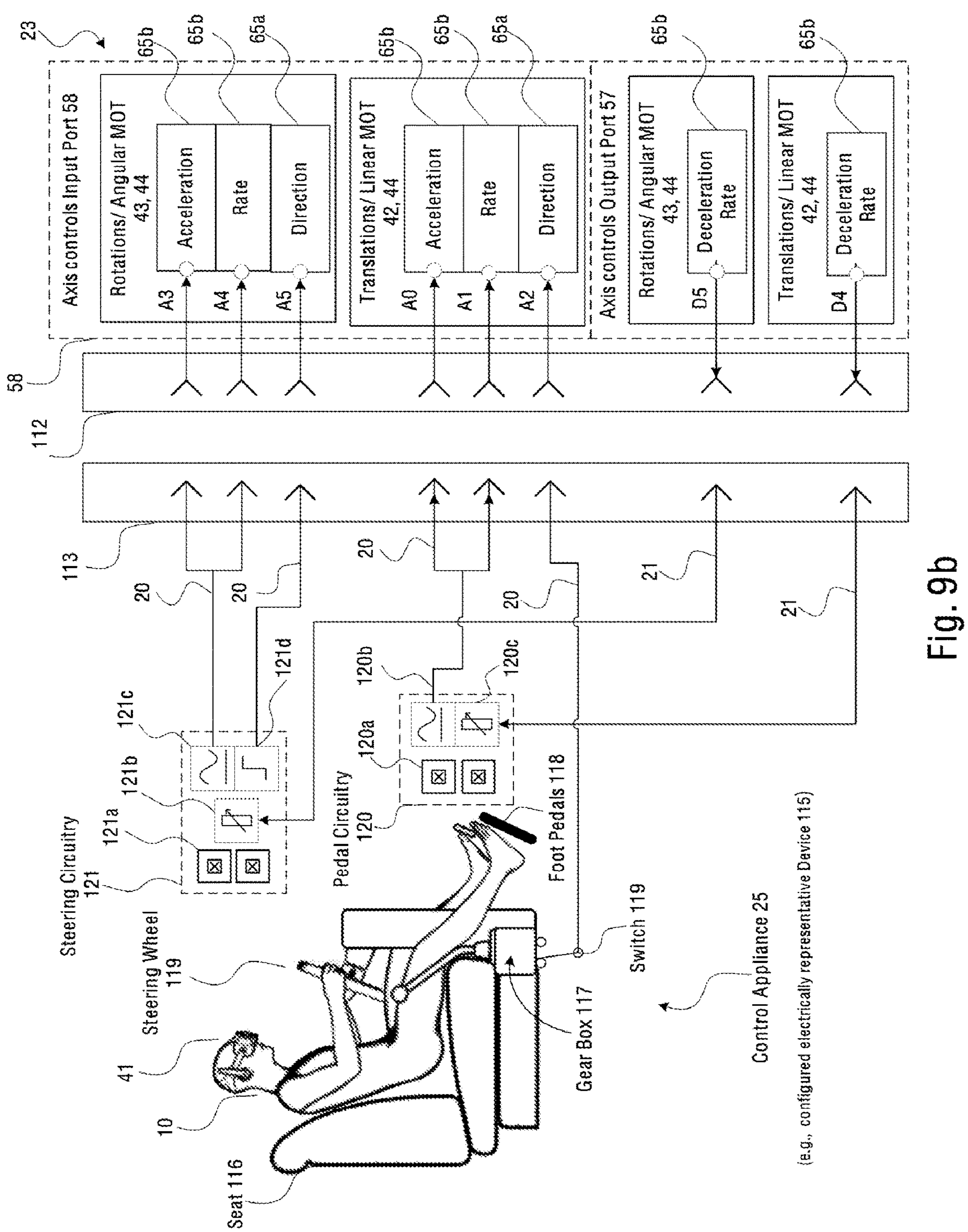
FIG. 9*b* illustrates an example of a second control appliance device (usable in the alternative to the control appliance device of FIG. 9*a*.) According to one or more embodiments a user's physical activity with electronic circuitry may be a source for generation of the axes controls.

FIG. 9*b* illustrates an example embodiment of a control appliance that may be an electrically representative device 115 that is an instance of the control appliance 25 that may utilize electronic components for the generation of electronic signals as acquired axial behaviors 20 and/or that effect an axial responses 21. In one or more embodiments, the electronic signals for axial behaviors 20 and/or axial response 21 need not be generated from a physical interaction of the user 10. Rather, in one or more embodiments, the electronic signals for axes controls 19 axial behaviors 20 and/or axial response 21 may merely comply with the definition of the data pins of the platform controllers 18 and/or user controllers 24 for a hardware and firmware logic prototypes (e.g., as shown in the embodiment of FIG. 4 and FIG. 5).

In the present example, the electrically representative device 115 control appliance 25 as an instance of the control appliance 25 may be representative of a vehicle which may be configured allow a user 10 to interact with the control appliance 22 wherein the user's 10 physical activity may be measured as an intent to produce axial actions 45 for translational linear motions over time 44 and/or angular motions over time 44 along an axis set of the device object 15 instance configure as a device user agent 22. In one or more embodiments, instance of the electrically representative device 115 may be configured to represent a jet fighter, a speed boat, and/or a space craft, and may include different furniture and/or circuitry for generation of axes control 19 axial behaviors 20 input and application of axes control 19 axial responses 21 output.

In FIG. 9*a*, the example instance of the electrically representative device 115 that is an instance of the control appliance 25 control appliance 25, may be representative of a vehicle, and may include furniture which allow a user to physically interact with the control appliance (e.g., a seat 116, a gear box 117, a set of foot pedals 118, and a steering wheel 119). The furniture may be coupled with the active components 25*a* which may measure the user's 10 physical activity for axes control 19 axial behavior 20 input. In one or more embodiments as illustrated, the active components 25*a* comprising the pedal circuitry 120, the steering circuitry 121 and the switch 119 may generate the digital and/or analog electronic signals for the defined data pins A0, A1, A2, A3, A4, and/or A5 of the axes input port 68. The defined data pins of the axes input port 68 may be wired to a connector 112 (e.g., as shown and described in conjunction with FIG. 8). The output of the pedal circuitry 120, the steering circuitry 121 and/or gearbox switch (electronic signals indicating a forward direction and/or reverse direction) generating the analog and/or digital signals may be wired to a plug 113. The plug 113, when coupled with the connector 112 of the user controller 24, may electrically connect the of the pedal circuitry 120, the steering circuitry 121 and/or other electrical mechanical components to the data pins A0, A1, A2, A3, A4, A5 of the axes input port 68, for example as previously discussed herein.

For example, according to one or more embodiments the user 10 may interact the gearbox 117 furniture as an intention for a change for direction for control of axial action 45 linear motion over time 44 and/or angular motion over time 44 for one more first axis 15*b*, second axis 15*c* and/or third axis 15*d* for a device object 15 instance configured as a device user agent 22. A user's 10 physical activity measured as a change in state (e.g., a high logic level, a low logic level) for axes control 19 axial behavior 20 input on data pin A2, indicating a change in direction previously discussed in conjunction with FIG. 4*a* and FIG. 4*b*.

In further details of the control appliances 22 and control platforms 33 and as illustrated in the present example of the electrically representative device 115 as an instance of the control appliance 25 of FIG. 9 in one or more embodiments may be configured allow a user 10 to interact with the control appliance 25 wherein the user's 10 physical activity may be measured as an intent to produce axial actions 45 for translations 42 and/or rotations 43 along an axis set of the device object 15 instance configure as a device user agent 22. In a previous discussion herein of mutual links 79*a* in conjunction with FIG. 7 a mutual link 79*a* established between one or more axes control 19 axial behavior 20 input acquired by the control platform 23 and one or more axial platforms 16 wherein the axial platforms 16 providing axes controls 19 for a first axis 15*b*, second axis 15*c* and/or third axis 15*d* for a device object 15 instance configured as a device user agent 22. For example, a user 10 may interact with the steering wheel furniture 119 for an intention of turning in a leftward direction. The steering wheel furniture which may be coupled with the steering circuitry 121 as the active component 25*a* for measuring a user's 10 physical activity as axes control 19 axial behavior 20 input for the user controller 24 of the control platform 23. Wherein a mutual link 79*a* established between the rotational 43 direction axial behavior 20 input of axes control 19 for the user controller 24 of control platform 23 and the platform controller 18 of an axial platform 16 providing axes controls for a rotation 43 around a third axis 15*d*, the user's 10 physical activity of turning leftward may then be an axes control 19 for an axial action 45 of a negative rotation 43 of the device object 15 instance around a third axis 15*d*, the axial response 21 for the axes control 19 may then effect an mechanical response 48 of the axial platform 18 providing a physical sensation of turning left for the user 10.

According to one or more embodiments and as depicted in FIG. 9*b* the axes control 19 axial response 21 output from the user controller may then modify the signal generation of the active components 25*a* for axes control 19 axial behavior 20 input for the electrically representative device 115 which the modify the user's 10 physical activity, which may all the active components 22 of an electrically representative device 115 to act in a manner for active components 25*a* for axes control 19 axial behavior input 20 and/or active components 22*b* for axes control 19 axial response output 21.

For example, a user 10 physical activities may be an interaction with the foot pedal furniture which may be measured as axes control 10 axial behavior input 20 by the pedal circuitry 120. The pedal circuitry 120 may output an analog signal that may be read as axial behavior 20 for the axes control interaction data (e.g., the example analog data of chart 65*b* of FIG. 4*a*) for a rate and/or acceleration of a linear motion over time 44, for example signal generated as a user 10 physically depresses the foot pedals 118. An axes control 19 axial response 21 output signal coupled with the foot pedal circuitry 120 through the variable signal 120*c*, the axial response 21 signal when generated, for example generated by a different user 10 activity and/or by an interaction of the device object 15 instance under control of the user 10 interaction with device world space 14 (e.g., a mutual link 79*a* of one or more axis elements) and applied (e.g., variable signals 120*c*) altering and modifying the signal being generated by the pedal circuitry 120.

According to one or more embodiments the control platform 23 may include a device 110 defined for reading external data, as shown in FIG. 8. In one or more embodiments, the user controller 24 of a control platform 23 may during setup of operation 82 and/or the initialization of operation 84, data pin C3 and data pin C4 of Port C may be defined to access and read data from an external device 110

(e.g., SD Card Reader, etc.) device user agent 22 Additionally, the data may be read during operation 84 of FIG. 5. In one or more embodiments, the data acquired may populate additional variables and/or constants of non-axial behaviors further defining the axes controls 19 for the one or more axial platforms 16 comprising a device object 15 instance and/or the control platforms 23 for a device object 15 instance configured as a device user agent 22. Non-axial behaviors may be values of axes control interaction data other than the values of axial action 45 motion (e.g., translations 42, rotation 43, motion over time 44) for the axial elements (e.g., origin point 15*a*, first axis 15*b*, second axis 15*c*, third axis 15*d*) of a device object 15 instance and/or the values for physical activity and/or control of a device object 15 instance configured as a device user agent 22.

For example, one or more axial platforms 16 which may provide axes controls 19 for axial actions 45 for rotations 43 for a first axis 15*b* and/or a second axis 15*c* of a device object 15*a* instance, wherein the device object 15*a* instance configured as a device user agent 22, the axes controls 19 for axial actions 45 for rotations 43 for a first axis 15*b* and/or a second axis 15*c* of a device object 15*a* instance mutually linked 97*a* (e.g., shown in FIG. 7) with axes controls 19 for axial action 45 of direction for a control platform 23 (e.g., control appliance 27 providing axial behavior input 20 for direction shown FIG. 9*b*) a non-axial behavior may then be a value enabling a "banking" which establish that a user's physical interaction with axes control 19 axial behavior 20 input for a first axis 15*b* and/or a second axis 15*c* of a device object 15*a* instance may be a physical activity for intention of changing direction. Non-axial behaviors used by the various platforms may act in a role that may be discussed in separate sections pertaining to the role being fulfilled by the various platforms of the physical control and render system. The Non-axial behaviors presented herein may not be all inclusive.

In a discussion of FIG. 1*a* and FIG. 1*b*, a device object 15 is illustrated comprised of instances of the axial platforms 16 (e.g., a first axial platform 46 and a second axial platform 47). The mechanical response 48 of the placement and/or arrangement of the various electronic, electromechanical and/or mechanical platform components 17 comprising each axial platform may comprise a representative first axis 15*b*, a second axis 15*c*, and/or third axis 15*d*. In a discussion of FIG. 4*a* and FIG. 5, each axial platform 16 may include a platform controller 18 (e.g., a computing device such as the MCU 56) that may store example firmware logic 91 defining an axes input port 68 for acquisition of axial behaviors 20 and/or output of axial responses 21 effecting a mechanical response 48 according to one or more embodiments.

In one or more embodiments, previous discussions of FIG. 1, FIG. 2, FIG. 4*a* and FIG. 6*a* introduces that the example arrangement of the active components 17 comprising the one or more axial platforms 16. The type of the active components 17*a* may allow for acquiring axes controls 19 of axial behaviors 20 input as a values of axial action 45 for one or more first axis 15*b*, a second axis 15*c*, and/or third axis 15*d* axial elements of a device object 15 instance. The values of axial behavior 20 input as axes control interaction data (example analog data values chart 65*b* and/or digital data values of chart 65*b* shown in FIG. 4*a*) may be associated and/or correlated as values of axes controls axial response 21 signal which may effect a change in one or more known kinematic and or inverse kinematic mechanical response 48 along the mechanical degrees of freedom ("DOF") of the various components 17*b* comprising the axial platforms 16.

A method for the axes controls 19 for correlation and/or association of mechanical response 48 of axial response 21 output for the one or more axial platforms 16 as mechanical subassemblies of the physical render device 13 and the acquisition of axes controls 19 axial behavior 20 input as values of a user intent for axial actions for translations 42 and/or rotations 43 and/or motions over time 44 for the axial elements (e.g., origin point 15*a*, first axis 15*b*, second axis 15*c*, third axis 15*d*) for a device object 15 instance from the active components 17*a* the same one or more axial platforms 16 comprising the device object instance 15 may now be disclosed according to one or more embodiments.

FIG. 10 illustrates the active components 17*b* for axes controls 19 axial response and the active components 17*a* for axial behavior 20 input previously discussed for the example physical construction embodiment of a device object 15 of FIG. 6*b*. The device object 15 instance having representative axial elements comprising an origin point 15*a*, a first axis 15*b*, a second axis 15*c*, and a third axis 15*d*, according to one or more embodiments. Additionally, FIG. 10 depicts a prototypical 3D object 31 instance of FIG. 3*a*, the prototypical 3D object 31 having the axial elements comprising an origin point 31*a*, a first axis 31*b*, a second axis 31*c*, and a third axis 31*d*, according to one or more embodiments In in the example embodiment of FIG. 10, the example physical construction of the device object 15 instance comprised as having two axial platform 16 mechanical subassemblies, a first axial platform 46 and a second axial platform 47.

FIG. 10 in conjunction with FIG. 3 and FIG. 6 may depict that an example first axial platform 46 (e.g.) may include four physical device actuators (e.g., an actuator device 46*c*, an actuator device 46*d*, an actuator device 46*e*, and an actuator device 46*e*) as the active components 17*b* effecting a mechanical response 48 by an axes control 19 axial response 21 from a platform controller 18 (e.g., a computing device prototyped with the controller output port 69) included with each axial platform 16 as previously discussed herein. As illustrated, the physical devices (e.g., an actuator device 46*c*, an actuator device 46*d*, an actuator device 46*e*, and an actuator device 46*e*) may be the active components 17*b* for effecting the kinematic and/or mechanical responses 48 of the first axial platform 46 mechanical subassembly. The mechanical responses subject to freedoms of the configuration of the first axial platform 46 may allow that physical motions effected through the mechanical responses of 48*a* and responses 48*b* may be analogous to axial actions 45 for translations 42 along one or more first axis 15*b*, a second axis 15*c*, and a third axis 15*d* and/or rotations 43 around one or more of a first axis 15*b* and/or a second axis 15*c*. Additionally, as illustrated a second axial platform 47 mechanical subassembly having an rotational motor 47*b* as an active component 17*b* for axes control 19 axial response 21 output. Wherein a second axial platform 47 mechanical subassembly when mechanically coupled with a first axial platform 46 may then form the physical render device 13. A second axial platform 47 subassembly when subject to the mechanical freedoms of the physical render device 13 assembly may allow that physical motions effected through the mechanical responses of 48*c* which may be analogous to axial actions 45 for rotations 43 around a third axis 15*c* for the device object 15 assembly of a physical render device 13.

As known to a person skilled in the relevant art a prototypical 3D object 31 may move for axial actions 45 for translations along one or more a first axis 31*b*, a second axis

31*c*, and a third axis 31*d* and or rotations 43 around one or more a first axis 31*b*, a second axis 31*c*, and a third axis 31*d*. The axial actions 45 may be towards a positive indicator direction and or negative indicator direction for each axes relative to an origin point 15*a*. As illustrated the positive indicator for a first axis 15*b* may be the positive indicator 126, the negative indicator may be 127. Each other axis may have a positive and negative indicator as depicted in FIG. 10. According to one or more embodiments and as illustrated in FIG. 10 a device object 15 assembly having active components 17*b* effecting axes control 19 for one or more mechanical responses 48 which may be analogous to axial actions 45 for one or more first axis 15*b*, second axis 15*c* and third axis 15, each active component may have a positive and or negative indicator assigned analogous to the same positive and or negative indicator for the representative axis of a prototypical 3D device object 31. For example, the actuator 46*d* may be the physical device as an active component 17*b* for axes control 19 for a first axis 15*b*, the actuator may be analogous to the positive indicator 126 for a prototypical device object 31. Each other axis, including the second axis 15*c* and the third axis 15*d*, may have a positive and negative indicator assigned (the positive indicator 128, the negative indicator 129, the positive indicator 130, and the negative indicator 131).

Such positive indicators and negative indicators wherein associated with the active components 17*b* of the axial platforms 16 accepting the axial responses 21 effecting a mechanical response 48, which may determine which device is required to effect the mechanical response 48 and the direction of kinematic and/or inverse kinematic movement required to effect an axial action 45 translations 42 and/or rotations 43 along and/or around one or more of the first axis 15*b*, the second axis 15*c*, and/or the third axis 15*d* towards a positive and/or negative indicator. For example, a first axial platform 46 may include an actuator device 46*e* active component 17*b* associated with a positive indicator 128, an axes control 19 for axial response 21 output indicative of an axial action 45 associated with a second axis 15*c* may activate the actuator device 46*e* producing a kinematic motion effecting a kinematic and/or inverse kinematic response of the axial platform 16 subassembly associated and or correlated with to an axial action 45 for a second axis 15*c* of the device object 15 instance.

Figure 11:
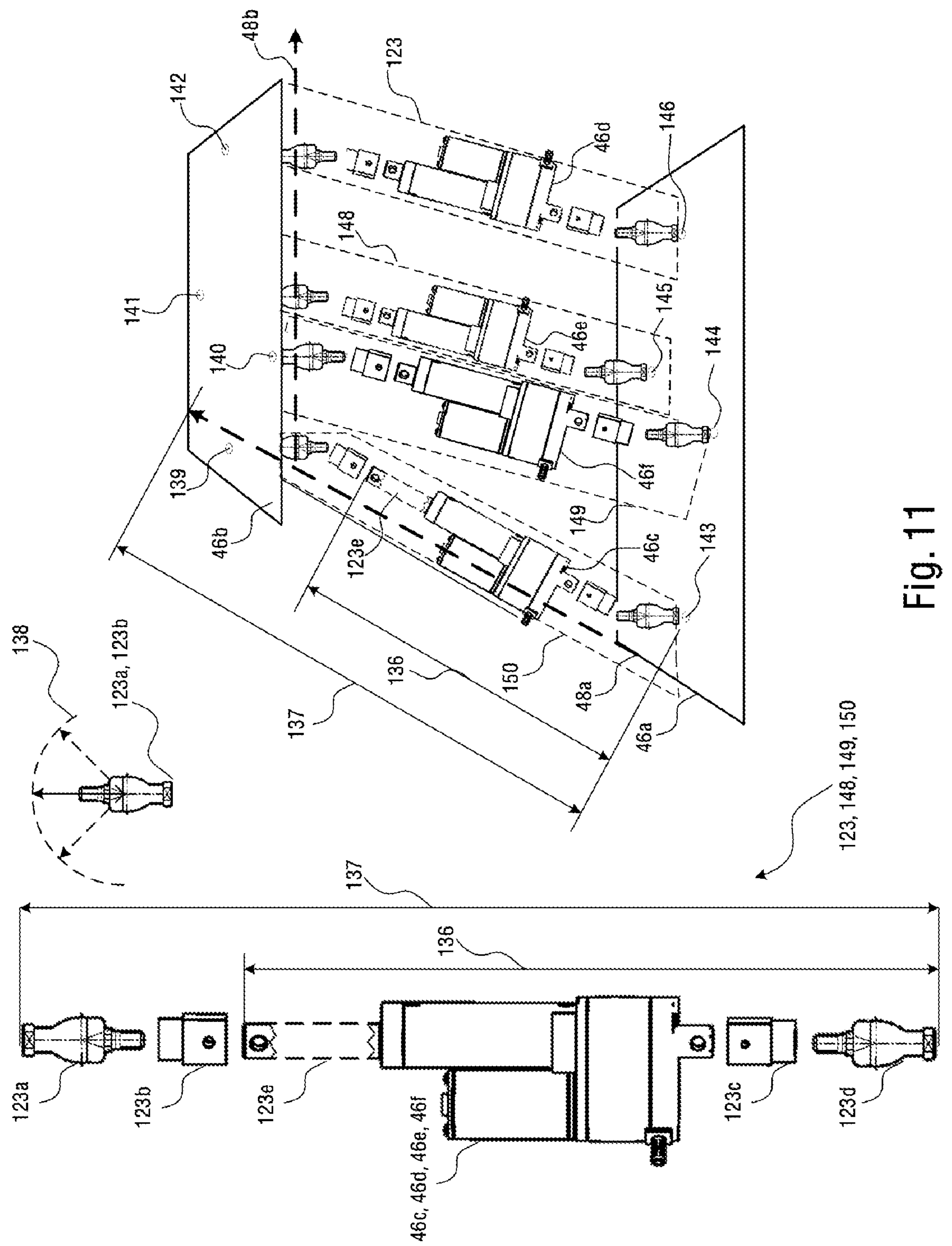
FIG. 11 illustrates an exploded view of the physical components comprising a common first mechanical mechanism which may be known in the relevant art as a parallel manipulator. The parallel manipulator may be a mechanism for a first axial platform for axes controls for one or more axial elements for an example working device object instance as illustrated in FIG. 6*b*.

In a previous discussion of the physical construction of a device object 15 instance FIG. 6*b* illustrated an instance of a first axial platform 46 comprised as having an physical actuator device 46*e* as an active component 17*b* of an linkage actuator assembly 123, the non-active components of the linkage assembly 123 comprising an upper spherical joint 123*a*, with an upper coupler 123*b* joining the upper spherical joint 123*a* with the actuator device 46*e*, and a lower spherical joint 123*d*, with a lower coupler 123*c* joining the lower spherical joint 123*d* with the actuator device 46*e*. FIG. 11 illustrates a right side view of a mechanism, as may be known in the relevant art, as a "parallel manipulator". In the present example, the parallel manipulator illustrated in FIG. 11 may be the example of the physical construction of the first axial platform 46*c* and is shown having four actuator assemblies, the actuator assembly 123, the actuator assembly 148, the actuator assembly 149, and the actuator assembly 150, each coupling a base plate 46*a* with a manipulator plate 46*b*. In the present example of the parallel manipulator, construction of the components may determine the degrees of freedom of a mechanical responses of 48*b*, wherein the mechanical motions of 48*b* analogous with axial actions 45 for translations 42 of a first axis 15*b*, and/or a second axis 15*c* and/or a third axis 15 and/or axial actions for rotations 43 for a first axis 15*b* and/or second axis 15*c* as previously discussed herein.

It should be noted that although one parallel manipulator that may be known in the art has been illustrated, in one or more other embodiments, a mechanism, method, and/or device of parallel manipulation may vary (e.g., a different number of legs, types of joints, actuation type, etc.). As one or more of the present embodiments may utilize a mechanism, method, and/or device of parallel manipulation in conjunction with one or more of the axial platforms 16, it will be apparent to one skilled in the relevant art that one or more of the present embodiments may make use of techniques of parallel manipulation yet to be conceived or invented.

In the example embodiment of a parallel manipulator mechanism of FIG. 11, the four actuator assemblies (e.g., the actuator assembly 123, the actuator assembly 148, the actuator assembly 149, and the actuator assembly 150) may be the "legs" of the mechanism. The total length 137 of each actuator assembly may include the upper coupler 123*b*, the lower coupler 123*c*, the upper spherical joint 123*a*, and the lower spherical joint 123*d*, when each actuator is extended (e.g., the actuator device 46*c*, the actuator device 46*d*, the actuator device 46*e*, and/or the actuator device 46*f*). Extension or retraction may contribute to the mechanical response 48*b* of the parallel manipulator mechanism, including a length 136 of an actuating rod and/or piston 123*e* when extended. The following may contribute to the mechanical response 48*b* of the parallel manipulator mechanism: (i) The range of motion for each upper spherical joint 123*a* and lower spherical joint 123*b* for each leg of the parallel manipulator mechanism, (ii) the placement and/or arrangement of each actuator assembly on a placement point of the manipulator plate 46*b* (the placement point 139, the placement point 140, the placement point 141, and the placement point 142) when coupling the upper spherical joints 123*a* to the manipulator plate 46*b*, and the placement and/or arrangement of the placement points on the manipulator base plate 46*a* (e.g., the placement point 143, the placement point 144, the placement point 145, and the placement point 145) when coupling the upper spherical joints 123*a* to the base plate 46*a*.

An embodiment of an example parallel manipulator illustrated in FIG. 11 may manipulate the length 136 of one or more actuators (the actuator 46*c*, the actuator 46*d*, the actuator device 46*e*, and/or the actuator device 46*f*) that may effect a change in the total length 137 of the actuator assembly 123, the actuator assembly 148, the actuator assembly 149, and/or the actuator assembly 150), which may cause a mechanical response 48*b* in the manipulator plate 46*b* through the mechanical freedoms 138 of the upper spherical joint 123*a* and the lower spherical joints 123*d*. The mechanical response 48 may be known and predictable in the relevant art as the mechanical kinematics and/or inverse kinematics of the parallel manipulator.

In a continued discussion of the example parallel manipulator, extending the actuator device 46*c* of the actuator assembly 149 to increase the total length 137 of the actuator assembly 149 between the lower spherical joint 123*d* coupled to the base plate 64*a* and the upper spherical joint 123*a* coupled to the manipulator plate 46*b* may effect a first known kinematic and or inverse kinematic response, as illustrated the known mechanical response form the possible mechanical responses 48*b* from the base plate 64*a* through the actuator assembly 150 to the manipulator plate 46*b* shifting the manipulator plate **46*b* to the "front" (e.g., as shown from a right side view of FIG. 11.) The mechanical shift being analogous to an axial action 45 for a translation 42 of a first axis 15*b* towards a direction of a positive indicator 126 (e.g., shown in FIG. 10**).

Traditional control of a parallel manipulator mechanism as may be known in the art may not allow for a mechanical response 48 representative of axial actions 45 of a 3D object 31 in a defined 3D world space 30. For example, as illustrated in FIG. 11 the mechanical response **48*b* of the parallel manipulator as forward shift (e.g., relative to a right side view) determined by the known mechanical kinematic and/or inverse kinematic response of the kinematic action produced by a change in the length of the actuator assembly 149 effected by the extension 123*e* of the actuator's 46*c* rod (e.g., piston). As depicted the kinematic and/or inverse kinematic response may be calculated from the kinematic action from the base plate 46*a*, through the actuator assembly linkage 149 through the manipulator plate 46*b*. By contrast a motion for a prototypical 3D object 31, as illustrated and previously discussed in conjunction with FIG. 3*a*, the axial actions 45 for translations 42 and/or rotations 43 and/or motions over time 44 along and/or around one or more first axis 31*b*, and/or second axis 31*c* and/or third axis c, each axial action 45 may be determined and or calculated relative to an origin point 31*a***.

Figure 12:
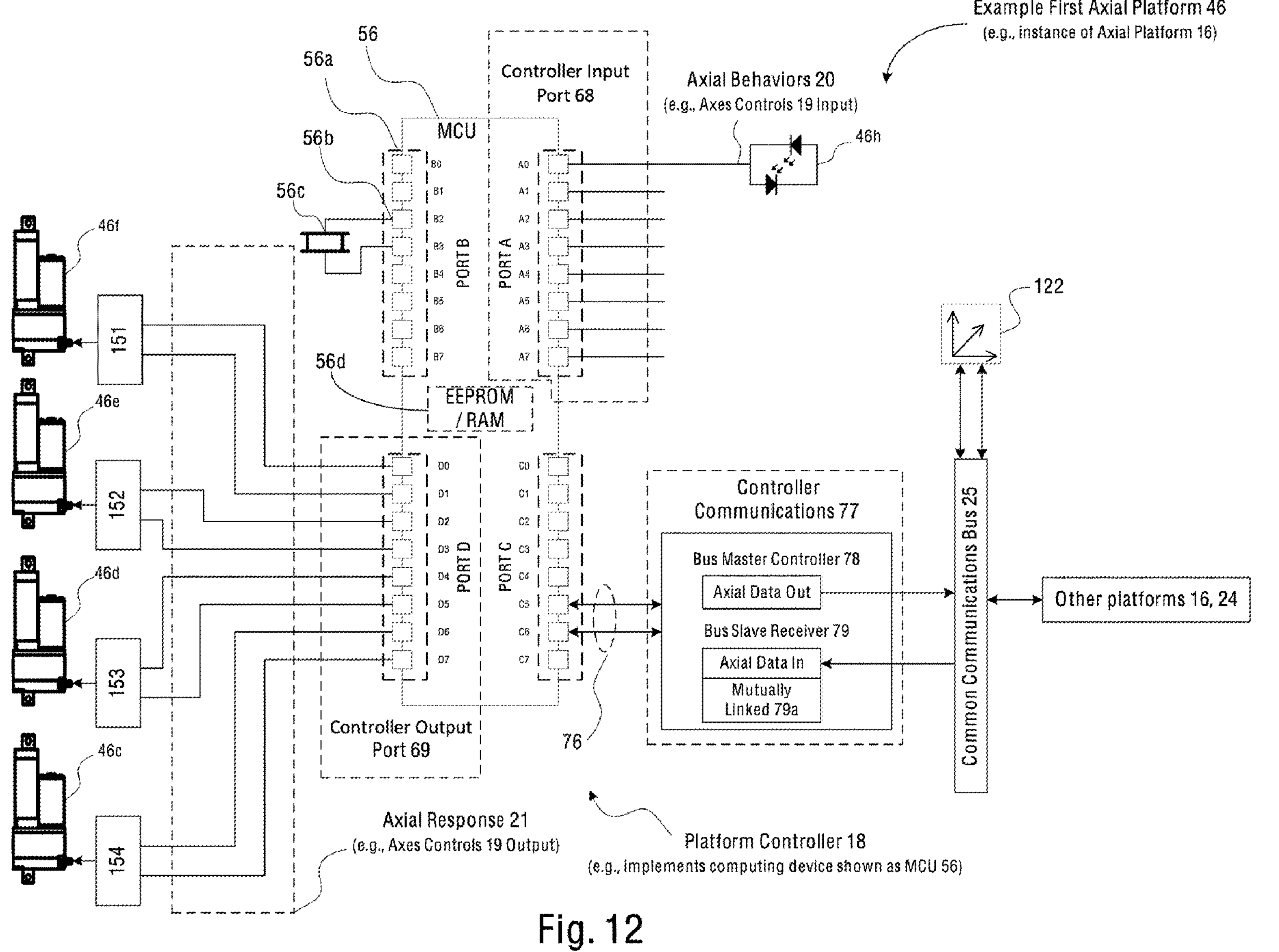
FIG. 12 is a diagram depicting the communicative coupling of the physical device components which may be the active components for the example first axial platform which may provide axes controls for control of axial action of one or more axial elements for the example working device object instance of FIG. 2 and/or FIG. 6*b*.

FIG. 12 illustrates an example of the coupling for the physical devices as active components **17*b* for axes controls 19 with the axes input port 68 and axes output port 69 for a platform controller 18 (e.g., as an MCU 56 computing device) for an first axial platform 46 as an axial platform 16 subassembly of a of the physical render device 13, the first axial platform 46 providing axes controls for physical render 12 for axial actions 45 for translations 42 of a first axis 15*b*, and/or a second axis 15*c* and/or a third axis 15 and/or axial actions for rotations 43 for a first axis 15*b* and/or second axis 15*c*, according to one or more embodiments as previously discussed herein. In one or more embodiments, the computing device (e.g., example MCU 56) of the example platform controller 18 of FIG. 12 may have been prototyped for hardware and/or firmware, for example as previously described herein in conjunction with FIG. 4*a* and FIG. 5**.

According to one or more embodiments and as previously discussed one or more axial platforms 16 mechanical subassemblies providing the mechanical responses 48 for the physical render device 13. One or more axial platforms 16 each axial platform 16 having a platform controller 18 providing axes controls 19 for correlation and/or association or one or more axial actions 45 (e.g., 3D object 31 motions) for a device object 15 instance with the mechanical responses 48 of the physical render device 13 assembly. As illustrated in FIG. 10 in conjunction with FIG. 11 and FIG. 12 axes controls 19 may allow for a definition of the following associated with a device object 15: an origin point **15*a*, a first axis 15*b*, a second axis 15*c*, and/or a third axis 15*d* and an association and/or correlation with the mechanical responses of the physical render device 13**.

In a continued discussion of the axes controls 19 for axial response of the active components **17*b* comprising a first axial platform 46 of the example physical construction of a device object 15 instance. Wherein a known kinematic and/or inverse kinematic mechanical response 48 which may be one possible motion allowed by the mechanical degrees of freedoms allowed by a mechanism. A known mechanical response may be effected by application of a drive motion by an active component of the mechanism (e.g., for example moving the rod of an actuator by increasing and or decreasing the overall length 136). The active component of the mechanism may be an active component 17*b* which may be coupled to the axes output port 69 of a computing device (e.g., the MCU 56) for a platform controller 18 of an axial platform 16. Axes control 19 axial response 21 output which may be a signal from the computing device controlling the active component 17*b*** effecting the mechanical response.

In one or more embodiments taking a first known mechanical response 48, the first known mechanical response 48 for one or more axial platforms 16, the mechanical response 48 relatable and/or analogous to an axial action 45 of translation 42 for a first axis **15*b*, the first known mechanical response associated and/or correlated to a first axis 15*b*. As previously discussed in conjunction with FIG. 10 each active component 17*b* effecting the first know mechanical response 48, the associated may be assigned a positive or negative direction indicator, a direction indicator which then indicate a direction of axial action 45 for the first axis 15*b***.

For example, as depicted in FIG. 10 in conjunction with FIG. 11 and FIG. 12 the active components **17*b*, the actuator 46*c* and the actuator 46*d*, the actuator 46*e*, the actuator 46*f* of the mechanical linkages of the respective actuator assemblies, the actuator assembly 123, the actuator assembly 148, the actuator assembly 149, and the actuator assembly 150, the actuator assemblies as the "legs" of a first axial platform 46 (e.g., a parallel manipulator mechanism) which may be a mechanical subassembly of device world space 13. The mechanical DOF (e.g., mechanical degrees of freedoms) of the example first axial platform 16 having possibly effected mechanical responses of 48*b* through the manipulator plate 46*b* when a change is effected one or more actuator assemblies by one or more active components 17*b* (e.g., the actuator 46*c* and the actuator 46*d*, the actuator 46*e*, the actuator 46*f*) of the axial platform 16**.

of the effected from by the axes controls 19 axis platform axial response 21, the mechanical.

In a further discussion of the present example, in one or more embodiments a first known kinematic and/or inverse kinematic mechanical response 48 of the possible mechanical responses **48*b* may be correlated and associated with the axial actions 45 for translations 42 and or rotations 43 for a first axis 15*b*. The active components 17*b* of the first axial platform 16 mechanical subassembly effecting the mechanical response 48 associated and/or correlated with the axial actions 45 of a first axis 15*b* may then be identified as the physical device actuator 46*c* and the physical device actuator 46*d* of the example axial platform 16** mechanical subassembly.

In a continued discussion of the present example, according to one or more embodiments the active components **17*b* providing mechanical responses 48 may be the actuator 46*c* and the actuator 46*d*, wherein the actuator 46*c* and the actuator 46*d* which being correlated and/or associated with axial actions 45 for a first axis 15*b*. The actuator 46*c* may then have a positive indicator 126 association for a forward direction of the first axis 15*b* and a negative indicator association for a negative direction of a first axis 15*b***.

Additionally in one or more embodiments of the present example and as illustrated in FIG. 12, the axial components **17*b* (e.g., the actuator 46*c* and the actuator 46*d*) for axial action 45 for a first axis 15*b* may be coupled with the axes output port 69 of the computing device (e.g., the computing device may be the example MCU 56). The axes output port 69 having been prototyped for hardware (e.g., shown and discussed in FIG. 4*a*) and firmware logic (e.g., shown and discussed in FIG. 5), The hardware and logic prototype may allow for a definition of axes controls 19 axial response 21 for a set of signals on the data pins DO and/or D1 of the axes output port 69 may effect an axial action 45 for the first axis 15***b* from a positive indicator 126 of a first axis 15*b*. Additionally as illustrated an axes controls 19 axial response 21 for a set of signals on the data pins D2 and/or D3 of the axes output port 69 may effect an axial action 45 from a negative indicator 127 of a first axis 15*b*.

In a discussion of FIG. 3*c*, an armature 56 was introduced for rigging control of an avatar 55 (e.g., an instance of the 3D object 31) in a defined 3D world space 30. In one or more embodiments, an armatures 56 of a 3D world space 30 is not limited to use with an avatar 55. As known in the relevant art, an armatures 56 may be used to rig other various instances of the 3D object 31 to facilitate the rotation 43 and/or translation 42 of various 3D objects 31 defined in a 3D world space 30. For example, an armature 56, might be introduced to the 3d object 53 instance of FIG. 3*b* for rigging control for a root object (e.g., a parent) and all children objects as previously discussed herein.

Figure 13:
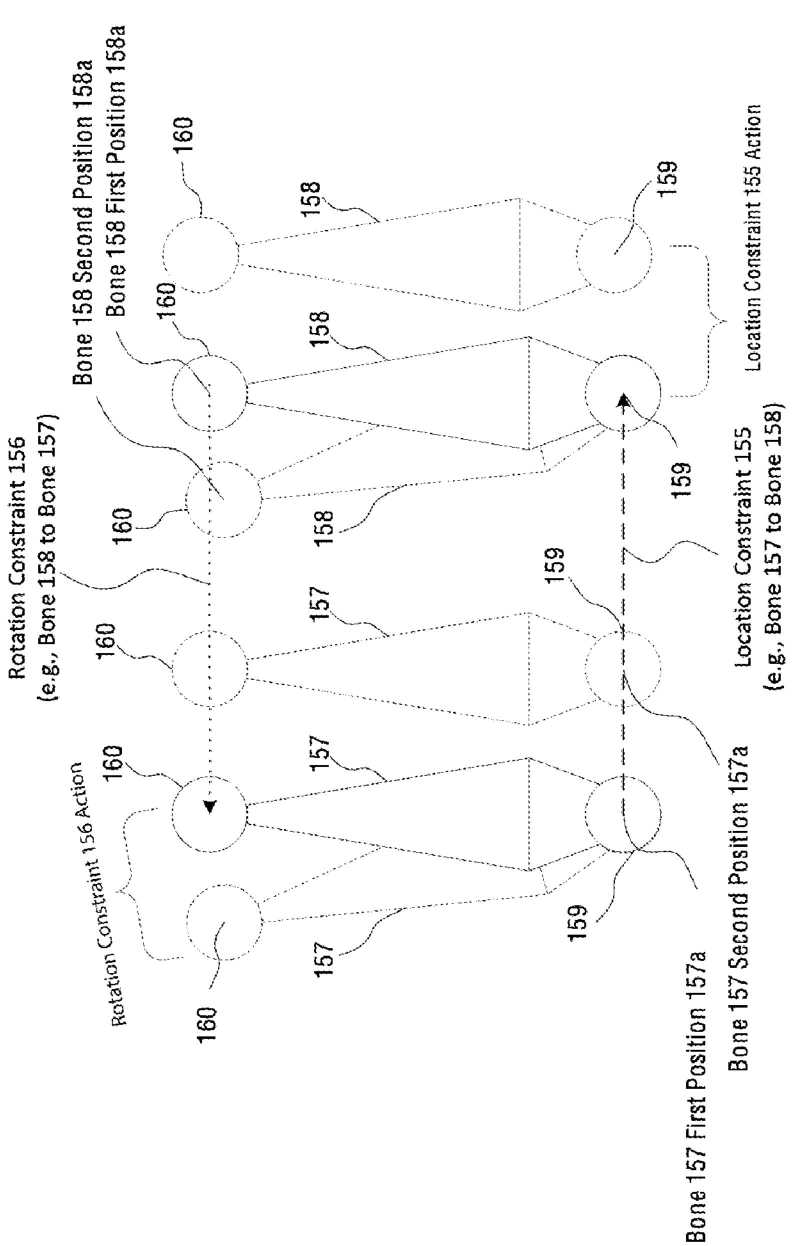
FIG. 13 depicts an armature as which may be applied to an object instance in three dimensions to facilitate the axial action for 3D interaction and 3d motions for 3D objects. As known in the relevant art the armature may facilitate axial action motion through a rig or skeleton of one or more bones. Additionally, an armature may facilitate axial action motion through location constraints and rotation constraints of the various bones.

FIG. 13 illustrates use of an armatures 56 having at least one instance of a bone (e.g., the bone 157), according to one or more embodiments. An armature 56 may have additional instances of the bones, as illustrated as a second bone 158. The bone 157 and the bone 158 may be comprised of a head 159 defining a location for example, the head of bone 157 may define a location 157*a* instance and/or a location 157*b* for the bone 157. Additionally, the bone 157 and the bone 158 may include a tail 160 defining a rotation for example, 158*a* may show the bone having a rotation instance 158*a* and/or a rotation instance 158*b* for the bone 158.

In a continued discussion of the armature 56 of FIG. 13, the various bones comprising the armature 56 may be constrained to other bones using one or more instances of a location constraint 155. When one or more bones are constrained by a location constraint 155, movement of the bone 157 (e.g., the constraining bone) may move the location of the bone 158 (e.g., the constrained bone) accordingly. Location constraints 155 maybe be enforced kinematically and/or inverse kinematically (e.g., as shown in FIG. 14).

In a continued discussion of the armature 56 of FIG. 13, the various bones comprising the armature 56 may be constrained to other bones using a rotation constraints 156. When one or more bones being constrained by the rotation constraint 156 moves, the constraining bone (e.g., the bone 157) may move the rotation of the constrained bone (e.g., the bone 158) accordingly. The rotation constraint 156 may be enforced kinematically and/or inverse kinematically (e.g., as shown in FIG. 14).

Figure 14:
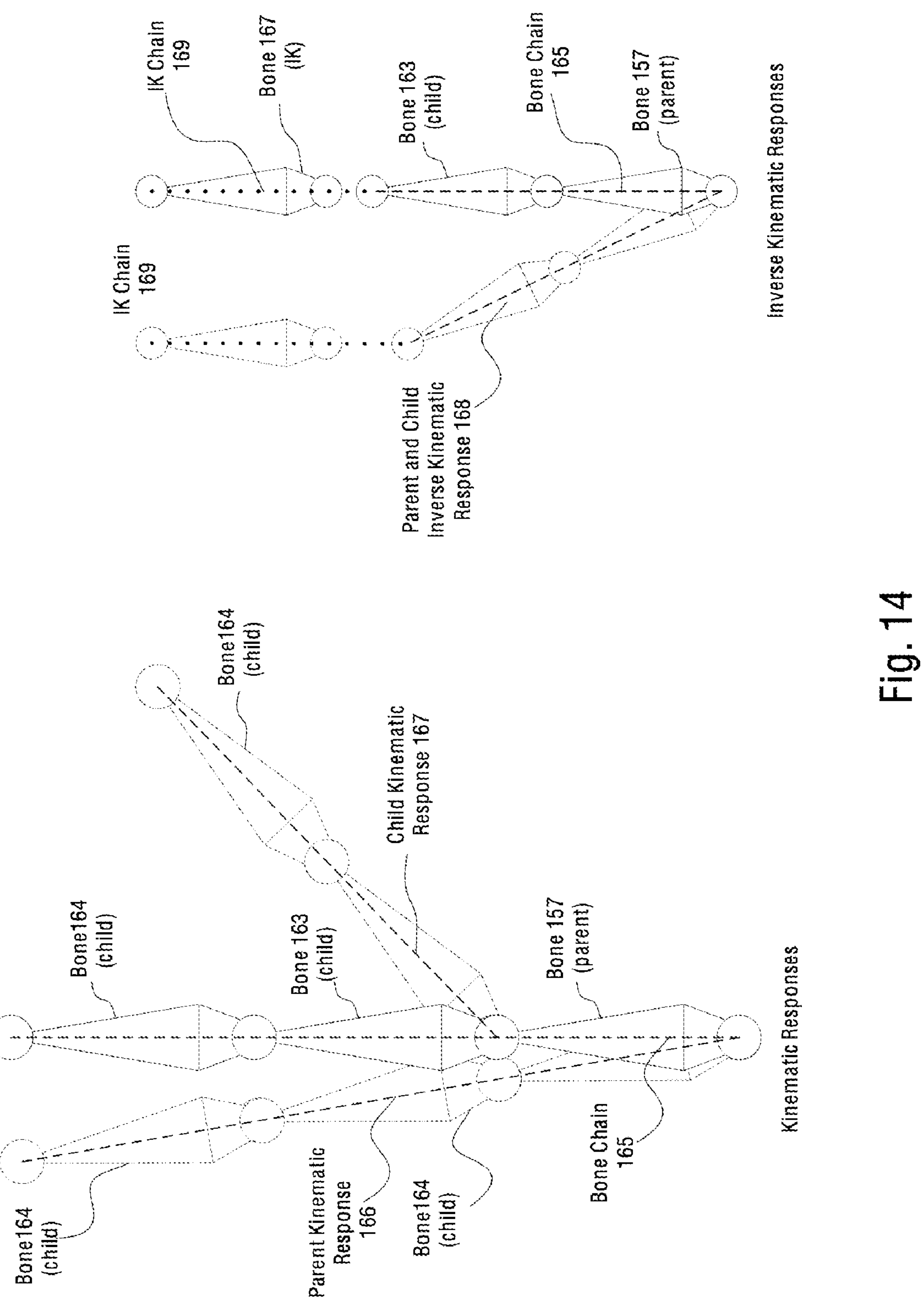
FIG. 14 depicts that an armature may have a bone chain extending through the various bones of the armature effecting a kinematic response for the location constraints and/or rotation constraints. Additionally.

FIG. 14 illustrates kinematic and inverse kinematic responses for the various bones within an armature 56, according to one or more embodiments. The bone 157 of FIG. 14 may be designated as a parent bone of at least one other bone, referred to as a child. One or more bones may be child bones, for example labeled the child bond 163 and the child bone 164. Together, a parent bone and one or more child bones comprise a bone chain 165. In one or more embodiments and the embodiment of FIG. 14, the bone 157 and the bone 163 and/or the bone 164 comprise a bone chain 165. The bone 157 and the bone 163 connected in the bone chain 165 may be connected with the head 159 of the child bone 163 joined with the tail 160 of the parent instance of the bone 157. As illustrated in FIG. 14, the bone 163 within the bone chain 165 may then be the parent bone for each of one or more subsequent child bone (e.g., the child bone 164) within the bone chain 165.

In one or more embodiments and the embodiment of FIG. 14, the bone 157, the bone 163, and the bone 164 within the bone chain 165 may be directly manipulated for a kinematic response. Kinematics may occur when a bone within the bone chain 165, for example the head 159 and/or tail 161 of a bone, is directly manipulated to change a location through the manipulation of the head 159 of a bone and/or a rotation through the tail 161 of a bone. Kinematic manipulation of a the head 159 and/or tail 160 of a parent bone (e.g., the bone 157) may effect a like constrained manipulation for each child bone (e.g., the bone 163, the bone 164) as a kinematic response 166. A kinematic manipulation of a head 159 and/or tail 160 of a child bone (e.g., the bone 163, the bone 164), may produce the same rotation and/or location change as the parent kinematic response 166 for child bone and all remain bones within the bone chain 165. For example, as shown the child bone 163 being kinematically manipulated 163 having a kinematic response for the child bone 164.

In one or more embodiments and the embodiment of FIG. 14, the bone 157 and the bone 163 within the bone chain 165 may be indirectly manipulated for effecting an inverse kinematic response. An inverse kinematics may be effected on an armature 56 when a bone not being within the bone chain 165 and being designated as an IK bone 167 (e.g., an "inverse kinematic" bone) may provide an inverse kinematic chain 169, for example starting at the tail 160 of the bone 163 and traversing the bone chain 165 to a desired parent bone (e.g., the bone 157). Applying kinematic (direct) manipulation to the designate IK bone 167 may provide a constrained inverse kinematic response 168 to the bones within the scope of the bone chain 165. A good analogy of inverse kinematics may be the motion imparted to a person's hand (the inverse kinematic response) that results from another person shaking the first person's hand (the kinematic and/or direct manipulation).

In one or more embodiments, as previously discussed herein in conjunction with FIG. 10, FIG. 11 and FIG. 12 the kinematics actions of axes control 19 axial responses 21 which may control the active components 17*b* effecting known kinematic and/or inverse kinematic mechanical response 48 as motions of axial actions 45. According to one or more embodiments the kinematic action of one or more active components 17*b* and the correlated and or associated axes control 19 axial response 21 output may be adapted and or associated with the location constraints 155 and/or rotation constraints 156 of FIG. 13, the one or more the parent kinematic response 166 and/or child kinematic responses 163 and/or inverse kinematic responses 168 of FIG. 14.

Figure 15:
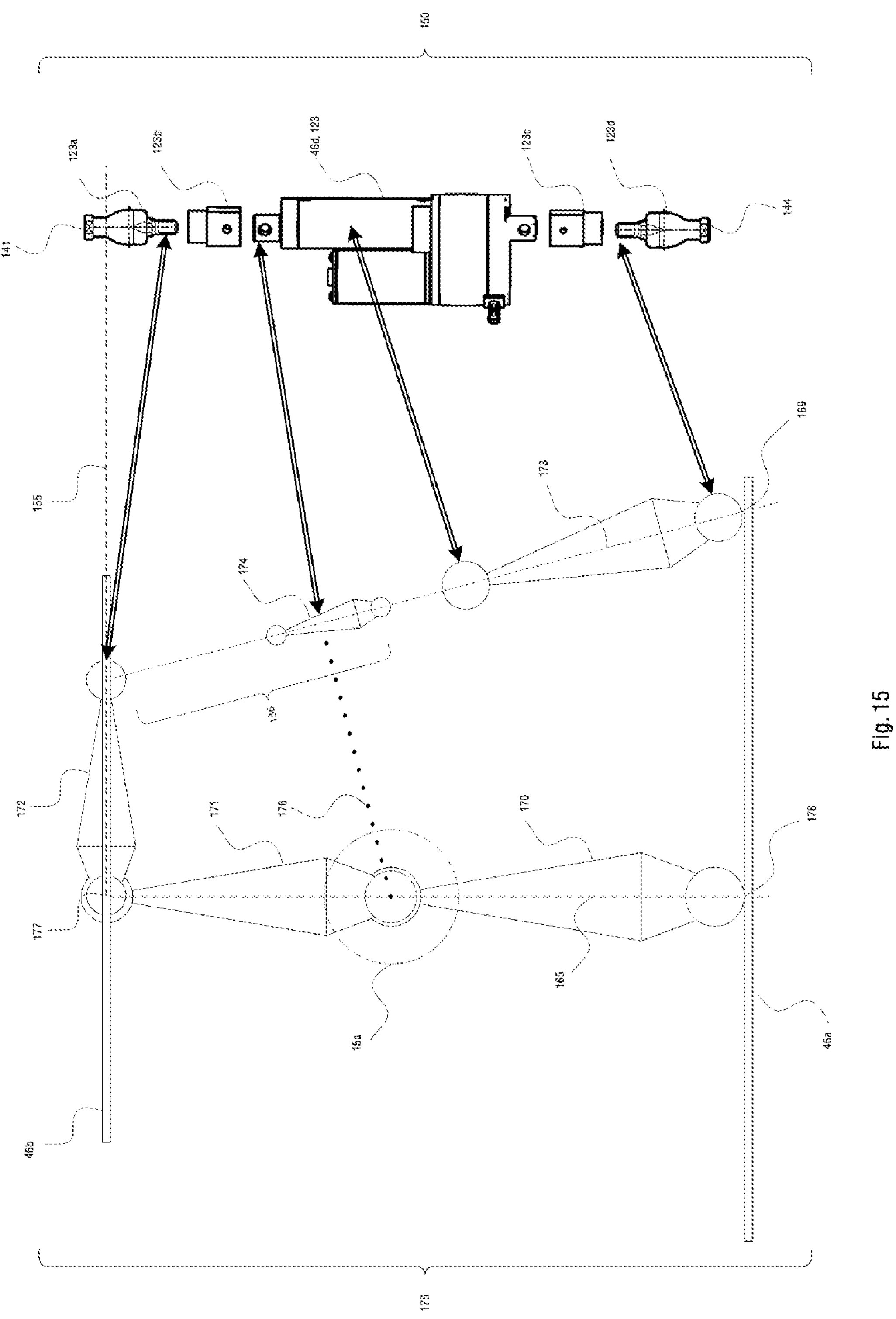
FIG. 15 depicts that the kinematic and/or inverse kinematic response of an armature may be adapted and applied as correlation/association with the kinematic/inverse kinematics mechanical responses of the example physical construction of an axial platform providing axes controls for a physical device object.

FIG. 15 may illustrate an example of an adaptation of an the location constraints 155 and/or rotation constraints 156 and/or the one or more the parent kinematic response 166 and/or child kinematic responses 163 and/or inverse kinematic responses 168 of an example armature 175 with the possible kinematic and/or inverse kinematic responses of the active component 17*b* (e.g., actuator 46*d*), wherein the actuator 46*d* a component of an example actuator leg assembly 150 of the example axial platform 16 providing axes control 19 for the possible kinematic and/or inverse kinematic mechanical responses 48*b* for the axial actions 45 of translations 42 and/or rotations 43 as previously discussed herein in conjunction with FIG. 6*b*, FIG. 10, FIG. 11 and FIG. 12.

In a continued discussion of the example adaptation illustrated in FIG. 15, in one or more embodiments, the example armature 175 may include location constraint 155 and rotation constraint 156 for an axial platform 16 (e.g., the first axial platform 46) comprising a device object 15 within the device world space 14 of a physical render device 13. The actuator device 46*d* may be an active component 17*a* that may take an axes control 19 axial response 21 output effecting a possible kinematic and/or inverse kinematic mechanical response 48, wherein the possibly mechanical response 48 may be relatable to an axial action 45 of a first axis 15*b* through the actuator assembly 150, the actuator The actuator 46*d* being a positive indicator 128 for a second axis 15*c*, for example as previously discussed herein in conjunction with FIG. 6*b*, FIG. 10, FIG. 11 and FIG. 12

In one or more embodiments, as illustrated in the example representative armature 175 of FIG. 15, and while additionally referencing FIGS. 13*a*, 13*b*, the placement point 141 of a lower spherical joint 123*d* of the actuator assembly 150 on the base plate 56*a* of the first axial platform (e.g., a parallel manipulator mechanism) may be the head 159 of a bone (e.g., the bone 173), the body of the actuator device 46*d* then being the tail 160 of the same bone (e.g., the bone 173). The placement point 145 of an upper spherical joint 123*a* of the actuator assembly 150 on the manipulator plate 54*b* of a parallel manipulator may be the tail 159 of a bone (e.g., the bone 172). The kinematic action of the actuator's 46*d* rod (e.g., extension and/or retraction of the piston/rod) may be the head 159 and tail 160 of a bone (e.g., the bone 173) wherein the bone 173 may be an IK Bone (e.g., shown and described in conjunction with FIG. 14).

In a continued discussion of the example armature 175, the equidistance point 176 of the base plate 64*a* may be the head 159 of a base plate bone (e.g., the bone 170), the base plate bone being fixed by location of the base plate 64*a* (e.g., the base plate 64*a* not having a mechanical response). The mechanical kinematic and inverse kinematics of the first axial platform (e.g., a parallel manipulator mechanism) may form a tail 160 for the same bone 170.

As, illustrated in FIG. 15, in a continued discussion of the example armature 175, in one or more embodiments the equidistance point 177 of the manipulator plate 56*b* may form the head 159 of the bone 172. Additionally, the equidistance point 177 in conjunction with the mechanical kinematic and inverse kinematics of the first axial platform (e.g., a parallel manipulator mechanism) may form a tail 160 for the bone 171.

In further details of the example armature of FIG. 15, mechanical DOF "degrees of freedom" which may provide the mechanical kinematic and inverse kinematics of the first axial platform (e.g., a parallel manipulator mechanism) may allow that a center line drawn through the equidistance point 176 of the base plate 46*a* and the equidistance point 177 of the manipulator plate 46*b* may then form a bone chain 165 (e.g., a bone chain shown and discussed in FIG. 14) through a parent bone 170 and a child bone 171 providing for kinematic response of the example armature 175. Additionally, the kinematic and inverse kinematic responses of the example first axial platform 46 may allow that upper mounting position 141 on the manipulator plate 46*b* and the lower mounting position 144 of the base plate 46*a* for the actuator assembly 150 in conjunction with the kinematic action 123*a* (e.g., shown in FIG. 11) of the actuator 46*d* may form an IK chain 173 (e.g., an IK chain shown and discussed in FIG. 14) providing an IK response for the armature 175.

In a continued discussion of the example armature 175, the kinematic and/or inverse kinematics allowable by the mechanical degrees of freedom of the first axial platform 46 subassembly may allow that the distance from the equidistance 176 of the base plate 46*a* and the mounting point 144 of the actuator assembly 150 and the that the distance from the equidistance 177 of the manipulator plate 46*b* and the mounting point 141 of the actuator assembly 150 may provide location constraints 155 and/or rotation constraints 156 for the armature 175. According to one or more embodiments the location constraints 155 and/or rotation constraints 156 of the armature 175 may be utilized to enforce the axes controls 19 of a device object 15 instance for one or more axial actions 45 of one more first axis 15*b*, second axis 15*c*, third axis 15*d* axial elements of the device object 15 instance.

FIG. 16*a* illustrates a top views of the base plate 46*a* and manipulator plate 46*b* of the example first axial platform 46 mechanical subassembly in one or more embodiments. FIG. 16*b* additionally illustrates a rear view and right side view of the of the base plate 46*a* and manipulator plate 46*b* of the first axial platform 46 mechanical subassembly in one or more embodiments.

In a previous discussion of FIG. 2 the example first axial platform 46 may be a mechanical subassembly of the physical render device 13, additionally a discussion of FIG. 2 and FIG. 6*b* the example first axial platform 46 may be an axial platform 16 providing axes controls 19 for one or more axial actions 45 for one or more axial elements (e.g., origin point 15*a*, first axis 15*b*, second axis 15*c* third axis 15*c*) for a device object instance 15*b*. In a previous discussion of FIG. 10, FIG. 11 and FIG. 12 one or more kinematic and/or inverse kinematic mechanical responses 48 may be known to a person skilled in the relevant art, wherein the kinematics and/or inverse kinematic principles may be applied and/or calculated through the kinematic action of an active component 17*b* for axes control 19 of axial response 21.

According to one or more embodiments and as illustrated in FIG. 16*a* in conjunction with FIG. 16*b* the configuration for the location and/or placement of the mounting points for the axial platform 16 subassembly base plate 46*a* (e.g., the mounting point 143, the mounting point 144, the mounting point 145, the mounting point 146) and the mounting points the manipulator plate 47*b* (e.g., the mounting point 139, the mounting point 140, the mounting point 141, the mounting point 142) may be useful in part for the calculation of the mechanical kinematics and/or inverse kinematic responses of the axial platform 16 subassembly. As previously discussed in conjunction with FIG. 6*b*, FIG. 10, FIG. 11 and FIG. 12 a calculation from the placement and/or arrangement of the mounting point 143, the mounting point 146, the mounting point 140, the mounting point 141 may effect a first known mechanical response 48 through axes controls 19 axial response 21 (e.g., application of kinematic action) through the active components 17*b* (e.g., the actuator 46*c*, the actuator 46*d*) of the possible mechanical responses 48*b* effecting which may be correlated and/or associated with one or more axial actions 45 of translations 42 and/or rotations 43 for a first axis 15*b* for a device object instance 15.

In further details for the axes controls 19 axial responses 21 effecting one or more of the possible kinematic and/or inverse kinematic mechanical responses 48*b* by an axial platform 16, the possible mechanical responses 48*b* for the axial actions 45 an identified first known mechanical response 48 and a correlated and/or associated axes controls 19 for a first axis may allow for the placement and/or arrangement of active components 17*b* effecting known mechanical responses 48 for one or more possible kinematic and/or inverse kinematic responses of the mechanical responses 48*b* in one or more embodiments wherein each one or more kinematic and/or inverse kinematic responses of the possible mechanical responses 48*b* may be correlated and or associated with one or more axial actions 45 for translation 42 and/or rotations 43 for at least one remaining second axis 15*c* and/or third axis 15*d* of a device object instance 15.

For example, and as illustrated in FIG. 16*a* and FIG. 16*b* in conjunction with the example first axial platform 16 subassembly (e.g., a parallel manipulator mechanism) of FIG. 11, the possible kinematic and/or inverse kinematic mechanical responses 48 effected through the kinematic actions by the axes control 19 axial responses of the active components 17*b* (e.g., the actuator 46*f* and the actuator 46*e*) of the actuator assembly 123 and the actuator assembly 148 wherein the bottom of each actuator assembly 123 and the actuator assembly 148 may be mounted to the base plate 46*a* at the placement and/or arrangement of the mounting points 144 and 145 the top of each actuator assembly 123 and the actuator assembly 148 may be mounted to the manipulator plate 46*b* at the placement and/or arrangement of the mounting points 140 and 141, the arrangement may then effect a mechanical response 48 that may be one of a possible mechanical response 48*b* relatable and/or correlated and/or associated with an axial action 45 for a translation 42 and/or rotation 43 with a second axis 15*c* or a device object instance 15. The second axis 15*c* may then be ninety degrees perpendicular and horizontal to the first axis 15*b* may include a positive direction indicator 128 and a negative indicator 129.

In a continued discussion of the present example in conjunction with a previous discussion herein of an applied armature of FIG. 15, the kinematic and/or inverse kinematic responses of the first axial platform 46 (e.g., an instance of axial platform 16) may effect a mechanical response 48 through the equidistance centerline points 176 of the base plate 46*a* and the manipulator plate 46*b* of the first axial platform 46. In one or more embodiments the kinematic and/or inverse mechanical response 48 through the equidistance centerline through points 176 on the base plate 46*a* and the manipulator plate 46*b* may be a possible mechanical response of the possible mechanical responses 48*b* effecting axial actions of the device object 15 instance. The present mechanical response 48 may form a third axis 15*c* for axes controls 19 axial response 21 output for a translation 42 (e.g., an upward direction or downward direction) of the present example of a device object 15 instance. The third axis 15*c* may then be ninety degrees perpendicular and vertical to the first axis 15*b* and second axis 15*c* and may include a positive direction indicator 130 and a negative indicator 131 according to one or more embodiments and as illustrated in FIG. 16*a* in conjunction with FIG. 16*b*.

In one or more embodiments, FIG. 17 illustrates top view and front view of the example first axial platform 46 (instance of axial platform 16) of the example device object instance, as previously discussed herein in conjunction with FIG. 11 and FIG. 15 each example of an actuator assembly the actuator assembly 123, the actuator 148, the actuator 149, the actuator 150 may have an applied armature, the armature 175, the armature 177, the armature 178, the armature 179 the collection of armatures applying a complete armature 182 for the example first axial platform 46*b*.

In a continued discussion of the present example applied armature 182 FIG. 17 as illustrated each armature the armature 175, the armature 177, the armature 178, the armature 179 providing a bone chain (e.g., shown in FIG. 14) which may allow kinematic responses for the example first axial platform 46, the bone chain 175*a*, the bone chain 177*a*, the bone chain 178*a*, the bone chain 179*a* respectively. The kinematic responses towards the positive indicator 126 and/or the negative indicator 127 and/or the positive indicator 128 and/or the negative indicator 130 and/or the positive indicator 130 and/or the negative indicator 131. Additionally illustrated in FIG. 17 the complete armature 182 providing IK chains (e.g., shown in FIG. 14) the IK chain 176, the IK chain 180, the IK chain 181, (a fourth IK chain 185 may be present and obscured by the armature 177) which may provide inverse kinematic responses for the example first axial platform 46 of the device object 15 instance, the inverse kinematic responses towards the positive indicator 126 and/or the negative indicator 127 and/or the positive indicator 128 and/or the negative indicator 130 and/or the positive indicator 130 and/or the negative indicator 131.

In further details of the present example the applied complete armature 182 of FIG. 17 providing both kinematic and inverse kinematic responses for the example first axial platform 46 of the device object as previously discussed herein, it should be appreciated that the complete applied armature 182 may then additionally possess an ability of a 3D armature 56 of FIG. 3*c* having location constraints 155 and/or rotation constraints 156 of FIG. 13.

According to one or more embodiments, the applied armature 182 for an axial platform 16 including one or more location constraints 155 and/or rotation constraints 158 of FIG. 13, one or more kinematic responses 166 through one or more bone chains 165 and/or one or more inverse kinematics response 168 through one or more IK chains 169 may then allow for axial constraints described in FIG. 18 as enforcement for the possible kinematic and/or inverse kinematic motions 48*b* as axial actions of translation 42 and/or rotations 43 along and/or around the first axis 15*b*, second axis 15*c*, third axis 15*d* for a device object 15 instance.

In one or more embodiments FIG. 18 illustrates four mechanical kinematic and/or inverse kinematic responses 48 of the example first axial platform 46 (e.g., an instance of an axial platform 16) of the device object 15 instance as previously discussed herein in conjunction with FIG. 2. The axial platform 46 a mechanical subassembly of the physical render device 13 as previously discussed herein in conjunction with FIG. 2 and FIG. 6*b*. In the present example of FIG. 18 the kinematic actions of the IK bones of the armature 182; the IK Bone 174, the IK bone 183, the IK bone 184, the IK Bone 185 (e.g., obscured from view) may effect one or more axial actions 45 of 3D motion, each axial action of 3D motion may then be enforced by the location constraints 155 and/or rotation 156 axial constraints (e.g., shown in conjunction with FIG. 13) which may be provided by the collective and applied armature 182.

In a previous discussion herein in conjunction with FIG. 12 in one or more embodiments the computing device (e.g., the example MCU 56) of an axial platform's 16 platform controller 18 may take a bus master controller state 78 for a common communication bus 26. According to one or more embodiments a gyrometer accelerometer 122 may be communicatively coupled as a bus slave receiver 79 which may be an active component 17*a* for acquisition of axes controls 19 axial behavior 20 input. The signal data read by the gyrometer accelerometer 122 may then be used to ascertain the values for the axial actions 45 of translation 42 and/or rotation 43 of the collective set of the axial elements of first axis 15*b*, second axis 15*c*, third axis 15*d* of 15 device object 15 instance. The values of the collective set may then be used as enforcement of axial constraints.

In a continued discussion of the kinematic and/or inverse kinematic mechanical responses 48 of a mechanism subassembly comprising physical render device 13, the mechanic responses 48 wherein enforced by one or more axial constraints, a mechanical response 48 may be a physical render of the axial action 45 (e.g., translations 42, rotations 43, motion over time 44 shown in FIG. 3*a*) 3D motion for one more axis elements (e.g., a first axis 15*b*, a second axis 15*c*, a third axis 15*d*) for each one device object 15 instances of a device world space 14.

In one or more embodiments the possible kinematic and/or inverse kinematic responses for the kinematic action of IK bone 183 illustrated in FIG. 18 while referencing the previous discussions herein in conjunction with FIG. 1, FIGS. 2, FIG. 3*a*, FIG. 6*b*, FIG. 10, FIG. 11, FIG. 12, FIG. 15 and FIG. 17 as needed may allow a user 10 to experience a physical render 12 as a physical sensation an axial action 45 for a translation 42 along a second axis 15*b* of the example device object 15 instance. For example, as illustrated, wherein an axes control 19 may output axial response 21 signal for a communicatively couple active component 17*b* (e.g., the example physical actuator 46*e* of FIG. 10 may be an active component 17*b*), the active component 17*b* may then effect a kinematic action (e.g., the extension and retraction 123*e* of the actuator 46*e* FIG. 11), effecting known kinematic and or inverse kinematic mechanical response 48 by the mechanical subassembly (e.g., first axial platform 46 may instance of an axial platform 16 which may be a mechanical subassembly) of the physical render device 13.

In a continued discussion of the present example, the configuration and/or placement of the physical components (e.g., the actuator 46*e* may be the active components 17*b* of an axial platform 16 subassembly) may effect a possible mechanical response of the mechanical responses 48*b* which may be associated with of the axial actions 45 of translations 42, rotations 43, motions over time 44 for axes controls 19 by one or more axial platforms 16 for one or more first axis 15*b*, second axis 15*c*, third axis 15*d* of a device object 15 instance.

The active component 17*b* (e.g., the actuator 46*e* of the present example) being associated with either a positive indicator or negative indicator for motion of one or more axis of a device object 15 instance (e.g., the actuator 46*e* of the present example associated with the positive indicator 128 for a second axis 15*c*.) Additionally, an armature 182 applied for the kinematic and/or inverse mechanics for mechanical subassembly (e.g., an armature applied to the example first axial platform 46) may allow that axial constraints for location constraints 155 and/or rotation constraints 156 (e.g., shown in FIG. 13) through kinematic responses 166 for bone chains 165 and/or inverse kinematic response 169 through IK chains 169 (e.g., shown in FIG. 14.) As illustrated in FIG. 18 the kinematic actions of IK bone 183 then may effect an axial action for translation 42 of a second axis 15*c*, the translation 42, wherein the effected kinematic action of an IK bone 183 which may result in kinematic response through the bone chains; the bone chain 175*a*, the bone chain 177*a*, the bone chain 178*a*, the bone chain 179*a* and/or the inverse kinematic responses through the IK chains (e.g., shown in FIG. 14) the IK chain 176, the IK chain 180, the IK chain 181, (a fourth IK chain 185 may be present and obscured by the armature 177) wherein enforced by a location constraints 155. Similarly, as illustrated in FIG. 18 the kinematic actions of IK bone 183 in conjunction with kinematic actions of IK bone 184 may be enforced by a rotation constraint 156 for an axial action 45 for a rotation 43 around a first axis 15*b* of a device object 15 instance.

While re-referencing FIG. 18 in conjunction with the previous discussions for FIG. 2, FIG. 3*a*, FIG. 4*a*, FIG. 5, FIG. 10 and FIG. 12 as known to person skilled in the relevant art an origin point 31*a* may be an element of a 3D object 31 for axial actions 45 of 3d motion. According to one or more embodiments each device object 15 instance may include an origin point 15*a*. In one or more embodiments as previously discussed herein a home and/or zero position of an axial platform 16 may be performed during an initialization operation 84 of the prototype of firmware logic. According to one or more embodiments and as illustrated in FIG. 18 the axes controls 19 including the axial constraints for one or more axial platforms for a device object 15 instance may be utilized for determination of an initial position of an origin point 15*a* for the device object 15 instance. For example, during an initialization operation 84 routine for the example first axial platform 46 for the example physical construction of the work device object 15 instance of FIG. 6*b* the axial controls 19 may the emit axial response 21 output signals on the controller output port 69 of the platform controller 18 computing device (e.g., port D of the MCU 56 shown in FIG. 12) may be used to effect a translation 42 towards the negative indicator 131 of a third axis 15*c* (e.g., shown in FIG. 10), the translation may be enforced by a location constraint 155 (e.g., shown in FIG. 13) for the applied armature 182. A sensor 46*h* (e.g., an active component 17*a* for acquisition of axial behaviors 20 shown in FIG. 6*b* in conjunction with FIG. 12) may measure the kinematic actions of the IK Bones (e.g., the IK Bone 174, the IK bone 183, the IK bone 184, the IK Bone 185) for determination a floor value 189 (e.g., an extent of mechanical motion. Similarly, a ceiling value 193 (e.g., an extent of mechanical motion) may be ascertained by an axial action for translation 42 towards the positive indicator 130 (e.g., shown in FIG. 10). According to one more embodiments and as illustrated in FIG. 18 in conjunction with FIG. 16*b* finding the extents for mechanical motion (e.g., the floor 189 value and the ceiling 193 value during an initialization routine (e.g., operation 84) of the platform controller 18 of one or more axial platforms 16 collectively forming a device object 15 instance may then be used to determine an origin point 15*a* for the device object 15 instance (e.g., shown in FIG. 16*b*.)

Additionally, according to one or more embodiments a non-axial behavior as previously discussed here in conjunction with FIG. 8 may provide an offset value 178 for the origin point 15*a* of the device object 15 instance as illustrated in FIG. 16*b*.

In one or more embodiments, the degrees of freedom of a mechanical mechanism may be physically over-constrained. For example, a parallel manipulator mechanism of FIG. 11 as known to a person skilled in the relevant art the known kinematic/inverse mechanical responses (e.g., the mechanical response 48*a*, the mechanical response 48*b*) may be limited by the various components used in the construction of the parallel manipulator, as previously discussed herein. FIG. 19 illustrates that the values for the axes controls 19 axial responses 21 output (when applied from electronic signals values for the axes control response data (the example data of chart 65*c* and 65*d* shown in FIG. 4*a*) may be interpolated axial responses 195. According to one or more embodiments the interpolated axial response values 194 during the application of axes controls 19 axial responses 21 output enforced by axial constraints may allow for a "stretching" of a translation 42 along the first axis 15*b*, the second axis 15*c*, and/or the third axis 15*d*, and/or may allow for stretching rotations 43 around the same axes by a ratio to the correlated and/or associated kinematic/inverse mechanical response 48*b* (e.g., the mechanical responses relatable to 3D motion shown in FIG. 6*b*.)

For example, in one or more embodiments the axes controls 19 axial response 21 output for the example first example axial platform 46 of FIG. 19 which may then illustrated as effecting 3D motion for a physical render 12 for an axial action 45 for a rotation 43 around a first axis 15*b* for the example device object 15 instance, the axial action 45 enforce by an axial constraint rotation constraint 156 (e.g., shown in FIG. 13) as previously discussed herein. The example first axial platform 46 may be an axial platform 16 subassembly (e.g., a parallel manipulator mechanism of FIG. 11) of the physical render device 13 may be limited to a maximum rotation of 15 degrees by mechanical constraint. The computing device (e.g., the example MCU 56 shown in FIG. 12) of the platform controller 18 of the example first axial platform 46 may have received a non-axial behavior value for a number of interpolated constraint values 194 and a non-axial behavior value for an interpolation ratio 196, where an axial constraints for the applied armature 182 may effect a rotation constraint 156 which may be applied at the interpolation ratio 196 for each interpolation value 195. The application of the interpolated axial response may then allow that a physical render 12 for the rotation 43 of the first axis 15*b* of the device object 15 instance proportionally "stretched" by ratio to the mechanical response 48.

FIG. 20 illustrates that the application of a correlation and/association of known kinematic/inverse mechanical responses 48 relatable to 3D motion for an axial platform 16 subassembly of the physical render device 13 may be applied as axes controls 19 for axial response 21 output for physically constructed axial platforms 16 which may be exchanged and/or substituted for the example axial platform 16 subassemblies according to one or more embodiments. For example, previous discussion herein of FIG. 11 in conjunction with FIGS. 16*a* and 16*b* the mechanical subassembly of the example first axial platform 46 may be a parallel manipulator configured as having four instances of active components 17*b* mounted by the placement and/or arrangement of the base plate 64 mounting points (e.g., the mounting point 143, the mounting point 144, the mounting point 145, the mounting point 146) and the mounting points the manipulator plate 47*b* (e.g., the mounting point 139, the mounting point 140, the mounting point 141, the mounting point 142.) According to one or more embodiments as illustrated in FIG. 20, a correlation and or association of mechanical kinematics with axes controls 19 for axial actions 45 of 3D motion may be applied for a variety axial platform 16 mechanical subassemblies of a world space device. For example, in an alternate physical construction of an axial platform 16 subassembly of FIG. 20 the base plate 46*a* may have six mounting points (e.g., the mounting point 197, the mounting point 198, the mounting point 199, the mounting point 200, the mounting point 201, and the mounting point 202) and the manipulator plate 46*b* may also have six mounting points (e.g., the mounting point 203, the mounting point 204, the mounting point 205, the mounting point 206, the mounting point 207, and the mounting point 208). The placement of the mounting points of the active components 17*b* may then provide for the possible mechanical response 48*b* which may be the first axis 15*b* and second axis 15*c* with the positive indicator 126, the negative indicator 127, the positive indicator 128, and the negative indicator 129 as previously described herein in conjunction with FIG. 6*b*, FIG. 16*a* and FIG. 16*b*.

FIG. 21 illustrates that according to one or more embodiments that the active components 17*b* (e.g., an actuator 46*e* of FIG. 11 may be an active component of a mechanical subassembly) and non-active components (e.g., a spherical joint 123*a* of FIG. 11 may be a non-active component of a mechanical subassembly) of which may comprise the one or more axial platforms 16 mechanical subassemblies the physical render device 13 may be other than the various working examples previously presented herein may use the same and/or similar methods described herein. For example, in one or more embodiments as illustrated in FIG. 21 a non-active mechanical component such as a u-joint 209 or an arrangement of non-active components, for example, a first u-joint 209 coupled with a second u-joint 212—may effect a known kinematic/inverse kinematic mechanical responses 48 wherein a kinematic action is applied by an axes control 19 axis response 19 to a coupled active component 17*a*. The mechanical responses 48 may be relatable to axial actions 45 of 3D motion relatable a translation 42 and/or rotation 43 to one or more first axis 15*b* and/or second axis 15*c* and/or third axis 15*d* of a device object 15 instance. Additionally, the mechanical responses 48 may represent a positive indicator 210 and negative indicator 209 toward any one or more first axis 15*b* and/or second axis 15*c* and/or third axis 15*d* of a device object 15. Additionally, it will be apparent to a person skilled in the relevant art, the mechanical response 48 may represent axes controls 19 axial response 21 output for one or more axial actions 45 3D motion towards positive indicator 210 and/or negative indicator 209 wherein the u-joint 209 and the u-joint 212 may be replaced with a different non active components that may produce a mechanical response for determination axial actions 45 (e.g., cams, levers, motors, actuators, etc.).

In further details of the present example, in one or more embodiments, the arrangement/placement and physical device type of the various non-active components (e.g., a spherical joint 123*a* of FIG. 11 may be a non-active component) and the various active components 17 (e.g., active components 17*a* for axes controls 19 for axial behaviors 20 and axial responses 21) and/or type of the various non-active and active components 25*a* and 22*b* of a control appliance 25 mechanically coupled and communicatively coupled with a control platform 18 may differ than the active components 17 than the active components 17 illustrated for examples provided and previously discussed herein.

For example, as illustrated in a spherical joint 213 as a non-active component of an axial platform 16 may possibly produce a kinematic/inverse kinematic mechanical instance of the mechanical response 48, the mechanical response 48 may provide a known rotational and/or a shifting mechanical motion response 48. In one position the sensor 214 may receive an axes controls 19 axial behavior 20 input for a rotation 43 of a first axis 15*b*, and in a second position may receive an axes controls 19 axial behavior 20 input for a translation 42 of a second axis 15*c*. The sensor 214 may be in the first position and wired to the data pin A0 of the axes input port 68, where the firmware may define a value of data pin A0 as the axes control interaction data (e.g., the example axes control interaction data charts 65*a* and 65*b* shown in FIG. 4*a*) for determination of axial actions 45 for 3D motion to be physically rendered 11.

FIG. 21 may further illustrate that previously provided examples and discussions of one or more embodiment herein, that in other embodiments the arrangement/placement, configuration and/or definition may differ from the examples provided. For example, the rotation motor 48*b* providing a mechanical response 48, the response physically rendered 11 as an axial actions 45 for a rotation 43 around a third axis 15*c* for the example working physical construction of a device object 15 instance of FIG. 6*b* wherein the rotational motor 47*b* illustrated below and directly driving the plate 47_a_. FIG. 21 may illustrate an alternate placement/arrangement and/or configuration for the rotational motor 47_b_ wherein an arrangement of non-active components comprised of a planetary gear 216, a timing belt 217, one or more drive gear (e.g., the drive gear 218, the drive gear 219), where the placement of the components may alternately determine a rotation 43 around the third axis 15_d_. The definition of the data pin DO and the data pin D1 of the axis output port 69 may be wired to a driver 215. The values of the axes control 19 axial response 21 may alternately defined as a signal value for a alternate to the direct drive (e.g., as shown and described in conjunction with FIG. 6_b_) and/or timed for the driving of the arrangement of the rotational motor 47_b_, the planetary gear 216, the timing belt 217, the drive gear 218, and/or the drive gear 219. Additionally illustrated in FIG. 21 the configuration and/or placement/arrangement may show that a rotational motor 47_b_ may serve as an active component 17_b_ for axes controls 19 for a physical control 11 by axial behaviors 20 and axial response 21 of the axes control interaction data (e.g., the example data 65_a_, 65_b_) as a physical render 12 of an axial actions 45 3D motion for an axis of the device object 15 instance other than the third axis 15_c_ for example as illustrated a rotational motor 47_b_ may provide a axial action 45 as a physical render 12 of a rotation 43 around a second axis 15_b_.

Accordingly, it should therefore be appreciated that the application of axes controls 19 axial response 21 output including a correlation and/or association of mechanical kinematics and/or inverse kinematics with the axial action 45 for translations 42 and/or rotations 43 enforced through axial constraints may allow for a physical render device 13 to physically render 12 mechanical motion as the 3D motion of axial actions 45 for translations 43 and/or rotations 43 for one or more device objects 15 in a device world space 14.

Having discussed a physical render 12 of the axial actions 44 of 3D motion for one or more device objects a discussion of physical control 11 as interactions with the one or more device object 15 instances and/or controls for a device object instance 15 configured as a device user agent 22 in a device world space 14 provided by the physical render device 13.

In a previous discussion herein in conjunction with FIG. 1 and FIGS. 3_a_, 3_b_, 3_c_ an external system 28 may manage the interaction of 3D objects 31 within the defined 3d world space 30. According to one or more embodiments a physical render device 13 the axes control 19 may manage the interactions with device object 15 instance and/or control of a device object 15 instance configured as a device user agent 22 through the acquisition of axial behavior 21 input in one or more embodiments.

FIG. 22 illustrates an example of the coupling for the physical devices as active components 17_b_ for axes controls 19 with the axes input port 68 and axes output port 69 for a platform controller 18 (e.g., as an MCU 56 computing device) for an second axial platform 47 as an axial platform 16 subassembly of a of the physical render device 13, the first axial platform 47 providing axes controls 19 for axial response 21 for a physical render 12 of axial actions 45 for rotations 43 for the third axis 15_d_ axis by a mechanical response 48 of the rotational motor 47_b_ as previously discussed herein.

While referencing FIG. 6_b_, FIG. 22, and FIG. 23 in the example embodiment of the device object 15 instance, an optical sensor 47_e_ (e.g., an instance of an active component 17_a_ for acquisition of axes control 19 axial behavior 21 input) may be defined as a physical component wherein the component is an optical sensor reading a position of an optical mark 46_g_ on the top of the manipulator plate 46_b_ and aligned with the representative first axis 15_b_ of a first axial platform 46. In one or more other embodiments, a different type of components other than an optical sensor 47_e_ may be used for detection of location and/or proximity between two points (e.g., magnetic field sensors, limit switches, etc.). As illustrated in FIG. 23, a turn table bearing 47_d_ may allow for mechanical degrees of freedom as a mechanical response 48_c_ around the representative instance of the third axis 15_d_.

In a continued discussion of the present example, the sensor 47_e_ may be communicatively coupled to the axes input port 68 on the data pin A4 of the computing device (e.g., the MCU 56 of FIG. 22). The axes control 19 axial behavior 20 input may be a determined zero or "home" initial position for the second axial platform 47. During an initialization (e.g., in operation 84) of the firmware logic (e.g., shown in FIG. 5), an axes control 19 axial response 21 may be initiate a physical render 12 for axial action 45 for a rotation of the third axis 15_d_, wherein the acquisition of axes control 19 axial behavior 20 input of the sensor 47_e_ as previously discussed, may correlated and or associate the mechanical response 48 of the rotational motor 47_b_, with an initial global and local rotation "zero rotation" (e.g., <0, 0, 0>) for the third axis 15_d_.

In one or more embodiments the example second axial platform 47 may have a sensor group 47_c_ as an active components 17_a_ for acquisition of axes control 19 axial behavior 20 input a previously discussed in conjunction with FIG. 2 and FIG. 6_b_. As illustrated in FIG. 22 the sensor group 47_c_ of the example second axial platform may be comprised of individually defined example physical components wherein the defined physical components may be defined as half bridge load cells (e.g., the half bridge load cell 220_a_, the half bridge load cell 220_b_, the half bridge load cell 225_a_, the half bridge load cell 222_b_, the half bridge load cell 224_a_, the half bridge load cell 224_b_, the half bridge load cell 226_a_, and/or the half bridge load cell 226_b_). As known in the relevant art, two half bridge load cells may be combined to create a differential bridge pair. For example, the half bridge load cell 220_a_ and the half bridge load cell 220_b_ may form the differential bridge pair 220). Also shown are the differential bridge pair 222, the differential bridge pair 224, and the differential bridge pair 226. Such four bridge pairs may be configured and positioned/arranged in a manner on the control plate 47_a_ of the example second axial platform 47 wherein that the four bridge pairs may be in concert with the physical devices active components 17_b_ (e.g., the actuator device 46_c_, the actuator device 46_d_, the actuator device 46_e_, and the actuator device 46_f_) illustrated in FIG. 10. Additionally, the configuration may allow that each bridge pair may bisect the positive indicator 126, the negative indicator 127, the positive indicator 128, and the negative indicator 129 of the horizontal instance of the first axis 15_b_ and the second axis 15_c_ of the device object 15 instance in one or more embodiments as illustrated in FIG. 23. The configuration and/or placement/position/arrangement of the four bridge pairs, the differential bridge pair 222, the differential bridge pair 224, and the differential bridge pair 226 may form may form at least four axial quadrants, the quadrant 230, the quadrant 231, the quadrant 232, and the quadrant 233, for example as shown in FIG. 22 and FIG. 23.

According to one or more embodiments the acquisition of axes controls 19 axial behavior 20 input may be a physical control 11, where in the physical control 11 may provide for an interaction with a device object 15 instance. For example, the four bridge pairs may provide for the acquisition of axes control 19 for axial behaviors 21 input for interaction with the example device object 15 instance. As illustrated in FIG. 23 the four bridge pairs (e.g., the differential bridge pair 224, and the differential bridge pair 226) measuring physical strain across the control plate 47*a* of the example second axial platform 47 (e.g., the left/right front side strain, the left/right back side strain, the front/back left side strain, the front/back right side strain), wherein the physical strain as axes control 19 axial behavior 21 input which may be an interaction value with a first quadrant 230 or an interaction value with a second quadrant 231 or an interaction value of an interaction with a third quadrant 232 or an interaction value with a fourth quadrant 233. Each interaction value with each one quadrant as a axes control 19 axial behavior 20 for physical control 12 value for interaction with a first axis 15*b*, second axis 15*c*, third axis 15*d* of a device object 15 instance. For example, an interaction with a first quadrant 203 (e.g., a measurable strain across the left/right front side of the control plate 47*a* in conjunction with the front/back right side of the control plate 47*a*) of the example second axial platform 47, wherein such measurable strain may be an interaction value towards a positive indicator 126 of a first axis 15*b* and a negative indicator 129 of a second axis 15*c*, the interaction value possibly a physical control 12 for the device object 15 instance for an axial action 45 for a rotation 43 around a third axis 15*d* towards the interaction indicated by quadrant 203.

According it should therefore be appreciated that acquisition of axial behaviors 20 as input for axes controls may provide a physical render device 13 with an ability to manage a physical control 12 as an interaction with one or more device object 15 instances within the device world space 14 defined the physical render device 13. Further details of a device world space 14 definition described herein in a discussion in conjunction with FIG. 26.

In previous discussions herein of an example embodiment of a device object 15 instance in conjunction with FIG. 2 a device object 15 comprised of one or more axial platforms 16 providing axes controls 19 for the physical render 11 for 3D motion of axial actions 45 of the example device object 15 instance including an origin point 15*a*, first axis 15*b* and third axis 15*d*. Additionally, Axes controls 19 may provide of a physical control 12 for 3D interactions with the device object 15 instance including an origin point 15*a*, first axis 15*b*, second axis 15*c* and third axis 15*d* according to one or more embodiments.

In a previous discussions herein of an example working physical construction of the example device object 15 instance of FIG. 6*b* axis controls 19 axial responses 21 output providing an association of kinematic/inverse kinematic mechanical responses 48 with axial actions 45 of 3D motion for physical render 11 of the device object 15 instances. Additionally, axes controls 19 axial behaviors 20 input providing physical control 12 for interactions with the device object 15 instances according to one or more embodiments.

As known to a person skilled in the relevant art and as previously discussed herein in conjunction with FIG. 3*a* and FIG. 3*b* axial action 45 of 3D motion may be indicated by the x axis, y axis and z axis of a 3D object 31. Additionally known to a person skilled in the relevant art each axial action 45 for translation 42 and/or rotation 43 for an axis of the axes set 31*e* relative to the origin point 31*a*. Additionally each axial action 45 for translation 42 and/or rotation 43 for one axis of the axes set 31*e* may change the location and rotation of each other axis in the axis set 31*e* as previously discussed herein.

FIG. 24 introduces that one axis (e.g., a horizontal first axis 15*b*, a horizontal second axis 15*c*, and a vertical third axis 15*d* of a device object 15 instance through origin point 15*a* of a device object 15 instance may be designated as the origin axis for the device object instance 15 according to one or more embodiments. For example, in one or more embodiments, as illustrated in FIG. 24 the first axis 15*b* of the example device object 15*a* has been designated as the origin axis.

In further details the origin axis of a device object may be the axis for a forward/backward direction of axial action 45 translational 42 3D motion. As previously discussed herein in conjunction with FIG. 3*b* in one or more embodiments of a prototypical 3D object 31 a traditional orientation of the 3D object 31 a first axis 31*b* may be a forward/backwards direction for translation of the 3D object 31 relative to the origin point 31*a* of the 3D object instance 31. In one or more embodiments a device object instance 15 may take utilize a non-axial behavior (e.g., discussed in conjunction with FIG. 8) designating the first axis 15*b* as the forward/backward direction of the device object 15*a* instance relative to the device object's 15 origin point 15*a* in traditional orientation. In one or more other embodiments a different axis (e.g., second axis 15*c*, third axis 15*d*) may be designated in a non-traditional orientation.

In a previous discussion of the example device object 15 in conjunction with FIG. 18 and FIGS. 22 and 23 axes controls 19 axial responses 21 and axial behaviors 20 in conjunction with the enforcement of axial constraints for axial action 45 3D motion for the example device object 15 instance may determine an initial position for the origin point 15*a* (e.g., a mechanical "home" position for each axial platform 16 subassembly). The initial position value may be established as a zero location vector and zero rotation vector (e.g., loc <0, 0, 0>, roto <0, 0, 0>) for the origin point 15*a* of the device object 15 instance in one or more embodiments. Each physical control 12 and resulting physical render 11 of axial action 45 of 3D motion may effect a change in the location vector and/or current rotation vector position values as the current position vector values for the origin point 15*a* for the device object instance 15 according to one or more embodiments.

In further details of present discussion of the vector position values for location and rotation of the origin point 15*a*, according to one or more embodiments a device object 15 instance providing 3D motion may enforce that a physical control 12 and/or physical render 11 of one axial action 45 of 3D motion by one axis of a device object 15 may be relatable to the current position of all axes (e.g., the first axis 15*b*, second axis 15*c*, third axis 15*d*) relative to the current location and rotation values where in the axes controls 19 axial response 21 output and axial behaviors 20 input relative to the alignment of the origin axis with positive and/or negative active components 17*b* of the one or more axial platforms 16.

For example, as previously discussed herein a sensor 47*e* may be an optical sensor utilized in conjunction with an optical mark 46*g* for determination of a mechanical home position for the example second axial platform 46 and an initial rotation value of zero for a third axis 15*d* in one or more embodiments. Where in the physical control 12 and physical render 11 resulting in an axial action 45 of rotation 43 of the third axis 15 enforced by axial constraints by the gyrometer sensor 122 (e.g., and instance of an active component 17*a* for axes control axial 19 behavior input 21 shown in FIG. 12.) The rotation 43 effecting the current position of the origin axis (e.g., the first axis 15*b* designated as the origin axis.) A subsequent physical control 12 and physical render 11 possibly an axial action for a translation 42 of a first axis 15*b*. The first axis 15*b* (e.g., origin axis) now aligned with the active component actuator 46*e* (e.g., an active component 17*b* for axes control 19 axial response 21) as the positive indicator 126 and the active component the actuator 46*f* as the positive indicator 127 an axes control 19 for axial response 21 may then effect a kinematic action for a kinematic/inverse kinematic mechanical response by the alignment of the origin axis with actuator 46*e* and/or the actuator 46*f* other than the actuator 46*c* and/or the actuator 46*d*.

In a previous discussion of a 3D object objects 31, as known in the relevant art a 3D object 31 may have a global location, a global rotation, a local location and a local rotation which may be determined by the object origin point 31*a* (e.g., discussed in conjunction with the origin point of the 3D object 53 and the origin point of the 3D object 53*b* shown in FIG. 3*c*.) According to one or more embodiments axes controls 19 axial response 21 output for a physical render 11 of axial actions 45 by a device object 15 instance may be applied for a global location and global rotation and/or applied for local location and local rotation. Additionally, axes controls 19 axial behavior for a physical control 11 interaction with the device object 15 instance may be acquired from a global location and global rotation and/or applied for local location and local rotation.

Previous discussions of physical render 13 of a device object 15 instance which may allow that the axes controls 19 including axial response 21 output which may correlate and/or associate one or more known kinematic/inverse kinematic mechanical responses 48 produced by the active components 17*b* comprising one or more subassemblies (e.g., physical construction of an axial platform 16) with one or more axial actions 45 of 3D motion of a device object 15, the axial actions 45 may be enforced by axial constraints according to one or more embodiments. Additionally discussed that a physical control 12 may take axes controls including axial behaviors 20 input from the active components 17*a* comprising one or more subassemblies (e.g., physical construction of an axial platforms 16) as values of interaction with a device object 15 instance. Accordingly, it should therefore be appreciated that a physical render device 13 may allow for a physical render 11 of the axial actions 45 of one or more device object instances 15 other than the graphic render of one or more 3D objects 31 provided by the graphic render layer 29 of an external system 28 and viewable by a visual render device 41 (e.g., shown in FIG. 1) as known in the relevant art.

In a previous discussion a user agent 54 (e.g., a special instance type of a 3D object 31) in conjunction with FIG. 3*c*, the user agent 54 of an external system 28 for graphic render may allow a user 10 to control the user agent 54 allowing the user to utilize a 3D object 31 (e.g., for example, shown in FIG. 3*c* the user agent 54 controlling an avatar 55 3D object instance) allowing the user to navigate and/or interact with 3D world space 30 including the other various 3D objects within the 3D world space 30 provided by the external system 28. As previously discussed herein in conjunction with FIG. 2, FIG. 6*b* and FIG. 6*c* in one or more embodiments at least one device object 15 instance of the device world space 14 provided by the physical render device 13 may be configured as a device user agent 22 as previously discussed in conjunction with FIG. 8, FIG. 9*a* and FIG. 9*b*. According to one or more embodiments an at least one device object 15 instance configured as a device user agent 22 may allow that a user 10 may physically interact with the physical render device 13, the user's 10 physical interaction may then be a physical control 12 for interaction with the device object 15 instance configured as device user agent 22 as previously discussed herein. A physical control 12 as interaction with the at least one device object 15 instance configured as a device user agent 22 may provide for the role of interaction 99 allowing a user to interact with the provided device world space 14 and a role of navigation 98 allowing a user to navigate the provided device world space 14. Additionally, in one or more embodiments an at least one device object 15 instance may include at least one control platform 23, the control platform 23 may have a non-fixed and replaceable mechanically and communicatively couple control appliance 25. The control platform 23 in conjunction with a control appliance may provide for a role of user control 97 which then may allow that the user's 10 physical activity may be used for control of the at least one device object 15 instance.

For example, FIG. 25 may illustrate a user 10 physically interacting over four time instances (e.g., time instance 235, time instance 236, time instance 237, time instance 238) with the example second axial platform 47 and user control platform 23 of the example device object 15 instance, the device object 15 instance configured as a device user agent 22. A discussion of FIG. 25 in conjunction previous discussions herein for FIG. 8, FIG. 9*a*, FIG. 9*b*, FIG. 22 and FIG. 23 may allow that the physical control 12 which may be the physical interaction and physical activity of a user 10 engaging the physical render device 13 may provide the user 10 to utilize a device user agent for control of a device object instance 15 to navigate and/or interact with the device world space 14 provided by the physical render device 13.

In a continued discussion of the present example, as illustrated in FIG. 9*a* the example embodiment of the control appliance 25, it may be noted that the control appliance 25 which may be mechanically and communicatively coupled to the user controller 18 of the control platform may not provide axes control 19 for axial behaviors 20 input for an axial action 45 of rotation 43 around the third axis 15*c* of the device object 15 instance. Therefore, not having an axes control 19 for an axial behavior input 20 for an intent for a rotation 43 around a third axis 15*c* a user's physical activity (e.g., walking on the treadmill 93 component of the control appliance 25 shown in FIG. 9*a*) while engaging the present example control appliance 25 may then only provide for a physical control 12 of axial actions 45 for linear motion over time 44 along one axis (e.g., a first axis 15*b* and/or a second axis 15*c*) leaving the user 10 unable to navigate in a non-linear fashion.

In a previous discussion in conjunction with FIG. 22 and FIG. 22 the second axial platform taking axes controls 19 axial behaviors 20 input for measuring interaction with the first axis 15*b* and second axis 15*c* device object 15 instance, the measurement of interaction from the quadrants (the quadrant 230, the quadrant 231, the quadrant 232, and the quadrant 233) provided by four differential bridge pairs (e.g., the differential bridge pair 222, the differential bridge pair 224, and the differential bridge pair 226). In one or more embodiments the user' 10 physical interaction device object 15 instance as measured by axes control 19 axial behavior 20 input acquired from the four quadrants, the quadrant 230, the quadrant 231, the quadrant 232, and the quadrant 233 may then effect a rotation around the third axis 15*c* allowing for the user 10 to navigate in a non-linear fashion, the interaction with second axial platform acting in a role of navigation 98. For example, the platform controller 18 for the second axial platform 47 (an instance of an axial platform 16) of a device object 15 instance configured as a device user agent 22, the second axial platform acting in the role of role navigation 98, the output of each one of the four differential bridge pairs may feed through four differential amplifiers (e.g., the differential amplifier 221, the differential amplifier 223, the differential amplifier 225, and/or the differential amplifier 227) wired to data pins (e.g., the data pin A0, the data pin A2, the data pint A3, and the data pin A4, respectively) as values of axial behavior 20 for strain for each quadrant 230 as illustrated in FIG. 22. Each axial quadrant may be representative of a measurable strain across the positive indicators and/or negative indicators for each of the horizontal instance of the first axis 15*b* and the second axis 15*c*. For example, a strain measure in quadrant 231 as an axial behavior 20 for the strain effected by an interaction of a user 10 placing a foot in the upper right-hand corner of the control platform 23*a*, wherein the four differential bridge pairs; the differential bridge pair 222, the differential bridge pair 224, and the differential bridge pair 226 place physically mounted on the second axial platform plate 47*a*, the control platform 23*a* mechanically coupled to the second axial platform plate 47*a* in a manner shown in conjunction with FIG. 23 which may indicate a value of an acquisition of axes control 19 axial behaviors 20 input for an increase on data pin A0 and data pin A3, the axial behaviors 20 for an axial strain interaction with quadrant 231.

In a continued discussion of example embodiment of platform controller 18 for an axial platform 16 for the role of role navigation 98, the output of each one of the four differential bridge pairs may feed through four differential amplifiers (e.g., the differential amplifier 221, the differential amplifier 223, the differential amplifier 225, and/or the differential amplifier 227) wired to data pins (e.g., the data pin A0, the data pin A2, the data pint A3, and the data pin A4, respectively) as values of axial behavior 20 for strain for each quadrant 230. Each axial quadrant may be representative of a measurable strain across the positive indicators and/or negative indicators for each of the horizontal instance of the first axis 15*b* and the second axis 15*c*. For example, a strain measure in quadrant 231 as an axial behavior 20 for the strain effected by an interaction of a user 10 placing a foot in the upper right-hand corner of the platform plate 47*a*, which may indicate a value of an axial behaviors 20 for an increase on data pin A0 and data pin A3 as an axial strain in quadrant 231.

In a previous discussion of the logic prototype of the firmware of a computing device (e.g., the example MCU 56) in conjunction with FIG. 5 a tolerance for acquisition of axes controls 19 axial behavior 20 input may be determined in operation 86, the tolerance may include measuring a four-cycle bi-pedal motion, e.g., within the defined example firmware logic 91 the user 10 may take a normal turn to the right establishing a baseline set of axial behaviors 20, axial strain for each of the four quadrants (e.g., the quadrant 230, the quadrant 231, the quadrant 232, the quadrant 233) and for each "way point" for each time instance (e.g., the time instance 235, the time instance 236, the time instance 237, and the time instance 238). The tolerance tested in operation 86*b* being exceeded an axial control 19 axial response 21 effecting a mechanical response of the active component 47*b* (e.g., an active component 17*b*, the physical component being a rotational motor) mechanically rotating in a counter clockwise motion, the mechanical motion a physical render 11 of a rotation around a third axis 15*d*.

The user's 10 physical activity of walking measured as axes control 19 axial behavior input for an axial action 45 of linear motion over time 44 along a first axis 15*b* or a second axis 15*c*, where in the determination of the axis 15*b* or axis 15*c* relative to the origin point 15*a* and origin axis as discussed previously herein in conjunction with FIG. 24 of a device object 15 instance. It should therefore be appreciated that the axial action 45 for linear motion over time 44 in conjunction with the strain measured within the tolerance for each quadrant may allow for an axial action 45 of a rotation 43 around a third axis 15*d*, the user 10 may navigate within the device world space 14 provided by the physical render device 13.

As previously discussed in conjunction with FIG. 3*b* as known to a person skilled in the relevant art a global reference point 46 and ground plane 47 may be elements of a 3D world space 30 for indication of direction of a 3D object 31 in 3D world space and location of a 3D object 31 within the boundaries of the 3D world space 30. According to one or more embodiments a world cage 239 that may be an exostructure positioned around the at one or axial platforms 16 mechanical subassemblies of the physical render device 13 providing the axis controls 19 comprising the at least one device object 15 instance configured as a device user agent 22 may then provide a device world space 14, the device world space 14 including a global reference point 14*a* and ground plane 14*b* for direction of axial actions 45 3D motion and a location and rotation of one or more device object 15 instances within the device world space 14.

According to one or more embodiments, FIG. 26 illustrates a world cage 239 that may be configured as having six sides; a front side 239*a*, a backside 239*b*, a left side 239*c*, a right side 239*d*, a top side 239*e* and a bottom side 239*f*. In one or more embodiments one side may be an access portal allowing a user 10 to access the mechanisms of the device user agent 22. For example, as illustrated the back side 239*b* may provide an access portal.

In further details of the world cage 293 exostructure of FIG. 26 as illustrated, in one or more embodiments the placement and/or arrangement of the structure components (the vertical structure members 239*g*, horizontal structure members 239*h*) comprising each one side of the world cage 239 may be mechanically aligned with the possible kinematic/inverse kinematic mechanical responses 48*b* of the one or more subassemblies comprising the physical render device 13, wherein an axes control 19 axial response 21 may associate and/or correlate a kinematic and/or inverse kinematic response with one or more axial action 45 of 3D motion for one or more axis (e.g., the first axis 15*b*, the second axis 15*c* and the third axis 15*d*) as previously discussed herein. Additionally, in or more embodiments where the vertical structure members 239*g* of each side (e.g., the front side 239*a*, the backside 239*b*, the left side 239*c*, the right side 239*d*, the top side 239*e* and the bottom side 239*f*) may not be an access portal may be fixed, the number and position/arrangement of the horizontal structure members 239*h* may vary for both vertical position/arrangement and quantity. For clarity, the vertical structure members 239*g* and the horizontal structure members 239*h* for the side which may be the access portal not shown. In one or more embodiments the side which may be the access portal may be optionally closeable where in the vertical structure members 239*g* and the horizontal structure members 239*h* may comprise a removable/replaceable panel, and/or a door, and/or gate etc.

In a previous discussion of the origin axis in conjunction with FIG. 10 and FIG. 24, the origin axis may be utilized for determination of a direction of an axial action 45 of 3D motion for a device object 15 instance, wherein an axial action 45 having been correlated and/or associated with the kinematic/inverse kinematic responses **48*b* relatable to axial actions 45 of a translation 43 and/or rotation of 3D object 31 discussed in conjunction with FIG. 3*a* and FIG. 3*b*. As previously discussed herein the origin axis of a device object instance 15 may be placed one axis (e.g., the first axis 15*b*, the second axis 15*c* and the third axis 15*d*), where in the axis may be determination of a forward/backwards direction of the device object instance 15, the origin axis of the device object 15 instance may be aligned with the front side 239*a* of the world cage 239 exostructure according to one or more embodiments. Where therefore the alignment of the origin axis of the device object 15 may the allow that a kinematic/inverse kinematic mechanical response in a direction of one or more sides (e.g., the front side 239*a*, the backside 239*b*, the left side 239*c*, the right side 239*d*, the top side 239*e* and the bottom side 239*f*) of the world cage structure 293 may be an axial action 45 for a translational 42 3D motion and/or rotational motion 43 3D in a direction for one or more sides of the world cage 239** exostructure.

As previously discussed axes controls 19 axial response 21 in conjunction with the axial constrains provided by the applied armature 182 (e.g., shown in FIG. 17 and FIG. 18) effecting a mechanical response 48 associated axial actions 45 of 3D motion relative to an initial position of the device object's 15 origin point **15*a*, wherein the initial position correlated and/or associated with, the "home" or "zero" mechanical position of the one or more axial platform 16 mechanical subassemblies of the physical render device relatable to axial actions 45 by the axes controls 19 axial response 20 output. Additionally, subsequent mechanical responses 48 relatable current positions of the origin point 15*a* associated with the current mechanical position of the axial platform 16 comprising the physical render device 13**

Accordingly, it should therefore be appreciated, that a mechanical response 48 effected by an axes control 19 axial response 21 output may be a physical render 13 of axial actions 45 of 3D motion by a device object 15 in a direction towards a physical side of the exostructure of the world cage 239, the axial action 45 of 3D motion applied relative to the device object 15, the mechanical response relative to the initial position and/or subsequent mechanical positions of the mechanical subassemblies (axial platforms 16 comprising axes controls 19 of the device instance) comprising the physical render device 13. According to one or more embodiments an axes control 19 for a physical render 12 towards a side (e.g., the front side **239*a*, the backside 239*b*, the left side 239*c*, the right side 239*d*, the top side 239*e* and the bottom side 239*f*) of the world cage structure 293 may provide for a global reference point 14*a* for a device world space 14 provided by the physical render device 13 sharing the operability of a graphic 3D world space 30 shown in FIG. 3*b***.

device user agent 22 device user agent **221*n* an example embodiment of the world cage 239 of FIG. 27, a world cage 239 illustrates a concept of additional interactions of world physics for the user 10. For example, a gravity harness 240 worn by the user 10 may be suspended from the world cage 239. A circuit 241 sensing an inverted 2-dimensional x-y axis (e.g., a joystick) and a strain sensor may measure the band coupled to a gravity harness 240, and might be used as the component producing the electronic signals for axes controls 19 axial behaviors 20 input interaction values for an axial actions of 3D motion for one or more axial platforms 16. The axes control 19 interaction data (e.g., the example data of chart 65*a* and chart 65*b* shown in FIG. 4*a*) may be communicated to the first axial platform 46 (e.g., an instance of axial platform 16) of the device object 15 instance configured as a device user agent 22, the axes control 19 axial response 21 effecting a possible kinematic/inverse kinematic response 48*b* associated and/or correlated with the axial actions 45 of 3D motion. The axes controls 19 for axial behavior 20 for physical control 12 interactions, the axes controls 19 for axial response 21 effecting a mechanical response 48*b* as a physical render 12** of gravity.

As previously discussed a physical render device 13 may include more than one device object 15 instances, a device object comprised of one or more axial platforms 16 comprised of the various active components 17; the active components **17*a* providing values of physical control 12 of axial actions 45 interactions for axes controls 19 axial behavior 20 input and the active components 17*b* providing a mechanical response 48 of axial actions 45 as a physical render 11** of 3D motion.

In a previous discussion of a graphically rendered 3D world space discussed in conjunction with FIG. **3*b* as known to a person skilled in the relevant art the x length 48, the y length 49, the ceiling 50 and the floor 51 may be parameters for determination of the boundary extents of a ground plane 47 for the graphic 3D world space. A ground plane 47 may be useful in the determination of the global location and global rotation of the various 3D objects 31 in the graphic 3D world space 30. According to one or more embodiments the world cage 239 may provide a ground plane 14*b* for the device world space 14 provided by the physical render device 13**.

In a continued discussion of a ground plane **14*b* for a device world space 14, in one or more embodiments as illustrated in conjunction with FIG. 28 the world cage 239 configured as having six sides (e.g., the front side 239*a*, the backside 239*b*, the left side 239*c*, the right side 239*d*, the top side 239*e* and the bottom side 239*f*) one or more physical reference points (e.g., the physical reference point 239*i* may be an example of a physical reference point) may be measurable relative to one or more of the configured sides of the world cage 239**

In further details of the present discussion an example of a second device object 242 configured by at least one axial platform 16 mechanical subassemblies of the physical render device 13, the axial platform 16 may have axes controls 19 (e.g., axial behavior 20 input and axial response 21) for physical control 12 and physical render 11 for axial actions 45 of 3D motion for the second device object 242 as previously discussed herein. In one or more embodiments 11 mechanical axial platform 16 subassembly of the second device object 242 mechanically coupled with the world cage 239 at the physical reference location **239*i*, the axes elements for 3D motion (e.g., origin point 242*a*, first axis 242*b*, second axis 242*c*, third axis 242*d*) for axes controls 19 of the second device object 242 aligned with the global reference point 14*b*, wherein the first axis 242*b*** having been designated as the origin axis indicating a forward direction as previously discussed herein.

Accordingly, it should therefore be appreciated that as illustrated in FIG. 28 in conjunction with previous discussions of the axes controls 19 axial response 21 and axes controls axial behaviors including axial constraints (e.g., referencing FIG. 1, FIG. 2, FIG. **6*b*, FIG. 10, FIG. 15, FIG. 18, FIG. 21, FIG. 24 and FIG. 26 as needed) a physical control 12 and physical 11 of the second example device object 242 effecting a kinematic and or kinematic mechanical motion towards one or more directions of a physical side (e.g., the front side 239*a*, the backside 239*b*, the left side 239*c*, the right side 239*d*, the top side 239*e* and the bottom side 239*f*) mechanically relative to the physical reference point 239***i*, wherein the mechanical motion correlated and/or associated as a direction of axial actions 45 of 3D motion towards a global reference point 14*b* of device world space 14 wherein the axial actions 45 of 3D motion relative to the origin point 242*a* of axes controls 19, the physical reference point 239 may then be a location of the second device object 242 in device world space 14, therefore one or more physical reference points 239*i* may provide the physical render device 13 an operability of a ground plane 14*b*.

For example, as illustrated in FIG. 28, in one or more embodiments an axial platform 16 may be included as a mechanical subassembly the physical render device 13 including an active component 243 (e.g., an instance of active component 17*b*) for axes control 19 axial response 21 output which may be providing a rotational mechanical response 48 around a center point of a plate 242*e* of axial platform 16. A heat lamp 244 (e.g., a nonactive component instance) may be then configured and/or positioned/arranged at a location 244*a* on the plate 242*e*, wherein the configuration and/or position/arrangement of the heat lamp 224 may allow for correlation and/or association of a mechanical response 48 with axes controls 19 of a first axis 242*b*, second axis 242*c*, third axis 242*c*, the mechanical zero or "home" may be an initial position for an origin point 242*a* as previously discussed herein. The axial platform 16 of the second example device object 242 mounted at the physical reference point 239*i* on the world cage 239, wherein the physical reference point 239*i* as location in device world space 15 for the may be a location in the ground plane 14*b*, a user 10 of the first device object 15 instance configured as a device user agent may interact with second example device object 242, for example, turn facing the second example device object 242 and/or the second device object 242 may rotate 43 around the first device object 15 instance (e.g., the user 10), wherein a mechanical response 48 and axial action relative to the mounting point 239*i* and the axial actions 45 of 3D motion relative to the origin point 242*b*, the physical reference point 239*i* may then be a location within the ground plane 14*b* of the device world space 14 provided by the physical render device.

FIG. 29 illustrates that according to one or more embodiments, the physical render device 13 which may provide device world space 14 which may be a physical render as motion of a 3D world space. The physical render device 13 may be coupled with an external system 28 providing a visual render (e.g., the visual render device 29) of the graphic render of a 3D world space 30 through the bridge platform 27. A bridge platform 27 may be a synchronization utility that wherein coupled, the device world space (e.g., global reference point 14*a* and ground plane 14*b*) may be synchronized with the external 3D world space 30 (e.g., global reference point 46 and ground plane 47). Additionally, the axial actions 45 of 3D motion for the various instances of the configured physical device object instances may be synchronized with the axial actions 45 for 3D motion for the various 3D object 31 of the external 3D world space 30. In one or more embodiments the example device object instance 15, the example device object 242 may be example embodiments of configured device object instances, the construction and/or configuration and/or placement/arrangements of other embodiments of configured device object instances may be possible.

In one or more embodiments, FIG. 29 illustrates a bridge platform 27 including a device landing point 27*a* having a hardware connector 109 (e.g., a hardware interface connector) that may be communicatively and/or electrically coupled with the circuitry of the priority mediation protocol 26 of FIG. 7. In one or more embodiments, the device landing point 27*a* may act as an additional platform controller for axes controls 19 (e.g., including computing device) on the common communication bus 26 including being subject to the mediation protocol. The device landing point 27*a* may have a priority control line 102*e*, a grant control line 106*e*, and/or a system ready line 85*a*, each of which may allow the device landing point 27*a* to participate as a member of the priority mediation protocol 26, for example acting as a bus master controller 78 and/or a bus slave receiver 79 on the common communications bus 25 as previously discussed herein (e.g., as shown and described in conjunction with FIG. 4*a*, FIG. 5 and FIG. 7). The device landing point 27*a* may be a device on and member of the common communications bus 25, and may exchange axes control interaction data (example axes control interaction data for chart 65*a* and/or example axes control interaction data 65*b*) with one or more platform controllers 18, user controllers 24, and/or other devices on the common communication bus 26.

In one or more embodiments, a bridge platform 27 of FIG. 29 may include an external landing point 27*b* that may couple the bridge platform 27 to the external system 28 through a protocol transport 245. A protocol transport 245 may allow that the sync utility 246 to consistently exchange the axes control interaction data (e.g., the example data chart 65*a* and/or chart 65*b* shown in FIG. 4*a*) with an external systems 28. For example, the axes control interaction data values from chart 65*a* and/or axes control interaction data 65*b* for an axial motion of translation 42 for a first axis 15*b* may be transmitted to a first external system 28 having a TCP/IP and HTTPS communications protocol, where the protocol transport 245 may be configured for TCP/IP and HTTPS communications. The same axes control interaction data values from 65*a* and/or axes control interaction data values 65*b* may be transmitted to a second external system 28 which may have a different communications protocol, the protocol transport 245 being configure for the communications protocol for the second external system 28.

In one or more embodiments, a bridge platform 27 of FIG. 29 may include a sync utility 246 having a device connector 246*a*, data forward 246*c* and an external connector 246*b*. FIG. 29 in conjunction with FIG. 7 may illustrate that a device connector 246*a* may couple the data forward 246*c* with the device landing point 27*a*, wherein the device landing point 27*a* (e.g., an axes control 19 platform controller) may gain access through the hardware connector 19 to the priority mediation circuitry which may provide for a value of priority for determination by the mediator 100 and receiving the determination of grant (e.g., via a grant control line 106*e*) from the priority mediation protocol 26*a*. The device landing point 27*a* may then obtain a state of bus master controller 78 or bus slave receiver for control of the common communications bus 25 as previously discussed herein. According to one or more embodiments the data forward 246*c* may then have access to priority level of the device landing point 27*a* for determination of a forward proxy of axes control interaction data values (e.g., example data 65*a*, 65*b*) for physical control interactions with the device world space 14 for synchronization with the external system's 28 3D world space 30.

In a continued discussion of the sync utility 246 of the bridge platform 27 of FIG. 29, in one or more embodiments an external connector 246 may couple the data forward 246*c* through the transport 246 to an external landing point 27*b* coupling the external system 28 with the bridge platform 27. The external landing point may interface with the introduced physical render layer 40 which may then access the native system methods for managing the interactions (e.g., set behavior 32*a*, a "setter method" as known in the relevant art) with one or more 3D objects 31 effecting axial actions 45 of 3D motion for the 3D objects. Additionally, an introduced physical render layer 40 may also access the native system methods for managing the responses of the one or more 3D objects 31 (e.g., get behavior 32*b*, a "getter method" as known in the relevant art") resulting from a 3D object's interaction with the 3D world space 30. For example, a change in location and or rotation, an encounter with the physics of the system etc.

In one or more embodiments the physical render layer may determine a level of a priority request (e.g., an increasing priority levels previously discussed in conjunction with FIG. 7) from the values of 3D object's interaction with the 3D world space 30. The priority request 280 may then be transferred from the external landing point 27*b* to the sync utility 246 and forwarded to the device landing point 27*a* where a mediator 100 may determine a winner as previously discussed herein in conjunction with FIG. 7.

As previously discussed herein in conjunction with FIG. 1, FIG. 4*a*, FIG. 5, FIG. 7 and FIG. 29 the bridge platform 27 may have an axes control platform as the landing point 27*a*, each one or more axial platforms 16 which may include an axes control platform controller 18 and each one or more control platforms 23 which may include an axes control user controller 24 wherein each axes control platform communicatively coupled to the common communications bus 25 and a participating member of the priority mediation protocol 26*a*.

In one or more embodiments a synchronization of a physical control 12 of device world space 14 and an external 3D world space 30 may be possible when the device landing point 27*a* included in the bridge platform 27 upon a losing priority bid may accept an axial control interaction data from one or more axial platforms 16 platform controller 18 and/or one or more control platforms 23 user controller 24. The sync utility 246 of the bridge platform 27 may use data forward 246*c* to communicate the axial control interaction data as interaction data 250 to the external landing point 27*b*. The physical render layer 40 may then use the interaction data 250 to set the behavior of a 3D object 31 resulting in a physical control 12 of axial actions 45 of 3D motion for a 3D object 31. Additionally, a losing priority request mediation result 251 may be returned by the sync utility in a similar fashion to the physical render layer 40 which then should increase the level of the priority request as previously discussed herein.

In one or more embodiments a synchronization of a physical render 11 of an external 3D world space 30 by the device world space 14 may be possible when the device landing point 27*a* included in the bridge platform 27 upon a winning priority bid may allow that a responses of the one or more 3D objects 31 interaction with the 3D world space 30 acquired from the get behavior 32*b* by the physical render layer 40 may be communicated as response data 251 by the external landing point 27*b* to the sync utility 47 which may data forward 246*c* the response data 251 to the bridge landing point 27*a*. The bridge landing point 27*a* as bus master controller 78 may then place the response data 251 as axes control response data (e.g., the example data for axial response signals chart 65*c* and chart 65*d* shown in FIG. 4*a*) which may produce an axes control 19 axial response 21 output signal effecting a physical render of axial actions 45 of 3D motion as previously discussed herein.

Accordingly, it should therefore be appreciated that the data values of axes control 19 axial behavior 20 acquired for interactions with the device world space 14 provided by a physical render device 13, wherein the physical render device communicatively coupled with an external system 28, may be communicated, exchanged, synchronized with a 3D world space provided by the external system 28. Additionally, it should be appreciated, the data values acquired from interactions with an external 3D world space may be may be communicated, exchanged, synchronized with a device world space 14 provided by a physical render device. Such an exchanged may allow a user 10 to be both physically and graphically engage a 3D world space for a fuller immersion in a virtual world, a 3D game, physical simulation etc.

FIG. 30*a* may illustrate a physical and graphic virtual reality which may be experienced by a user 10 physically engaging an embodiment of a physical render device 13 generating a 3d physical 3D device world space 14, wherein the physical render device 13 bi-directionally communicatively coupled through the bridge platform 27 with an external system 28 generating a graphic 3D world space 30, the bridge 27 which may allow for the data between the physical 3D device world space 14 and the graphical 3D world space may be exchanged and synchronized according to one or more embodiments as previously discussed herein.

In one or more embodiments the physical render device 13 of FIG. 30*a* generating a physical 3D device world space 14 including a device object 15 instance which may be a physical device object 15 instance within the physical 3D device world space. The device object 15 instance may allow the user 10 to physically engage the device object instance 15 for physical control 11 as axial actions 45 of 3D interactions with the device object 15 instance, the axial actions 45 3D of interactions with the 3D object instance may then result in axial actions of 3D motion as a physical render 12 by the physical render device 13.

In a continued discussion of a physical virtual reality and graphic virtual reality for a user 10, FIG. 30*b* may illustrate that that replacing the control appliance 25 and alternate physical and graphic virtual reality may be possible. As illustrated, wherein the axes controls 19 of a system 1 of physical virtual reality and graphic reality may remain consistent for a device world space 14 wherein device world space relevant to a first device object 15 configured as a device user agent, the replacement of the control appliance may allow that the values of axes controls 19 may vary. For example, the physical interactions by a user 10 of the control appliance 25 of FIG. 30*a* may produce a 3D interaction for axial actions of linear motion over time 44 rate (e.g., shown in FIG. 3*a*) as a physical activity may generate a physical 3D interaction value for axes control 19 axial behaviors 20 of 2 kph (e.g., average rate of a human walking.) Alternately the same user of the control appliance 25 may generate physical 3D interaction value for axes control 19 axial behaviors 20 of 104 kph. According to one or more embodiments, wherein the device user agent 22 communicatively coupled and synchronized with a 3D user agent object 54 controlling an avatar 55 a user having a physical and graphic virtual reality of walking in a forest. Alternately, having exchanged and/or replaced the control appliance 25, a user having a physical and graphical virtual reality of cruising a 1955 Chevy Belaire™.

It should therefore be appreciated that a physical control 12 by the user 10 and physical render 11 for the user 10 by the device objects 15 which may then provide a physical virtual reality for engagement of 3D objects in physical 3D world space for the user 10.

In one or more embodiments wherein the device object 15 of FIG. 30*a* may have been configured as a device user agent 22 in a manner as previously discussed herein, the user's physical activity may then be measured for a 3D control of the device object 15. A 3D control which may be provided by a device user agent 22 may allow for the user 10 to interact and navigate within the physical 3D device world space. Additionally, a non-fixed and replaceable control appliance 25 may be mounted which may allow for a 3D control to be relative to a user's 10 measured physically activity. It may then be recognized that a 3D control as measured by the user's 10 physical activity which may allow for a physical virtual reality where in the user may in a more natural fashion explore and navigate a physical 3D device world space 14 generated by the physical render device 13.

In previous discussion herein in conjunction with a discussion of FIG. 26, a physical 3D world space generated by physical render device 13 may provide for the axial actions 45 for 3D interactions and 3D motions of a graphical 3D world space 30 of FIG. 3*b* wherein both the physical 3D device world space 14 and the graphical 3D world space 30 may have a global reference point 14*a*, 46 respectively and a ground plane 14*b* and 47 respectively. Accordingly, it should there for be appreciated that a system which may provide physical control 11 and physical render 12 as 3D interactions and 3D motion within and relative to a physical 3D world device world space may then provide a physical virtual reality for a user 10 of such a system.

As known in the relevant an external system 28 may generate a graphic 3D world space 30. A system layer 32 may use axial actions 45 for 3D interaction and 3D motion which may determine a location and position for where one or more 3D objects 31 may be graphically rendered (e.g., "drawn"). A user 10 of the external system 28 may view a visually relatable graphic rendered as a virtual environment in a visual render device 41. A visually rendered virtual environment may then be a graphic virtual reality for a user 14. According to one or more embodiments a physical render device 13 generating a physical 3D device world space 14 may be communicatively coupled with an external system generating a graphic 3D world space 30. The physical 3D device world space 14 and the graphic 3D world space sharing the same data types which then may allow the values for the physical device world space 14 and the graphic 3D world space 30 to be bi-directionally exchanged and synchronized.

For example, according to one or more embodiments and as illustrated in FIG. 30*a* a user 10 may engage a physical render device 13, wherein a bridge platform 27 may be communicatively coupled with the common communication bus 26 of the physical render device 13 by the device landing point 27. The external landing point 27*b* of the bridge platform 27 may then additionally coupled to a newly introduced physical render layer 40 of the system layer 32 of the external system 28.

In a continued discussion of the present example, the physical render device 13 generating a physical 3D device world space 14, the user's physical interaction and physical activities as axes controls 19 for a physical control 12 for 3D interaction which may then result for a 3D motion for a device object 15 instance, wherein the device object 15 instance configured as a device user agent 22 within the physical 3D device world space. Wherein the values of a device world space axes controls 19 may then be the same values for a graphic 3D space 30 the values may be exchanged and synchronized by the bridge platform 27 which may then allow for the physical control 12 3D interactions to be placed at the physical render layer 40 which may then use the system layer 32 set behavior method 32*a* to apply the value as a 3D interaction upon the associated user agent 54 3D control object 31. The 3D interaction applying a axial action 45 for 3D motion for the user agent 54 3D control object (e.g., an instance of 3D object 31), wherein the user agent controlling an avatar object 51 and armature 56 which may represent the user 10. The axial action 45 of 3D motion for the user agent which may resulting in relatable change in location and position of the user agent 54. Therefore, as illustrated in FIG. 30*a* the user's may be navigating while walking in a physical device world 14 which may be synchronized with the graphic 3D world space 30. the user 10 may visually see by the means of a visual render device 41 a graphic render of a virtual environment the avatar 55 representative of the user 10 walking. The interactions of the user agent 54 with the graphic world space 30 which may alter the behaviors of the location and/or position of user agent within the graphic 3D world space (e.g., collisions and/or interactions with other objects, changes in elevations due to terrain etc.) may then be returned as an axes control 19 for physical render 11 of an axial action 45 of 3D motion by a physical render 11 by the physical render device which may be a physical sensation experience of physical virtual reality. It should therefore be appreciated that the present system may allow for an immersive physical and graphic virtual reality experience for a user of the system.

The invention claimed is:

1. A system for immersive physical and graphical virtual reality, comprising: a structural platform, an external system, and a bridge platform, wherein the structural platform, hereinafter referred to as a physical render device, the physical render device comprises:

one or more subassemblies, each subassembly of the one or more subassemblies comprising one or more input devices, one or more sensors, one or more mechanical devices, and one or more computing devices;

wherein the arrangement of the one or more subassemblies defines first parameter values of a first three-dimensional (3D) world space, wherein, the one or more input devices are further operable to acquire physical interactions from a user, the physical interactions being converted into 3D input data relative to the defined first parameter values of the first 3D world space, the 3D input data updating a current state of the first parameter values of the first 3D world space;

wherein, the one or more mechanical devices are configured to receive control signals from the one or more computing devices, the control signals being derived from the current state of the first parameter values of the first 3D world space, the control signals producing corresponding physical motion and/or physical stimuli as a physical render output by the physical render device; and wherein each computing device of the one or more subassemblies is communicatively coupled with the other computing devices of the one or more subassemblies of the physical render device for data exchange;

wherein the external system comprises:

a system layer configured to programmatically define second parameter values of a second 3D world space, herein referred to as the graphical 3D world space;

one or more input interfaces configured to receive user interaction data, the interaction data being processed by the system engine as second 3D input data relative to the second parameter values of the second 3D world space, the second 3D input data updating a current state of the second parameter values of the second 3D world space, wherein the first parameter values and the second parameter values share operational functionality for defining and updating spatial relationships; and a graphics render layer configured to apply the second parameter values of the second 3D world space in conjunction with visual data to generate a graphical render output on a visual render device;

wherein the bridge platform is configured to communicatively couple the physical render device and the external system for bi-directional exchange of the first and second parameter values of the first and second 3D world spaces, wherein a change in the current state of the first parameter values of the first 3D world space triggers transmission to the external system for updating and synchronizing the current state of the second parameter values of the second 3D world space, and wherein a change in the current state of the second parameter values of the second 3D world space triggers transmission to the physical render device for updating and synchronizing the current state of the parameters of the first 3D world space; and wherein the user is physically located within a structure which comprises the physical render device, the structure further defining the first parameter values of the first 3D world space, wherein the user can move freely within the structure and the first and second parameter values of the first and second 3D world space are updated based on user movement within the structure and wherein the synchronized current states of the respective first and second parameter values of the first and second 3D world spaces are respectively used by the physical render device and by the external system to render a fully immersive virtual reality environment.

* * * * *